United States Patent [19]

Aghajanian et al.

[11] Patent Number: 5,249,621

[45] Date of Patent: * Oct. 5, 1993

[54] METHOD OF FORMING METAL MATRIX COMPOSITE BODIES BY A SPONTANEOUS INFILTRATION PROCESS, AND PRODUCTS PRODUCED THEREFROM

[75] Inventors: Michael K. Aghajanian, Bel Air; Gregory E. Hannon, North East, both of Md.; Russell Guy Smith, Wilmington, Del.; John P. Biel, Jr., Elkton, Md.; John T. Burke, Hockessin, Del.; Christopher R. Kennedy, Newark, Del.; Michael A. Rocazella, Newark, Del.; Kurt J. Becker, Newark, Del.; Thomas J. Henderson, Bear, Del.

[73] Assignee: Lanxide Technology Company, LP, Newark, Del.

[*] Notice: The portion of the term of this patent subsequent to May 21, 2008 has been disclaimed.

[21] Appl. No.: 863,894

[22] Filed: Apr. 6, 1992

Related U.S. Application Data

[63] Continuation of Ser. No. 521,043, May 9, 1990, abandoned, which is a continuation-in-part of Ser. No. 484,753, Feb. 23, 1990, abandoned, which is a continuation-in-part of Ser. No. 432,661, Nov. 7, 1989, abandoned, which is a continuation-in-part of Ser. No. 416,327, Oct. 6, 1989, abandoned, which is a continuation-in-part of Ser. No. 349,590, May 9, 1989, abandoned, which is a continuation-in-part of Ser. No. 269,311, Nov. 10, 1988, abandoned.

[51] Int. Cl.$^5$ .............................................. B22D 19/14
[52] U.S. Cl. ........................................ 164/97; 164/101
[58] Field of Search ............... 164/99, 91, 97, 98, 164/100, 101, 102, 103, 104, 105

[56] References Cited

U.S. PATENT DOCUMENTS 3,970,136 7/1976 Cannell et al. ................. 164/108
4,082,864 4/1978 Kendall et al. ................. 427/248

(List continued on next page.)

FOREIGN PATENT DOCUMENTS 0364963 4/1990 European Pat. Off. .
2819076 10/1979 Fed. Rep. of Germany .
2156718 10/1985 United Kingdom .

OTHER PUBLICATIONS

G. R. Edwards and D. L. Olson, "The Infiltration Kinetics of Aluminum in Silicon Carbide Compacts", Annual Report from Center for Welding Research, Colorado School of Mines, under ONR Contract No. M00014-85-K-0451, DTIC Report AD-A184 682, Jul., 1987.

A. Mortensen, M. N. Gungor, J. A. Cornie, and M. C. Flemings "Alloy Microstructures in Cast Metal Matrix Composites", Journal of Metals, vol. 38, No. 3, pp. 30-35, Mar. 1986.

A. Mortensen, J. A. Cornie, and M. C. Flemings, "Solidification Processing of Metal-Matrix Composites", Journal of Metals, vol. 40, No. 2, pp. 12-19, Feb. 1988.

B. D. Sparks and F. W. Meadus, "The Development of an Infiltrated Lead/Iron Composite Material For Use as a Non-toxic Bird Shot", Composites, pp. 37-39, Jan., 1978.

*Primary Examiner*—Mark Rosenbaum
*Assistant Examiner*—Rex E. Pelto
*Attorney, Agent, or Firm*—Mark G. Mortenson; Stanislav Antolin

[57] ABSTRACT

The present invention relates to a novel process for forming metal matrix composite bodies. Particularly, an infiltration enhancer and/or an infiltration enhancer precursor and/or an infiltrating atmosphere are in communication with a filler material or a preform, at least at some point during the process, which permits molten matrix metal to spontaneously infiltrate the filler material or preform. Such spontaneous infiltration occurs without the requirement for the application of any pressure or vacuum.

14 Claims, 38 Drawing Sheets

U.S PATENT DOCUMENTS

| | | | |
|---|---|---|---|
| 4,232,091 | 11/1980 | Grimshaw et al. | 428/472 |
| 4,376,803 | 3/1983 | Katzman | 428/408 |
| 4,376,804 | 3/1983 | Katzman | 428/408 |
| 4,450,207 | 5/1984 | Donomoto et al. | 428/614 |
| 4,473,103 | 9/1984 | Kenney et al. | 164/97 |
| 4,559,246 | 12/1985 | Jones | 427/299 |
| 4,570,316 | 2/1986 | Sakamaki et al. | 29/156.8 R |
| 4,630,665 | 12/1986 | Novak et al. | 164/97 |
| 4,657,065 | 4/1987 | Wada et al. | 164/461 |
| 4,662,429 | 5/1987 | Wada et al. | 164/461 |
| 4,673,435 | 6/1987 | Yamaguchi et al. | 75/235 |
| 4,713,111 | 12/1987 | Cameron et al. | 75/68 R |
| 4,753,690 | 6/1988 | Wada et al. | 148/11.5 A |
| 4,777,097 | 10/1988 | Kubo et al. | 428/614 |
| 4,802,524 | 2/1989 | Donomoto | 164/97 |
| 4,828,008 | 5/1989 | White et al. | 164/66.1 |
| 4,871,008 | 10/1989 | Dwivedi et al. | 164/6 |
| 4,932,099 | 6/1990 | Corwin | 164/97 |
| 5,016,703 | 5/1991 | Aghajanian | 164/101 |

171 170

171 170

METHOD OF FORMING METAL MATRIX COMPOSITE BODIES BY A SPONTANEOUS INFILTRATION PROCESS, AND PRODUCTS PRODUCED THEREFROM

CROSS-REFERENCE TO RELATED APPLICATIONS

This is a continuation of copending application Ser. No. 07/521,043 filed on May 9, 1990 now abandoned, which is a continuation-in-part application of commonly owned and copending U.S. patent application Ser. No. 07/484,753, now abandoned filed Feb. 23, 1990, which is a continuation-in-part of U.S. Pat. application Ser. No. 432,661. now abandoned, filed Nov. 7, 1989, which is a continuation-in-part application of U.S. patent application Ser. No. 416,327, now abandoned, filed Oct. 6, 1989, which is a continuation-in-part application of U.S. patent application Ser. No. 349,590, now abandoned filed May 9, 1989, which is a continuation-in-part application of U.S. patent application Ser. No. 269,311, now abandoned filed Nov. 10, 1988, all in the names of Michael K. Aghajanian et al., all of which are entitled "A Method of Forming Metal Matrix Composite Bodies by a Spontaneous Infiltration Process, and Products Produced Therefrom", the contents of which are herein expressly incorporated by reference.

1. Field of Invention

The present invention relates to a novel process for forming metal matrix composite bodies. Particularly, an infiltration enhancer and/or an infiltration enhancer precursor and/or an infiltrating atmosphere are in communication with a filler material or a preform, at least at some point during the process, which permits molten matrix metal to spontaneously infiltrate the filler material or preform. Such spontaneous infiltration occurs without the requirement for the application of any pressure or vacuum.

2. Background of the Invention

Composite products comprising a metal matrix and a strengthening or reinforcing phase such as ceramic particulates, whiskers, fibers or the like, show great promise for a variety of applications because they combine some of the stiffness and wear resistance of the reinforcing phase with the ductility and toughness of the metal matrix. Generally, a metal matrix composite will show an improvement in such properties as strength, stiffness, contact wear resistance, coefficient of thermal expansion (C.T.E.), density, thermal conductivity and elevated temperature strength retention relative to the matrix metal in monolithic form, but the degree to which any given property may be improved depends largely on the specific constituents, their volume or weight fraction, and how they are processed in forming the composite. In some instances, the composite also may be lighter in weight than the matrix metal per se. Aluminum matrix composites reinforced with ceramics such as silicon carbide in particulate, platelet, or whisker form, for example, are of interest because of their higher specific stiffness (e.g., elastic modulus over density), wear resistance, thermal conductivity, low coefficient of thermal expansion (C.T.E.) and high temperature strength and/or specific strength (e.g., strength over density) relative to aluminum.

Various metallurgical processes have been described for the fabrication of aluminum matrix composites, including methods based on powder metallurgy techniques and liquid-metal infiltration techniques which make use of pressure casting, vacuum casting, stirring, and wetting agents. With powder metallurgy techniques, the metal in the form of a powder and the reinforcing material in the form of a powder, whiskers, chopped fibers, etc., are admixed and then either cold-pressed and sintered, or hot-pressed. The maximum ceramic volume fraction in silicon carbide reinforced aluminum matrix composites produced by this method has been reported to be about 25 volume percent in the case of whiskers, and about 40 volume percent in the case of particulates.

The production of metal matrix composites by powder metallurgy techniques utilizing conventional processes imposes certain limitations with respect to the characteristics of the products attainable. The volume fraction of the ceramic phase in the composite is limited typically, in the case of particulates, to about 40 percent. Also, the pressing operation poses a limit on the practical size attainable. Only relatively simple product shapes are possible without subsequent processing (e.g., forming or machining) or without resorting to complex presses. Also, nonuniform shrinkage during sintering can occur, as well as nonuniformity of microstructure due to segregation in the compacts and grain growth.

U.S. Pat. No. 3,970,136, granted Jul. 20, 1976, to J. C. Cannell et al., describes a process for forming a metal matrix composite incorporating a fibrous reinforcement, e.g. silicon carbide or alumina whiskers, having a predetermined pattern of fiber orientation. The composite is made by placing parallel mats or felts of coplanar fibers in a mold with a reservoir of molten matrix metal, e.g., aluminum, between at least some of the mats, and applying pressure to force molten metal to penetrate the mats and surround the oriented fibers. Molten metal may be poured onto the stack of mats while being forced under pressure to flow between the mats. Loadings of up to about 50% by volume of reinforcing fibers in the composite have been reported.

The above-described infiltration process, in view of its dependence on outside pressure to force the molten matrix metal through the stack of fibrous mats, is subject to the vagaries of pressure-induced flow processes, i.e., possible non-uniformity of matrix formation, porosity, etc. Non-uniformity of properties is possible even though molten metal may be introduced at a multiplicity of sites within the fibrous array. Consequently, complicated mat/reservoir arrays and flow pathways need to be provided to achieve adequate and uniform penetration of the stack of fiber mats. Also, the aforesaid pressure-infiltration method allows for only a relatively low reinforcement to matrix volume fraction to be achieved because of the difficulty inherent in infiltrating a large mat volume. Still further, molds are required to contain the molten metal under pressure, which adds to the expense of the process. Finally, the aforesaid process, limited to infiltrating aligned particles or fibers, is not directed to formation of aluminum metal matrix composites reinforced with materials in the form of randomly oriented particles, whiskers or fibers.

In the fabrication of aluminum matrix-alumina filled composites, aluminum does not readily wet alumina, thereby making it difficult to form a coherent product. Various solutions to this problem have been suggested. One such approach is to coat the alumina with a metal (e.g., nickel or tungsten), which is then hot-pressed along with the aluminum. In another technique, the aluminum is alloyed with lithium, and the alumina may be coated with silica. However, these composites exhibit variations in properties, or the coatings can degrade the filler, or the matrix contains lithium which can affect the matrix properties.

U.S. Pat. No. 4,232,091 to R. W. Grimshaw et al., overcomes certain difficulties in the art which are encountered in the production of aluminum matrix-alumina composites. This patent describes applying pressures of 75-375 kg/cm$^2$ to force molten aluminum (or molten aluminum alloy) into a fibrous or whisker mat of alumina which has been preheated to 700° to 1050° C. The maximum volume ratio of alumina to metal in the resulting solid casting was 0.25/1. Because of its dependency on outside force to accomplish infiltration, this process is subject to many of the same deficiencies as that of Cannell et al.

European Patent Application Publication No. 115,742 describes making aluminum-alumina composites, especially useful as electrolytic cell components, by filling the voids of a preformed alumina matrix with molten aluminum. The application emphasizes the non-wettability of alumina by aluminum, and therefore various techniques are employed to wet the alumina throughout the preform. For example, the alumina is coated with a wetting agent of a diboride of titanium, zirconium, hafnium, or niobium, or with a metal, i.e., lithium, magnesium, calcium, titanium, chromium, iron, cobalt, nickel, zirconium, or hafnium. Inert atmospheres, such as argon, are employed to facilitate wetting. This reference also shows applying pressure to cause molten aluminum to penetrate an uncoated matrix. In this aspect, infiltration is accomplished by evacuating the pores and then applying pressure to the molten aluminum in an inert atmosphere, e.g., argon. Alternatively, the preform can be infiltrated by vapor-phase aluminum deposition to wet the surface prior to filling the voids by infiltration with molten aluminum. To assure retention of the aluminum in the pores of the preform, heat treatment, e.g., at 1400° to 1800° C., in either a vacuum or in argon is required. Otherwise, either exposure of the pressure infiltrated material to gas or removal of the infiltration pressure will cause loss of aluminum from the body.

The use of wetting agents to effect infiltration of an alumina component in an electrolytic cell with molten metal is also shown in European Patent Application Publication No. 94353. This publication describes production of aluminum by electrowinning with a cell having a cathodic current feeder as a cell liner or substrate. In order to protect this substrate from molten cryolite, a thin coating of a mixture of a wetting agent and solubility suppressor is applied to the alumina substrate prior to start-up of the cell or while immersed in the molten aluminum produced by the electrolytic process. Wetting agents disclosed are titanium, zirconium, hafnium, silicon, magnesium, vanadium, chromium, niobium, or calcium, and titanium is stated as the preferred agent. Compounds of boron, carbon and nitrogen are described as being useful in suppressing the solubility of the wetting agents in molten aluminum. The reference, however, does not suggest the production of metal matrix composites, nor does it suggest the formation of such a composite in, for example, a nitrogen atmosphere.

In addition to application of pressure and wetting agents, it has been disclosed that an applied vacuum will aid the penetration of molten aluminum into a porous ceramic compact. For example, U.S. Pat. No. 3,718,441, granted Feb. 27, 1973, to R. L. Landingham, reports infiltration of a ceramic compact (e.g., boron carbide, alumina and beryllia) with either molten aluminum, beryllium, magnesium, titanium, vanadium, nickel or chromium under a vacuum of less than 10$^{-6}$ torr. A vacuum of 10$^{-2}$ to 10$^{-6}$ torr resulted in poor wetting of the ceramic by the molten metal to the extent that the metal did not flow freely into the ceramic void spaces. However, wetting was said to have improved when the vacuum was reduced to less than 10$^{-6}$ torr.

U.S. Pat. No. 3,864,154, granted Feb. 4, 1975, to G. E. Gazza et al., also shows the use of vacuum to achieve infiltration. This patent describes loading a cold-pressed compact of AlB$_{12}$ powder onto a bed of cold-pressed aluminum powder. Additional aluminum was then positioned on top of the AlB$_{12}$ powder compact. The crucible, loaded with the AlB$_{12}$ compact "sandwiched" between the layers of aluminum powder, was placed in a vacuum furnace. The furnace was evacuated to approximately 10$^{-5}$ torr to permit outgassing. The temperature was subsequently raised to 1100° C. and maintained for a period of 3 hours. At these conditions, the molten aluminum penetrated the porous AlB$_{12}$ compact.

U.S. Pat. No. 3,364,976, granted Jan. 23, 1968 to John N. Reding et al., discloses the concept of creating a self-generated vacuum in a body to enhance penetration of a molten metal into the body. Specifically, it is disclosed that a body, e.g., a graphite mold, a steel mold, or a porous refractory material, is entirely submerged in a molten metal. In the case of a mold, the mold cavity, which is filled with a gas reactive with the metal, communicates with the externally located molten metal through at least one orifice in the mold. When the mold is immersed into the melt, filling of the cavity occurs as the self-generated vacuum is produced from the reaction between the gas in the cavity and the molten metal. Particularly, the vacuum is a result of the formation of a solid oxidized form of the metal. Thus, Reding et al. disclose that it is essential to induce a reaction between gas in the cavity and the molten metal. However, utilizing a mold to create a vacuum may be undesirable because of the inherent limitations associated with use of a mold. Molds must first be machined into a particular shape; then finished, machined to produce an acceptable casting surface on the mold; then assembled prior to their use; then disassembled after their use to remove the cast piece therefrom; and thereafter reclaim the mold, which most likely would include refinishing surfaces of the mold or discarding the mold if it is no longer acceptable for use. Machining of a mold into a complex shape can be very costly and time-consuming. Moreover, removal of a formed piece from a complex-shaped mold can also be difficult (i.e., cast pieces having a complex shape could be broken when removed from the mold). Still further, while there is a suggestion that a porous refractory material can be immersed directly in a molten metal without the need for a mold, the refractory material would have to be an integral piece because there is no provision for infiltrating a loose or separated porous material absent the use of a container mold (i.e., it is generally believed that the particulate material would typically disassociate or float apart when placed in a molten metal). Still further, if it was desired to infiltrate a particulate material or loosely formed preform, precautions should be taken so that the infiltrating metal does not displace at least portions of the particulate or preform resulting in a non-homogeneous microstructure.

Accordingly, there has been a long felt need for a simple and reliable process to produce shaped metal matrix composites which does not rely upon the use of applied pressure or vacuum (whether externally applied or internally created), or damaging wetting agents to create a metal matrix embedding another material such as a ceramic material. Moreover, there has been a long felt need to minimize the amount of final machining operations needed to produce a metal matrix composite body. The present invention satisfies these needs by providing a spontaneous infiltration mechanism for infiltrating a material (e.g., a ceramic material), which can be formed into a preform, with molten matrix metal (e.g., aluminum) in the presence of an infiltrating atmosphere (e.g., nitrogen) under normal atmospheric pressures so long as an infiltration enhancer precursor and/or infiltration enhancer is present at least at some point during the process.

DESCRIPTION OF COMMONLY OWNED U.S. PATENT APPLICATIONS

The subject matter of this application is related to that of several other copending and co-owned patent applications. Particularly, these other copending patent applications describe novel methods for making metal matrix composite materials (hereinafter sometimes referred to as "Commonly Owned Metal Matrix Patent Applications").

A novel method of making a metal matrix composite material is disclosed in Commonly Owned U.S. patent application Ser. No. 049,171, filed May 13, 1987, in the names of White et al., and entitled "Metal Matrix Composites", now U.S. Pat. No. 4,828,008, which issued on May 9, 1989, and which published in the EPO on Nov. 17, 1988, as Publication No. 0291441. According to the method of the White et al. invention, a metal matrix composite is produced by infiltrating a permeable mass of filler material (e.g., a ceramic or a ceramic-coated material) with molten aluminum containing at least about 1 percent by weight magnesium, and preferably at least about 3 percent by weight magnesium. Infiltration occurs spontaneously without the application of external pressure or vacuum. A supply of the molten metal alloy is contacted with the mass of filler material at a temperature of at least about 675° C. in the presence of a gas comprising from about 10 to 100 percent, and preferably at least about 50 percent, nitrogen by volume, and a remainder of the gas, if any, being a nonoxidizing gas, e.g., argon. Under these conditions, the molten aluminum alloy infiltrates the ceramic mass under normal atmospheric pressures to form an aluminum (or aluminum alloy) matrix composite. When the desired amount of filler material has been infiltrated with the molten aluminum alloy, the temperature is lowered to solidify the alloy, thereby forming a solid metal matrix structure that embeds the reinforcing filler material. Usually, and preferably, the supply of molten alloy delivered will be sufficient to permit the infiltration to proceed essentially to the boundaries of the mass of filler material. The amount of filler material in the aluminum matrix composites produced according to the White et al. invention may be exceedingly high. In this respect, filler to alloy volumetric ratios of greater than 1:1 may be achieved.

Under the process conditions in the aforesaid White et al. invention, aluminum nitride can form as a discontinuous phase dispersed throughout the aluminum matrix. The amount of nitride in the aluminum matrix may vary depending on such factors as temperature, alloy composition, gas composition and filler material. Thus, by controlling one or more such factors in the system, it is possible to tailor certain properties of the composite. For some end use applications, however, it may be desirable that the composite contain little or substantially no aluminum nitride.

It has been observed that higher temperatures favor infiltration but render the process more conducive to nitride formation. The White et al. invention allows the choice of a balance between infiltration kinetics and nitride formation.

An example of suitable barrier means for use with metal matrix composite formation is described in Commonly Owned U.S. patent application Ser. No. 141,642, filed Jan. 7, 1988, in the names of Michael K. Aghajanian et al., and entitled "Method of Making Metal Matrix Composite with the Use of a Barrier", which issued on Jun. 19, 1990, as U.S. Pat. No. 4,935,055, and published in the EPO on Jul. 12, 1989, as Publication No. 0323945. According to the method of this Aghajanian et al. invention, a barrier means (e.g., particulate titanium diboride or a graphite material such as a flexible graphite foil product sold by Union Carbide under the trade name Grafoil®) is disposed on a defined surface boundary of a filler material and matrix alloy infiltrates up to the boundary defined by the barrier means. The barrier means is used to inhibit, prevent, or terminate infiltration of the molten alloy, thereby providing net, or near net, shapes in the resultant metal matrix composite. Accordingly, the formed metal matrix composite bodies have an outer shape which substantially corresponds to the inner shape of the barrier means.

The method of U.S. Pat. No. 4,828,008, which issued on May 9, 1989, was improved upon by Commonly Owned and Copending U.S. patent application Ser. No. 168,284, now abandoned filed Mar. 15, 1988, in the names of Michael K. Aghajanian and Marc S. Newkirk and entitled "Metal Matrix Composites and Techniques for Making the Same." In accordance with the methods disclosed in this U.S. Patent Application, a matrix metal alloy is present as a first source of metal and as a reservoir of matrix metal alloy which communicates with the first source of molten metal due to, for example, gravity flow. Particularly, under the conditions described in this patent application, the first source of molten matrix alloy begins to infiltrate the mass of filler material under normal atmospheric pressures and thus begins the formation of a metal matrix composite. The first source of molten matrix metal alloy is consumed during its infiltration into the mass of filler material and, if desired, can be replenished, preferably by a continuous means, from the reservoir of molten matrix metal as the spontaneous infiltration continues. When a desired amount of permeable filler has been spontaneously infiltrated by the molten matrix alloy, the temperature is lowered to solidify the alloy, thereby forming a solid metal matrix structure that embeds the reinforcing filler material. It should be understood that the use of a reservoir of metal is simply one embodiment of the invention described in this patent application and it is not necessary to combine the reservoir embodiment with each of the alternate embodiments of the invention disclosed therein, some of which could also be beneficial to use in combination with the present invention.

The reservoir of metal can be present in an amount such that it provides for a sufficient amount of metal to infiltrate the permeable mass of filler material to a predetermined extent. Alternatively, an optional barrier means can contact the permeable mass of filler on at least one side thereof to define a surface boundary.

Moreover, while the supply of molten matrix alloy delivered should be at least sufficient to permit spontaneous infiltration to proceed essentially to the boundaries (e.g., barriers) of the permeable mass of filler material, the amount of alloy present in the reservoir could exceed such sufficient amount so that not only will there be a sufficient amount of alloy for complete infiltration, but excess molten metal alloy could remain and be attached to the metal matrix composite body. Thus, when excess molten alloy is present, the resulting body will be a complex composite body (e.g., a macrocomposite), wherein an infiltrated ceramic body having a metal matrix therein will be directly bonded to excess metal remaining in the reservoir.

Each of the above-discussed Commonly Owned Metal Matrix Patents and Patent Applications describes methods for the production of metal matrix composite bodies and novel metal matrix composite bodies which are produced therefrom. The entire disclosures of all of the foregoing Commonly Owned Metal Matrix Patents and Patent Applications are expressly incorporated herein by reference.

SUMMARY OF THE INVENTION

A metal matrix composite body is produced by spontaneously infiltrating a permeable mass of filler material or a preform with a molten matrix metal. Specifically, an infiltration enhancer and/or an infiltration enhancer precursor and/or an infiltrating atmosphere are in communication with the filler material or preform, at least at some point during the process, which permits molten matrix metal to spontaneously infiltrate the filler material or preform.

In a first preferred embodiment, a precursor to an infiltration enhancer may be supplied to at least one of, a filler material or preform, and/or a matrix metal and/or an infiltrating atmosphere. The supplied infiltration enhancer precursor may thereafter react with at least one of the filler material or preform and/or the matrix metal and/or the infiltrating atmosphere to produce infiltration enhancer in at least a portion of, or on, the filler material or preform. Ultimately, at least during the spontaneous infiltration, infiltration enhancer should be in contact with at least a portion of the filler material or preform.

In another preferred embodiment of the invention, rather than supplying an infiltration enhancer precursor, an infiltration enhancer may be supplied directly to at least one of the preform, and/or matrix metal, and/or infiltrating atmosphere. Ultimately, at least during the spontaneous infiltration, the infiltration enhancer should be in contact with at least a portion of the filler material or preform.

This application discusses various examples of matrix metals, which at some point during the formation of a metal matrix composite, are contacted with an infiltration enhancer precursor, in the presence of an infiltrating atmosphere. Thus, various references will be made to particular matrix metal/infiltration enhancer precursor/infiltrating atmosphere systems which exhibit spontaneous infiltration. However, it is conceivable that many other matrix metal/infiltration enhancer precursor/infiltrating atmosphere systems other than those discussed in this application may behave in a manner similar to the systems discuss above herein. Specifically, spontaneous infiltration behavior has been observed in the aluminum/magnesium/nitrogen system; the aluminum/strontium/nitrogen system; the aluminum/zinc/oxygen system; and the aluminum/calcium/nitrogen system. Accordingly, even though this application discusses only those systems referred to above herein, it should be understood that other matrix metal/infiltration enhancer precursor/infiltrating atmosphere systems may behave in a similar manner.

In a preferred embodiment for achieving spontaneous infiltration into a permeable mass of filler material or a preform, molten matrix metal is contacted with the preform or filler material. The preform or filler material may have admixed therewith, and/or at some point during the process, be exposed to, an infiltration enhancer precursor. Moreover, in a preferred embodiment, the molten matrix metal and/or preform or filler material communicate with an infiltrating atmosphere for at least a portion of the process. In another preferred embodiment, the matrix metal and/or preform or filler material communicate with an infiltrating atmosphere for substantially all of the process. The preform or filler material will be spontaneously infiltrated by molten matrix metal, and the extent or rate of spontaneous infiltration and formation of metal matrix composite will vary with a given set of processing conditions including, for example, the concentration of infiltration enhancer precursor provided to the system (e.g., in the molten matrix alloy and/or in the filler material or preform and/or in the infiltrating atmosphere), the size and/or composition of the filler material, the size and/or composition of particles in the preform, the available porosity for infiltration into the preform or filler material, the time permitted for infiltration to occur, and/or the temperature at which infiltration occurs. Spontaneous infiltration typically occurs to an extent sufficient to embed substantially completely the preform or filler material.

Moreover, by varying the composition of the matrix metal and/or the processing conditions, the physical and mechanical properties of the formed metal matrix composite bodies may be engineered to any particular application or need. Further, by subjecting a formed metal matrix composite body to a post treatment process (e.g., directional solidification, heat treatment, etc.) the mechanical and/or physical properties may be further engineered to meet any particular application or need. Still further, by controlling the processing conditions during the formation of a metal matrix composite the nitrogen content of the formed metal matrix composite may be tailored to meet a wide range of industrial applications.

Moreover, by controlling the composition and/or size (e.g., particle diameter) and/or geometry of the filler material or the material comprising the preform, the physical and/or mechanical properties of the formed metal matrix composite can be controlled or engineered to meet any number of industrial needs. For example, it has been discovered that wear resistance of the metal matrix composite can be increased by increasing the size of the filler material (e.g., increasing the average diameter of the filler material particles), given that the wear resistance of filler material is higher than that of the matrix metal. However, strength and/or toughness may tend to increase with decreasing filler size. Further, the thermal expansion coefficient of the metal matrix composite may decrease with increasing filler loading, given that the coefficient of thermal expansion of the filler is lower than the coefficient of thermal expansion of the matrix metal. Still further, the mechanical and/or physical properties (e.g., density, elastic and/or specific modulus, strength and/or specific strength, etc.) of a formed metal matrix composite body may be tailored depending on the loading of the filler material in the loose mass or in the preform. For example, by providing a loose mass or preform comprising a mixture of filler particles of varying sizes and/or shapes, wherein the density of the filler is greater than that of the matrix metal, a higher filler loading, due to enhanced packing of the filler material, may be achieved, thereby resulting in a metal matrix composite body with an increased density. By utilizing the teachings of the present invention, the volume percent of filler material or preform which can be infiltrated can vary over a wide range. The lower volume percent of filler that can be infiltrated is limited primarily by the ability to form a porous filler material or preform, (e.g., about 10 volume percent); whereas the higher volume percent of filler or preform that can be infiltrated is limited primarily by the ability to form a dense filler material or preform with at least some interconnected porosity (e.g., about 95 volume percent). Accordingly, by practicing any of the above teachings, alone or in combination, a metal matrix composite can be engineered to contain a desired combination of properties.

Definitions

"Aluminum", as used herein, means and includes essentially pure metal (e.g., a relatively pure, commercially available unalloyed aluminum) or other grades of metal and metal alloys such as the commercially available metals having impurities and/or alloying constituents such as iron, silicon, copper, magnesium, manganese, chromium, zinc, etc., therein. An aluminum alloy for purposes of this definition is an alloy or intermetallic compound in which aluminum is the major constituent.

"Balance Non-Oxidizing Gas", as used herein, means that any gas present in addition to the primary gas comprising the infiltrating atmosphere, is either an inert gas or a reducing gas which is substantially non-reactive with the matrix metal under the process conditions. Any oxidizing gas which may be present as an impurity in the gas(es) used should be insufficient to oxidize the matrix metal to any substantial extent under the process conditions.

"Barrier" or "barrier means", as used herein, means any suitable means which interferes, inhibits, prevents or terminates the migration, movement, or the like, of molten matrix metal beyond a surface boundary of a permeable mass of filler material or preform, where such surface boundary is defined by said barrier means. Suitable barrier means may be any such material, compound, element, composition, or the like, which, under the process conditions, maintains some integrity and is not substantially volatile (i.e., the barrier material does not volatilize to such an extent that it is rendered nonfunctional as a barrier).

Further, suitable "barrier means" includes materials which are substantially non-wettable by the migrating molten matrix metal under the process conditions employed. A barrier of this type appears to exhibit substantially little or no affinity for the molten matrix metal, and movement beyond the defined surface boundary of the mass of filler material or preform is prevented or inhibited by the barrier means. The barrier reduces any final machining or grinding that may be required and defines at least a portion of the surface of the resulting metal matrix composite product. The barrier may in certain cases be permeable or porous, or rendered permeable by, for example, drilling holes or puncturing the barrier, to permit gas to contact the molten matrix metal, etc.

"Carcass" or "Carcass of Matrix Metal", as used herein, refers to any of the original body of matrix metal remaining which has not been consumed during formation of the metal matrix composite body, and typically, if allowed to cool, remains in at least partial contact with the metal matrix composite body which has been formed. It should be understood that the carcass may also include a second or foreign metal therein.

"Filler", as used herein, is intended to include either single constituents or mixtures of constituents which are substantially nonreactive with and/or of limited solubility in the matrix metal and may be single or multi-phase. Fillers may be provided in a wide variety of forms and sizes, such as powders, flakes, platelets, microspheres, whiskers, bubbles, etc., and may be either dense or porous. "Filler" may also include ceramic fillers, such as alumina or silicon carbide as fibers, chopped fibers, particulates, whiskers, bubbles, spheres, fiber mats, or the like, and ceramic-coated fillers such as carbon fibers coated with alumina or silicon carbide to protect the carbon from attack, for example, by a molten aluminum parent metal. Fillers may also include metals.

"Hot-Topping", as used herein, refers to the placement of a substance on one end (the "topping" end) of an at least partially formed metal matrix composite which reacts exothermally with at least one of the matrix metal and/or filler material and/or with another material supplied to the topping end. This exothermic reaction should provide sufficient heat to maintain the matrix metal at the topping end in a molten state while the balance of the matrix metal in the composite cools to solidification temperature.

"Infiltrating Atmosphere", as used herein, means that atmosphere which is present which interacts with the matrix metal and/or preform (or filler material) and/or infiltration enhancer precursor and/or infiltration enhancer and permits or enhances spontaneous infiltration of the matrix metal to occur.

"Infiltration Enhancer", as used herein, means a material which promotes or assists in the spontaneous infiltration of a matrix metal into a filler material or preform. An infiltration enhancer may be formed from, for example, a reaction of an infiltration enhancer precursor with an infiltrating atmosphere to form (1) a gaseous species and/or (2) a reaction product of the infiltration enhancer precursor and the infiltrating atmosphere and/or (3) a reaction product of the infiltration enhancer precursor and the filler material or preform. Moreover, the infiltration enhancer may be supplied directly to at least one of the preform, and/or matrix metal, and/or infiltrating atmosphere and function in a substantially similar manner to an infiltration enhancer which has formed as a reaction between an infiltration enhancer precursor and another species. Ultimately, at least during the spontaneous infiltration, the infiltration enhancer should be located in at least a portion of the filler material or preform to achieve spontaneous infiltration.

"Infiltration Enhancer Precursor" or "Precursor to the Infiltration Enhancer", as used herein, means a material which when used in combination with the matrix metal, preform and/or infiltrating atmosphere forms an infiltration enhancer which induces or assists the matrix metal to spontaneously infiltrate the filler material or preform. Without wishing to be bound by any particular theory or explanation, it appears as though it may be necessary for the precursor to the infiltration enhancer to be capable of being positioned, located or transportable to a location which permits the infiltration enhancer precursor to interact with the infiltrating atmosphere and/or the preform or filler material and/or matrix metal. For example, in some matrix metal/infiltration enhancer precursor/infiltrating atmosphere systems, it is desirable for the infiltration enhancer precursor to volatilize at, near, or in some cases, even somewhat above the temperature at which the matrix metal becomes molten. Such volatilization may lead to: (1) a reaction of the infiltration enhancer precursor with the infiltrating atmosphere to form a gaseous species which enhances wetting of the filler material or preform by the matrix metal; and/or (2) a reaction of the infiltration enhancer precursor with the infiltrating atmosphere to form a solid, liquid or gaseous infiltration enhancer in at least a portion of the filler material or preform which enhances wetting; and/or (3) a reaction of the infiltration enhancer precursor within the filler material or preform which forms a solid, liquid or gaseous infiltration enhancer in at least a portion of the filler material or preform which enhances wetting.

"Matrix Metal" or "Matrix Metal Alloy", as used herein, means that metal which is utilized to form a metal matrix composite (e.g., before infiltration) and/or that metal which is intermingled with a filler material to form a metal matrix composite body (e.g., after infiltration). When a specified metal is mentioned as the matrix metal, it should be understood that such matrix metal includes that metal as an essentially pure metal, a commercially available metal having impurities and/or alloying constituents therein, an intermetallic compound or an alloy in which that metal is the major or predominant constituent.

"Matrix Metal/Infiltration Enhancer Precursor/Infiltrating Atmosphere System" or "Spontaneous System", as used herein, refers to that combination of materials which exhibit spontaneous infiltration into a preform or filler material. It should be understood that whenever a "/" appears between an exemplary matrix metal, infiltration enhancer precursor and infiltrating atmosphere that the "/" is used to designate a system or combination of materials which, when combined in a particular manner, exhibits spontaneous infiltration into a preform or filler material.

"Metal Matrix Composite" or "MMC", as used herein, means a material comprising a two- or three-dimensionally interconnected alloy or matrix metal which has embedded a preform or filler material. The matrix metal may include various alloying elements to provide specifically desired mechanical and physical properties in the resulting composite.

A Metal "Different" from the Matrix Metal means a metal which does not contain, as a primary constituent, the same metal as the matrix metal (e.g., if the primary constituent of the matrix metal is aluminum, the "different" metal could have a primary constituent of, for example, nickel).

"Nonreactive Vessel for Housing Matrix Metal" means any vessel which can house or contain a filler material (or preform) and/or molten matrix metal under the process conditions and not react with the matrix and/or the infiltrating atmosphere and/or infiltration enhancer precursor and/or a filler material or preform in a manner which would be significantly detrimental to the spontaneous infiltration mechanism. The nonreactive vessel may be disposable and removable after the spontaneous infiltration of the molten matrix metal has been completed.

"Preform" or "Permeable Preform", as used herein, means a porous mass of filler or filler material which is manufactured with at least one surface boundary which essentially defines a boundary for infiltrating matrix metal, such mass retaining sufficient shape integrity and green strength to provide dimensional fidelity prior to being infiltrated by the matrix metal. The mass should be sufficiently porous to accommodate spontaneous infiltration of the matrix metal thereinto. A preform typically comprises a bonded array or arrangement of filler, either homogeneous or heterogeneous, and may be comprised of any suitable material (e.g., ceramic and/or metal particulates, powders, fibers, whiskers, etc., and any combination thereof). A preform may exist either singularly or as an assemblage.

"Reservoir", as used herein, means a separate body of matrix metal positioned relative to a mass of filler or a preform so that, when the metal is molten, it may flow to replenish, or in some cases to initially provide and subsequently replenish, that portion, segment or source of matrix metal which is in contact with the filler or preform.

"Spontaneous Infiltration", as used herein, means the infiltration of matrix metal into the permeable mass of filler or preform occurs without requirement for the application of pressure or vacuum (whether externally applied or internally created).

BRIEF DESCRIPTION OF THE FIGURES

The following Figures are provided to assist in understanding the invention, but are not intended to limit the scope of the invention. Similar reference numerals have been used wherever possible in each of the Figures to denote like components, wherein:

FIG. 17a is a photomicrograph of the metal matrix composite corresponding to Sample A;

FIG. 17b is a photomicrograph of the metal matrix composite corresponding to Sample B;

FIG. 17c is a photomicrograph of the metal matrix composite corresponding to Sample C;

FIG. 17d is a photomicrograph of the metal matrix composite corresponding to Sample D;

FIG. 17e is a photomicrograph of the metal matrix composite corresponding to Sample E;

FIG. 17f is a photomicrograph of the metal matrix composite corresponding to Sample F;

FIG. 17g is a photomicrograph of the metal matrix composite corresponding to Sample G;

FIG. 17h is a photomicrograph of the metal matrix composite corresponding to with Sample H;

FIG. 17i is a photomicrograph of the metal matrix composite corresponding to with Sample I;

FIG. 21a is a photomicrograph of the metal matrix composite body corresponding to Sample J;

FIG. 21b is a photomicrograph of the metal matrix composite body corresponding to Sample N;

FIG. 21c is a photomicrograph of the metal matrix composite body corresponding to Sample O;

FIG. 22a is a photomicrograph of the metal matrix composite body corresponding to Sample Q;

FIG. 22o is a photomicrograph of the metal matrix composite body corresponding to Sample AH;

FIG. 23a is a photomicrograph of the metal matrix composite body corresponding to Sample AO;

FIG. 23b is a photomicrograph of the metal matrix composite body corresponding to Sample AP;

FIG. 23c is a photomicrograph of the metal matrix composite body corresponding to Sample AQ;

FIG. 23d is a photomicrograph of the metal matrix composite body corresponding to Sample AR;

FIG. 23e is a photomicrograph of the metal matrix composite body corresponding to Sample AS;

FIG. 23f is a photomicrograph of the metal matrix composite body corresponding to Sample AT;

FIG. 23g is a photomicrograph of the metal matrix composite body corresponding to Sample AU;

FIG. 23h is a photomicrograph of the metal matrix composite body corresponding to Sample AV;

FIG. 24a is a photomicrograph of the metal matrix composite body corresponding to Sample BT;

FIG. 24b is a photomicrograph of the metal matrix composite body corresponding to Sample BU;

FIG. 24c is a photomicrograph of the metal matrix composite body corresponding to Sample BV;

FIGS. 37a and 37b collectively show a schematic cross-sectional representation of a lay-up for producing a spontaneously infiltrated metal matrix composite according to Example 28.

DETAILED DESCRIPTION OF THE INVENTION AND PREFERRED EMBODIMENTS

The present invention relates to forming a metal matrix composite by spontaneously infiltrating a filler material or preform with molten matrix metal. Particularly, an infiltration enhancer and/or an infiltration enhancer precursor and/or an infiltrating atmosphere are in communication with the filler material or preform, at least at some point during the process, which permits molten matrix metal to spontaneously infiltrate the filler material or preform.

Figure 1:
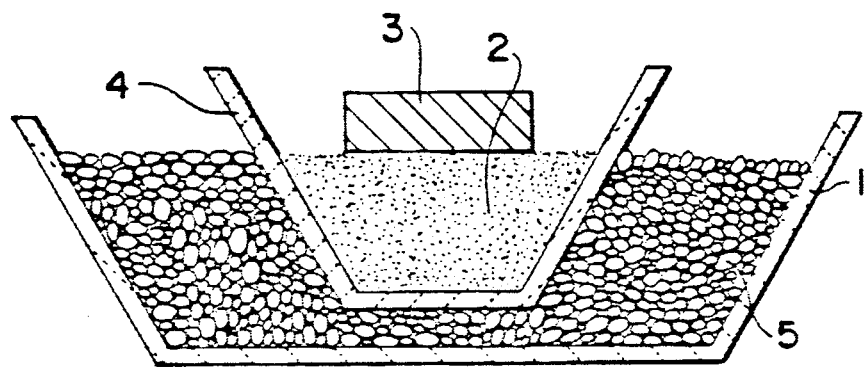
FIG. 1 is a schematic cross-sectional representation of a lay-up for producing a spontaneously infiltrated metal matrix composite.

With reference to FIG. 1, a simple lay-up 10 for forming a spontaneously infiltrated metal matrix composite is illustrated. Specifically, a filler or preform 1, which may be of any suitable material, as discussed in detail below, is placed in a non-reactive vessel 2 for housing matrix metal and/or filler material. A matrix metal 3 is placed on or adjacent to the filler or preform 1. The lay-up is thereafter placed in a furnace to initiate spontaneous infiltration.

Without wishing to be bound by any particular theory or explanation, when an infiltration enhancer precursor is utilized in combination with at least one of the matrix metal, and/or filler material or preform and/or infiltrating atmosphere, the infiltration enhancer precursor may react to form an infiltration enhancer which induces or assists molten matrix metal to spontaneously infiltrate a filler material or preform. Moreover, it appears as though it may be necessary for the precursor to the infiltration enhancer to be capable of being positioned, located or transportable to a location which permits the infiltration enhancer precursor to interact with at least one of the infiltrating atmosphere, and/or the preform or filler material, and/or molten matrix metal. For example, in some matrix metal/infiltration enhancer precursor/infiltrating atmosphere systems, it is desirable for the infiltration enhancer precursor to volatilize at, near, or in some cases, even somewhat above the temperature at which the matrix metal becomes molten. Such volatilization may lead to: (1) a reaction of the infiltration enhancer precursor with the infiltrating atmosphere to form a gaseous species which enhances wetting of the filler material or preform by the matrix metal; and/or (2) a reaction of the infiltration enhancer precursor with the infiltrating atmosphere to form a solid, liquid or gaseous infiltration enhancer in at least a portion of the filler material or preform which enhances wetting; and/or (3) a reaction of the infiltration enhancer precursor within the filler material or preform which forms a solid, liquid or gaseous infiltration enhancer in at least a portion of the filler material or preform which enhances wetting.

Thus, for example, if an infiltration enhancer precursor was included or combined with, at least at some point during the process, molten matrix metal, it is possible that the infiltration enhancer could volatilize from the molten matrix metal and react with at least one of the filler material or preform and/or the infiltrating atmosphere. Such reaction could result in the formation of a solid species, if such solid species was stable at the infiltration temperature, said solid species being capable of being deposited on at least a portion of the filler material or preform as, for example, a coating. Moreover, it is conceivable that such solid species could be present as a discernable solid within at least a portion of the preform or filler material. If such a solid species was formed, molten matrix metal may have a tendency to react (e.g., the molten matrix metal may reduce the formed solid species) such that infiltration enhancer precursor may become associated with (e.g., dissolved in or alloyed with) the molten matrix metal. Accordingly, additional infiltration enhancer precursor may then be available to volatilize and react with another species (e.g., the filler material or preform and/or infiltrating atmosphere) and again form a similar solid species. It is conceivable that a continuous process of conversion of infiltration enhancer precursor to infiltration enhancer followed by a reduction reaction of the infiltration enhancer with molten matrix metal to again form additional infiltration enhancer, and so on, could occur, until the result achieved is a spontaneously infiltrated metal matrix composite.

In order to effect spontaneous infiltration of the matrix metal into the filler material or preform, an infiltration enhancer should be provided to the spontaneous system. An infiltration enhancer could be formed from an infiltration enhancer precursor which could be provided (1) in the matrix metal; and/or (2) in the filler material or preform; and/or (3) from the infiltrating atmosphere; and/or (4) from an external source into the spontaneous system. Moreover, rather than supplying an infiltration enhancer precursor, an infiltration enhancer may be supplied directly to at least one of the filler material or preform, and/or matrix metal, and/or infiltrating atmosphere. Ultimately, at least during the spontaneous infiltration, the infiltration enhancer should be located in at least a portion of the filler material or preform.

In a preferred embodiment of the invention, it is possible that the infiltration enhancer precursor can be at least partially reacted with the infiltrating atmosphere such that the infiltration enhancer can be formed in at least a portion of the filler material or preform prior to or substantially contiguous with contacting the filler material or preform with the matrix metal (e.g., if magnesium was the infiltration enhancer precursor and nitrogen was the infiltrating atmosphere, the infiltration enhancer could be magnesium nitride which would be located in at least a portion of the preform or filler material).

An example of a matrix metal/infiltration enhancer precursor/infiltrating atmosphere system is the aluminum/magnesium/nitrogen system. Specifically, an aluminum matrix metal can be contained within a suitable refractory vessel which, under the process conditions, does not adversely react with the aluminum matrix metal and/or the filler material when the aluminum is made molten. A filler material or preform can thereafter be contacted with molten aluminum matrix metal and spontaneously infiltrated.

Moreover, rather than supplying an infiltration enhancer precursor, an infiltration enhancer may be supplied directly to at least one of the preform or filler material, and/or matrix metal, and/or infiltrating atmosphere. Ultimately, at least during the spontaneous infiltration, the infiltration enhancer should be located in at least a portion of the filler material or preform.

Under the conditions employed in the method of the present invention, in the case of an aluminum/magnesium/nitrogen spontaneous infiltration system, the preform or filler material should be sufficiently permeable to permit the nitrogen-containing gas to penetrate or permeate the filler material or preform at some point during the process and/or contact the molten matrix metal. Moreover, the permeable filler material or preform can accommodate infiltration of the molten matrix metal, thereby causing the nitrogen-permeated preform to be infiltrated spontaneously with molten matrix metal to form a metal matrix composite body and/or cause the nitrogen to react with an infiltration enhancer precursor to form infiltration enhancer in the filler material or preform and thereby result in spontaneous infiltration. The extent of spontaneous infiltration and formation of the metal matrix composite will vary with a given set of process conditions, including magnesium content of the aluminum alloy, magnesium content of the preform or filler material, amount of magnesium nitride in the preform or filler material, the presence of additional alloying elements (e.g., silicon, iron, copper, manganese, chromium, zinc, and the like), average size of the filler material (e.g., particle diameter) comprising the preform or the filler material, surface condition and type of filler material or preform, nitrogen concentration of the infiltrating atmosphere, time permitted for infiltration and temperature at which infiltration occurs. For example, for infiltration of the molten aluminum matrix metal to occur spontaneously, the aluminum can be alloyed with at least about 1 percent by weight, and preferably at least about 3 percent by weight, magnesium (which functions as the infiltration enhancer precursor), based on alloy weight. Auxiliary alloying elements, as discussed above, may also be included in the matrix metal to tailor specific properties thereof. Additionally, the auxiliary alloying elements may affect the minimum amount of magnesium required in the matrix aluminum metal to result in spontaneous infiltration of the filler material or preform. Loss of magnesium from the spontaneous system due to, for example, volatilization should not occur to such an extent that no magnesium was present to form infiltration enhancer. Thus, it is desirable to utilize a sufficient amount of initial alloying elements to assure that spontaneous infiltration will not be adversely affected by volatilization. Still further, the presence of magnesium in both of the preform (or filler material) and matrix metal or the preform (or filler material) alone may result in a reduction in required amount of magnesium to achieve spontaneous infiltration (discussed in greater detail later herein).

The volume percent of nitrogen in the infiltrating atmosphere also affects formation rates of the metal matrix composite body. Specifically, if less than about 10 volume percent of nitrogen is present in the atmosphere, very slow or little spontaneous infiltration will occur. It has been discovered that it is preferable for at least about 50 volume percent of nitrogen to be present in the atmosphere, thereby resulting in, for example, shorter infiltration times due to a much more rapid rate of infiltration. The infiltrating atmosphere (e.g., a nitrogen-containing gas) can be supplied directly to the filler material or preform and/or matrix metal, or it may be produced or result from a decomposition of a material.

The minimum magnesium content required for the Molten matrix metal is to infiltrate a filler material or preform depends on one or more variables such as the processing temperature, time, the presence of auxiliary alloying elements such as silicon or zinc, the nature of the filler material, the location of the magnesium in one or more components of the spontaneous system, the nitrogen content of the atmosphere, and the rate at which the nitrogen atmosphere flows. Lower temperatures or shorter heating times can be used to obtain complete infiltration as the magnesium content of the alloy and/or preform is increased. Also, for a given magnesium content, the addition of certain auxiliary alloying elements such as zinc permits the use of lower temperatures. For example, a magnesium content of the matrix metal at the lower end of the operable range, e.g., from about 1 to 3 weight percent, may be used in conjunction with at least one of the following: an above-minimum processing temperature, a high nitrogen concentration, or one or more auxiliary alloying elements. When no magnesium is added to the preform, alloys containing from about 3 to 5 weight percent magnesium are preferred on the basis of their general utility over a wide variety of process conditions, with at least about 5 percent being preferred when lower temperatures and shorter times are employed. Magnesium contents in excess of about 10 percent by weight of the aluminum alloy may be employed to moderate the temperature conditions required for infiltration. The magnesium content may be reduced when used in conjunction with an auxiliary alloying element, but these elements serve an auxiliary function only and are used together with at least the above-specified minimum amount of magnesium. For example, there was substantially no infiltration of nominally pure aluminum alloyed only with 10 percent silicon at 1000° C. into a bedding of 500 mesh, 39 Crystolon (99 percent pure silicon carbide from Norton Co.). However, in the presence of magnesium, silicon has been found to promote the infiltration process. As a further example, the amount of magnesium varies if it is supplied exclusively to the preform or filler material. It has been discovered that spontaneous infiltration will occur with a lesser weight percent of magnesium supplied to the spontaneous system when at least some of the total amount of magnesium supplied is placed in the preform or filler material. It may be desirable for a lesser amount of magnesium to be provided in order to prevent the formation of undesirable intermetallics in the metal matrix composite body. In the case of a silicon carbide preform, it has been discovered that when the preform is contacted with an aluminum matrix metal, the preform containing at least about 1% by weight magnesium and being in the presence of a substantially pure nitrogen atmosphere, the matrix metal spontaneously infiltrates the preform. In the case of an alumina preform, the amount of magnesium required to achieve acceptable spontaneous infiltration is slightly higher. Specifically, it has been found that when an alumina preform, when contacted with a similar aluminum matrix metal, at about the same temperature as the aluminum that infiltrated into the silicon carbide preform, and in the presence of the same nitrogen atmosphere, at least about 3% by weight magnesium may be required to achieve similar spontaneous infiltration to that achieved in the silicon carbide preform discussed immediately above.

It is also noted that it is possible to supply to the spontaneous system infiltration enhancer precursor and/or infiltration enhancer on a surface of the alloy and/or on a surface of the preform or filler material and/or within the preform or filler material prior to infiltrating the matrix metal into the filler material or preform (i.e., it may not be necessary for the supplied infiltration enhancer or infiltration enhancer precursor to be alloyed with the matrix metal, but rather, simply supplied to the spontaneous system). For example, in the aluminum/mangesium/nitrogen system, if the magnesium was applied to a surface of the matrix metal it may be preferred that the surface should be the surface which is closest to, or preferably in contact with, the permeable mass of filler material or vice versa; or such magnesium could be mixed into at least a portion of the preform or filler material. Still further, it is possible that some combination of surface application, alloying and placement of magnesium into at least a portion of the preform could be used. Such combination of applying infiltration enhancer(s) and/or infiltration enhancer precursor(s) could result in a decrease in the total weight percent of magnesium needed to promote infiltration of the matrix aluminum metal into the preform, as well as achieving lower temperatures at which infiltration can occur. Moreover, the amount of undesirable intermetallics formed due to the presence of magnesium could also be minimized.

The use of one or more auxiliary alloying elements and the concentration of nitrogen in the surrounding gas also affects the extent of nitriding of the matrix metal at a given temperature. For example, auxiliary alloying elements such as zinc or iron included in the alloy, or placed on a surface of the alloy, may be used to reduce the infiltration temperature and thereby decrease the amount of nitride formation, whereas increasing the concentration of nitrogen in the gas may be used to promote nitride formation.

The concentration of magnesium in the alloy, and/or placed onto a surface of the alloy, and/or combined in the filler or preform material, also tends to affect the extent of infiltration at a given temperature. Consequently, in some cases where little or no magnesium is contacted directly with the preform or filler material, it may be preferred that at least about three weight percent magnesium be included in the alloy. Alloy contents of less than this amount, such as one weight percent magnesium, may require higher process temperatures or an auxiliary alloying element for infiltration. The temperature required to effect the spontaneous infiltration process of this invention may be lower: (1) when the magnesium content of the alloy alone is increased, e.g., to at least about 5 weight percent; and/or (2) when alloying constituents are mixed with the permeable mass of filler material or preform; and/or (3) when another element such as zinc or iron is present in the aluminum alloy. The temperature also may vary with different filler materials. In general, in the aluminum/magnesium/nitrogen system spontaneous and progressive infiltration will occur at a process temperature of at least about 675° C., and preferably a process temperature of at least about 750° C.-800° C. Temperatures generally in excess of 1200° C. do not appear to benefit the process, and a particularly useful temperature range has been found to be from about 675° C. to about 1000° C. However, as a general rule, the spontaneous infiltration temperature is a temperature which is above the melting point of the matrix metal but below the volatilization temperature of the matrix metal. Moreover, the spontaneous infiltration temperature should be below the melting point of the filler material. Still further, as temperature is increased, the tendency to form a reaction product between the matrix metal and infiltrating atmosphere increases (e.g., in the case of aluminum matrix metal and a nitrogen infiltrating atmosphere, aluminum nitride may be formed). Such reaction product may be desirable or undesirable based upon the intended application of the metal matrix composite body. Additionally, electric resistance heating is typically used to achieve the infiltrating temperatures. However, any heating means which can cause the matrix metal to become molten and does not adversely affect spontaneous infiltration, is acceptable for use with the invention.

In the present method, for example, a permeable filler material or preform comes into contact with molten aluminum in the presence of, at least sometime during the process, a nitrogen-containing gas. The nitrogen-containing gas may be supplied by maintaining a continuous flow of gas into contact with at least one of the filler material or preform and/or molten aluminum matrix metal. Although the flow rate of the nitrogen-containing gas is not critical, it is preferred that the flow rate be sufficient to compensate for any nitrogen lost from the atmosphere due to any nitride formation, and also to prevent or inhibit the incursion of air which can have an oxidizing effect on the molten metal.

The method of forming a metal matrix composite is applicable to a wide variety of filler materials, and the choice of filler materials will depend on such factors as the matrix alloy, the process conditions, the reactivity of the molten matrix alloy with the filler material, and the properties sought for the final composite product. For example, when aluminum is the matrix metal, suitable filler materials include (a) oxides, e.g. alumina, magnesia, zirconia; (b) carbides, e.g. silicon carbide; (c) borides, e.g. aluminum dodecaboride, titanium diboride, and (d) nitrides, e.g. aluminum nitride, and (e) mixtures thereof. If there is a tendency for the filler material to react with the molten aluminum matrix metal, this might be accommodated by minimizing the infiltration time and temperature or by providing a non-reactive coating on the filler. The filler material may comprise a substrate, such as carbon or other non-ceramic material, bearing a ceramic coating to protect the substrate from attack or degradation. Suitable ceramic coatings include oxides, carbides, borides and nitrides. Ceramics which are preferred for use in the present method include alumina and silicon carbide in the form of particles, platelets, whiskers and fibers. The fibers can be discontinuous (in chopped form) or in the form of continuous filament, such as multifilament tows. Further, the filler material or preform may be homogeneous or heterogeneous.

It also has been discovered that certain filler materials exhibit enhanced infiltration relative to filler materials having a similar chemical composition. For example, crushed alumina bodies made by the method disclosed in U.S. Pat. No. 4,713,360, entitled "Novel Ceramic Materials and Methods of Making Same", which issued on Dec. 15, 1987, in the names of Marc S. Newkirk et al., exhibit desirable infiltration properties relative to commercially available alumina products. Moreover, crushed alumina bodies made by the method disclosed in Commonly Owned U.S. Pat. No. 4,851,375, which issued on Jul. 25, 1989, and entitled "Methods of Making Composite Ceramic Articles Having Embedded Filler", in the names of Marc S. Newkirk et al., also exhibit desirable infiltration properties relative to commercially available alumina products. The subject matter of each of the issued patents are herein expressly incorporated by reference. Thus, it has been discovered that complete infiltration of a permeable mass of ceramic material can occur at lower infiltration temperatures and/or lower infiltration times by utilizing a crushed or comminuted body produced by the method of the aforementioned U.S. Patents.

The size, shape, chemistry and volume percent of the filler material (or preform) can be any that may be required to achieve the properties desired in the composite. Thus, the filler material may be in the form of particles, whiskers, platelets or fibers since infiltration is not restricted by the shape of the filler material. Other shapes such as spheres, tubules, pellets, refractory fiber cloth, and the like may be employed. In addition, the size of the filler material does not limit infiltration, although a higher temperature or longer time period may be needed for complete infiltration of a mass of smaller particles than for larger particles or vice-versa depending on the particular reaction conditions. Average particle diameters as small as a micron or less to about 1100 microns or more can be successfully utilized in the present invention, with a range of about 2 microns through about 1000 microns being preferred for a vast majority of commercial applications. Further, the mass of filler material (or preform) to be infiltrated should be permeable (i.e., contain at least some interconnected porosity to render it permeable to molten matrix metal and/or to the infiltrating atmosphere). Moreover, by controlling the size (e.g., particle diameter) and/or geometry and/or composition of the filler material or the material comprising the preform, the physical and mechanical properties of the formed metal matrix composite can be controlled or engineered to meet any number of industrial needs. For example, wear resistance of the metal matrix composite can be increased by increasing the size of the filler material (e.g., increasing the average diameter of the filler material particles) given that the filler material has a higher wear resistance than the matrix metal. However, strength and/or toughness may tend to increase with decreasing filler size. Further, the thermal expansion coefficient of the metal matrix composite may decrease with increasing filler loading, given that the coefficient of thermal expansion of the filler is lower than the coefficient of thermal expansion of the matrix metal. Still further, the mechanical and/or physical properties (e.g., density, coefficient of thermal expansion, elastic and/or specific modulus, strength and/or specific strength, etc.) of a formed metal matrix composite body may be tailored depending on the loading of the filler material in the loose mass or in the preform. For example, by providing a loose mass or preform comprising a mixture of filler particles of varying sizes and/or shapes, wherein the density of the filler is greater than that of the matrix metal, a higher filler loading, due to enhanced packing of the filler materials, may be achieved, thereby resulting in a metal matrix composite body with an increased density. By utilizing the teachings of the present invention, the volume percent of filler material or preform which can be infiltrated can vary over a wide range. The lower volume percent of filler that can be infiltrated is limited primarily by the ability to form a porous filler material or preform, (e.g., about 10 volume percent); whereas the higher volume percent of filler or preform that can be infiltrated is limited primarily by the ability to form a dense filler material or preform with at least some interconnected porosity (e.g., about 95 volume percent). Accordingly, by practicing any of the above teachings, alone or in combination, a metal matrix composite can be engineered to contain a desired combination of properties.

The method of forming metal matrix composites according to the present invention, not being dependent on the use of pressure to force or squeeze molten matrix metal into a preform or a mass of filler material, permits the production of substantially uniform metal matrix composites having a high volume fraction of filler material and low porosity. Higher volume fractions of filler material may be achieved by using a lower porosity initial mass of filler material. Higher volume fractions also may be achieved if the mass of filler is compacted or otherwise densified provided that the mass is not converted into either a compact with closed cell porosity or into a fully dense structure that would prevent infiltration by the molten alloy. Specifically, volume fractions on the order of about 60 to 80 volume percent can be achieved by methods such as vibrational packing, controlling particle size distribution, etc. However, alternative techniques can be utilized to achieve even higher volume fractions of filler. Volume fractions of filler on the order of 40 to 50 percent are preferred for thermo-forming in accordance with the present invention. At such volume fractions, the infiltrated composite maintains or substantially maintains its shape, thereby facilitating secondary processing. Higher or lower particle loadings or volume fractions could be used, however, depending on the desired final composite loading after thermo-forming. Moreover, methods for reducing particle loadings can be employed in connection with the thermo-forming processes of the present invention to achieve lower particle loadings.

It has been observed that for aluminum infiltration and matrix formation around a ceramic filler, wetting of the ceramic filler by the aluminum matrix metal may be an important part of the infiltration mechanism. Further, the wetting of the filler by molten matrix metal may permit a uniform dispersion of the filler throughout the formed metal matrix composite and improve the bonding of the filler to the matrix metal. Moreover, at low processing temperatures, a negligible or minimal amount of metal nitriding occurs resulting in a minimal discontinuous phase of aluminum nitride dispersed in the metal matrix. However, as the upper end of the temperature range is approached, nitridation of the metal is more likely to occur. Thus, the amount of the nitride phase in the metal matrix can be controlled by varying the processing temperature at which infiltration occurs. The specific process temperature at which nitride formation becomes more pronounced also varies with such factors as the matrix aluminum alloy used and its quantity relative to the volume of filler or preform, the filler material to be infiltrated, and the nitrogen concentration of the infiltrating atmosphere. For example, the extent of aluminum nitride formation at a given process temperature is believed to increase as the ability of the alloy to wet the filler decreases and as the nitrogen concentration of the atmosphere increases.

It is therefore possible to tailor the constituency of the metal matrix during formation of the composite to impart certain characteristics to the resulting product. For a given system, the process conditions can be selected to control the nitride formation. A composite product containing an aluminum nitride phase will exhibit certain properties which can be favorable to, or improve the performance of, the product. Further, the temperature range for spontaneous infiltration with an aluminum alloy may vary with the ceramic material used. In the case of alumina as the filler material, the temperature for infiltration should preferably not exceed about 1000° C. if it is desired that the ductility of the matrix not be reduced by the significant formation of nitride. However, temperatures exceeding 1000° C. may be employed if it is desired to produce a composite with a less ductile and stiffer matrix. To infiltrate silicon carbide, higher temperatures of about 1200° C. may be employed since the aluminum alloy nitrides to a lesser extent, relative to the use of alumina as filler, when silicon carbide is employed as a filler material.

Further, the constituency of the matrix metal within the metal matrix composite and defects, for example, porosity, may be modified by controlling the cooling rate of the metal matrix composite. For example, the metal matrix composite may be directionally solidified by any number of techniques including: placing the container holding the metal matrix composite upon a chill plate; and/or selectively placing insulating materials about the container. Further, the constituency of the metal matrix may be modified after formation of the metal matrix composite. For example, exposure of the formed metal matrix composite to a heat treatment may improve the tensile strength of the metal matrix composite. (The standard test for tensile strength is ASTM-D3552-77 (reapproved 1982).)

For example, a desirable heat treatment for a metal matrix composite containing a 520.0 aluminum alloy as the matrix metal may comprise heating the metal matrix composite to an elevated temperature, for example, to about 430° C., which is maintained for an extended period (e.g., 18-20 hours). The metal matrix may then be quenched in boiling water at about 100° C. for about 20 seconds (i.e., a T-4 heat treatment) which can temper or improve the ability of the composite to withstand tensile stresses.

Moreover, it is possible to use a reservoir of matrix metal to assure complete infiltration of the filler material and/or to supply a second metal which has a different composition from the first source of matrix metal. Specifically, in some cases it may be desirable to utilize a matrix metal in the reservoir which differs in composition from the first source of matrix metal. For example, if an aluminum alloy is used as the first source of matrix metal, then virtually any other metal or metal alloy which was molten at the processing temperature could be used as the reservoir metal. Molten metals frequently are very miscible with each other which would result in the reservoir metal mixing with the first source of matrix metal so long as an adequate amount of time is given for the mixing to occur. Thus, by using a reservoir metal which is different in composition from the first source of matrix metal, it is possible to tailor the properties of the metal matrix to meet various operating requirements and thus tailor the properties of the metal matrix composite.

A barrier means may also be utilized in combination with the present invention. Specifically, the barrier means for use with this invention may be any suitable means which interferes, inhibits, prevents or terminates the migration, movement, or the like, of molten matrix alloy (e.g., an aluminum alloy) beyond the defined surface boundary of the filler material. Suitable barrier means may be any material, compound, element, composition, or the like, which, under the process conditions of this invention, maintains some integrity, is not volatile and preferably is permeable to the gas used with the process, as well as being capable of locally inhibiting, stopping, interfering with, preventing, or the like, continued infiltration or any other kind of movement beyond the defined surface boundary of the ceramic filler. Barrier means may be used during spontaneous infiltration or in any molds or other fixtures utilized in connection with thermo-forming of the spontaneously infiltrated metal matrix composite, as discussed in greater detail below.

Suitable barrier means includes materials which are substantially non-wettable by the migrating molten matrix alloy under the process conditions employed. A barrier of this type appears to exhibit little or no affinity for the molten matrix alloy, and movement beyond the defined surface boundary of the filler material or preform is prevented or inhibited by the barrier means. The barrier reduces any final machining or grinding that may be required of the metal matrix composite product. As stated above, the barrier preferably should be permeable or porous, or rendered permeable by puncturing, to permit the gas to contact the molten matrix alloy.

Suitable barriers particularly useful for aluminum matrix alloys are those containing carbon, especially the crystalline allotropic form of carbon known as graphite. Graphite is essentially non-wettable by the molten aluminum alloy under the described process conditions. A particular preferred graphite is a graphite foil product that is sold under the trademark Grafoil®, registered to Union Carbide. This graphite foil exhibits sealing characteristics that prevent the migration of molten aluminum alloy beyond the defined surface boundary of the filler material. This graphite foil is also resistant to heat and is chemically inert. Grafoil® graphite foil is flexible, compatible, conformable and resilient. It can be made into a variety of shapes to fit any barrier application. However, graphite barrier means may be employed as a slurry or paste or even as a paint film around and on the boundary of the filler material or preform. Grafoil® is particularly preferred because it is in the form of a flexible graphite sheet. In use, this paper-like graphite is simply formed around the filler material or preform.

Other preferred barrier(s) for aluminum metal matrix alloys in nitrogen are the transition metal borides (e.g., titanium diboride ($TiB_2$)) which are generally non-wettable by the molten aluminum metal alloy under certain of the process conditions employed using this material. With a barrier of this type, the process temperature should not exceed about 875° C., for otherwise the barrier material becomes less efficacious and, in fact, with increased temperature infiltration into the barrier will occur. Moreover, the particle size of the barrier material may affect the ability of the material to inhibit spontaneous infiltration. The transition metal borides are typically in a particulate form (1-30 microns). The barrier materials may be applied as a slurry or paste to the boundaries of the permeable mass of ceramic filler material which preferably is preshaped as a preform.

Other useful barriers for aluminum metal matrix alloys in nitrogen include low-volatile organic compounds applied as a film or layer onto the external surface of the filler material or preform. Upon firing in nitrogen, especially at the process conditions of this invention, the organic compound decomposes leaving a carbon soot film. The organic compound may be applied by conventional means such as painting, spraying, dipping, etc.

Moreover, finely ground particulate materials can function as a barrier so long as infiltration of the particulate material would occur at a rate which is slower than the rate of infiltration of the filler material.

Thus, the barrier means may be applied by any suitable means, such as by covering the defined surface boundary with a layer of the barrier means. Such a layer of barrier means may be applied by painting, dipping, silk screening, evaporating, or otherwise applying the barrier means in liquid, slurry, or paste form, or by sputtering a vaporizable barrier means, or by simply depositing a layer of a solid particulate barrier means, or by applying a solid thin sheet or film of barrier means onto the defined surface boundary. With the barrier means in place, spontaneous infiltration substantially terminates when the infiltrating matrix metal reaches the defined surface boundary and contacts the barrier means.

Various demonstrations of the present invention are included in the Examples immediately following. However, these Examples should be considered as being illustrative and should not be construed as limiting the scope of the invention as defined in the appended claims.

EXAMPLE 1

FIG. 1 shows a setup in cross-section which was used to form a metal matrix composite through spontaneous infiltration in accordance with the present invention. Specifically, a styrofoam cup having approximate dimensions of 3¼ inches (83 mm) tall and an inner diameter at the wide end of approximately 2¾ inches (70 mm) and an inner diameter at the narrow end of approximately 1 9/16 inches (40 mm) was dipped in a slip or slurry comprising substantially equal weight proportions of colloidal 20 percent alumina, supplied by Remet Co. and 1000 grit silicon carbide powder supplied by Norton Co. and sold under the trade name 37 Crystolon. The slip-coated removable mandrel was then dusted with dry, 90 grit silicon carbide powder (37 Crystolon) which adhered to the slurry coating. The sequential dip-dust steps were repeated three times, after which the dusting powder was changed to 24 grit silicon carbide (37 Crystolon). The sequential dip-dust steps were then repeated another three times. The developing investment shell was dried at about 65° C. for about ½ hour after each dip-dust step sequence.

After the last dip-dust step sequence, the investment shell was fired in an air furnace at a temperature of about 850° C. for about 1 hour to remove the styrofoam cup through volatilization. The resulting investment shell 4, which was approximately 3/16 inch thick, was then filled to approximately the halfway point with a bed of filler material 2 comprising an admixture of 1000 grit green silicon carbide, sold under the trade name of 39 Crystolon and produced by Norton Co., and approximately 2 percent by weight of −350 mesh magnesium powder supplied by Aesar, a division of Johnson Mathey Co. This admixture had previously been thoroughly mixed by ball milling for about 24 hours. The bed of filler material 2 was then lightly packed (through hand-pressure) to create a more dense body of filler material within the investment shell 4. After this pressing step, an ingot of a matrix metal 3 composed by weight of approximately 15 percent silicon, 5 percent magnesium, and the balance aluminum, and having approximate dimensions of 1½ inch (38 mm) by 1½ inch (38 mm) by 1 inch (25 mm), was placed on top of the bed of filler material 2. Prior to placing the matrix alloy ingot 3 on the surface of the filler bed, the ingot was first lightly sand blasted and then washed in ethanol to remove any surface impurities, such as cutting oils, which might be present.

The investment shell 4 containing the matrix alloy ingot 3 and the filler material 2 was placed within a bed of refractory particles 5 so that the surface of the bed of refractory particles was approximately halfway up the side of the investment shell 2. The refractory particles, which were contained within a graphite boat 1, comprised a 24 grit alumina material, known by the trade name 38 Alundum and produced by Norton Co.

The setup, consisting of the graphite refractory boat and its contents, was then placed within a controlled atmosphere electric resistance heated vacuum furnace at room temperature and a high vacuum (approximately $1 \times 10^{-4}$ torr.) was created within the vacuum furnace. The furnace was backfilled with nitrogen to about 1 atmosphere and a continuous nitrogen gas flow rate of about 1.5 liter/minute was established within the furnace. The furnace temperature was then ramped to about 750° C. in about 3 hours and held at about 750° C. for about 20 hours. After the 20 hour heating period, the power was turned off and the setup was allowed to cool naturally inside the furnace to about 40° C. over about 12 hours. Upon reaching 40° C., the setup was removed from the furnace and disassembled. A metal matrix composite comprising matrix metal embedding the admixture of filler material, was recovered from the setup.

Figure 2:
FIG. 2 is a photomicrograph of the metal matrix composite produced in accordance with Example 1.

FIG. 2 is a photomicrograph of the metal matrix composite produced in accordance with Example 1.

Thus, this Example demonstrates that it is possible to spontaneously infiltrate a filler material in an aluminum alloy/magnesium/nitrogen system to form a metal matrix composite.

EXAMPLE 2

Figure 3:
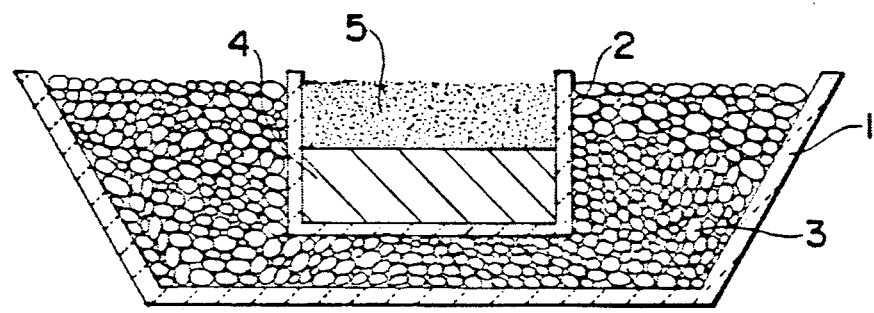
FIG. 3 is a schematic cross-sectional representation of a lay-up for producing a spontaneously infiltrated metal matrix composite.

FIG. 3 shows an assembly in cross-section which was used to form a metal matrix composite body through spontaneous infiltration in accordance with the present invention. Specifically, a box 2 having approximate dimensions 2 inches (51 mm) by 1 inch (25 mm) by 2 inches (51 mm) was produced from a 15/1000 inch (0.38 mm) thick grade GTB graphite foil product, produced by Union Carbide and sold under the trademark Grafoil ®. The box was produced by stapling appropriate size sections of the Grafoil ® together and sealing the seams of the Grafoil ® box with a slurry made by mixing graphite powder (Grade KS-44 from Lonza, Inc.) and colloidal silica (Ludox HS from DuPont). The weight ratio of graphite to colloidal silica was about ⅓. The Grafoil ® box was placed on top of an approximately ½ inch (13 mm) thick layer of particulate boron carbide 3 (Atlantic Equipment Engineers) which was contained within an alumina refractory boat 1. A matrix metal ingot 4 having approximate dimensions of 2 inches (51 mm) by 1 inch (25 mm) by ½ inch (13 mm) and comprised of approximately 3 percent calcium by weight, the balance being aluminum, was placed on the bottom of the Grafoil ® box. A 220 grit alumina material 5 known by the trade name 38 Alundum and produced by Norton Co. was poured into the Grafoil ® box 2 on top of the matrix metal ingot 4 until the ingot was covered with an approximately one inch thick layer of the 38 Alundum filler material 5. Additional boron carbide 3 was then added to the alumina refractory boat, outside of the Grafoil ® box 2, until the surface of the bed of boron carbide was slightly below the top of the Grafoil ® box 2.

The setup, consisting of the alumina refractory boat 1 and its contents, was placed within an electric resistance heated tube furnace at room temperature. The furnace was evacuated to approximately $1 \times 10^{-1}$ torr. and then backfilled at room temperature with nitrogen gas to approximately 1 atmosphere. After the furnace was backfilled with nitrogen, a continuous nitrogen gas flow rate of 800 cc/minute was established within the furnace. The furnace temperature was then raised to about 900° C. at a rate of about 250° C./hour; maintained at about 900° C. for about 5 hours; and then ramped to room temperature at a rate of about 250° C./hour. Upon reaching room temperature, the setup was removed from the furnace and disassembled. A metal matrix composite comprising the 38 Alundum filler material embedded by the matrix metal was recovered.

Figure 4:
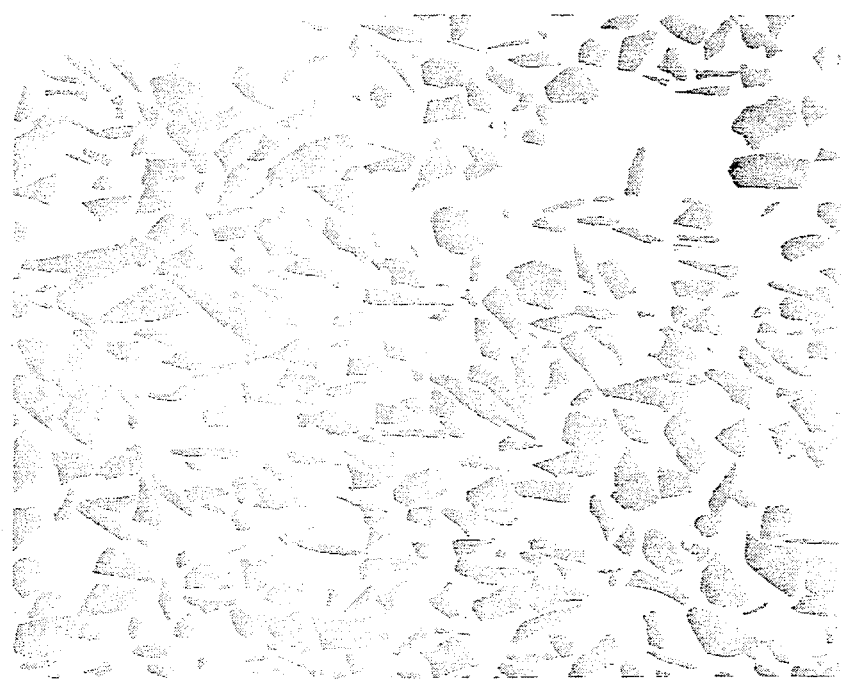
FIG. 4 is a photomicrograph of the metal matrix composite produced in accordance with Example 2.

FIG. 4 is a photomicrograph of the metal matrix composite produced in accordance with Example 2.

Thus, this Example demonstrates that it is possible to spontaneously infiltrate a mass of filler material in an aluminum alloy/calcium/nitrogen system.

EXAMPLE 3

Figure 5:
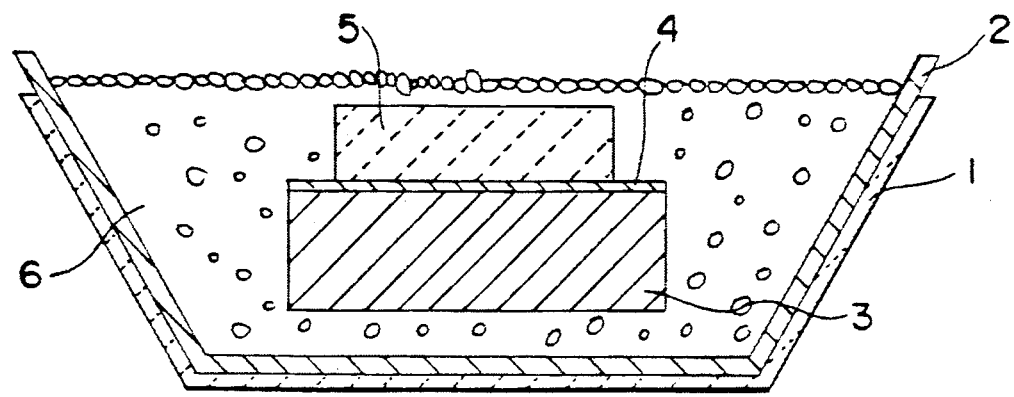
FIG. 5 is a schematic cross-sectional representation of a lay-up for producing a spontaneously infiltrated metal matrix composite.

FIG. 5 shows a setup in cross-section which was used to form a metal matrix composite by spontaneous infiltration in accordance with the present invention. In order to create a preform, approximately 94 percent by weight aluminum nitride powder (Herman Starck "A" powder), 5 percent by weight silicon nitride powder (Atlantic Equipment Engineers), and approximately 1 percent by weight PVPK 30 (polyvinyl pryolene, 30 molecular weight, GAF Corp.) was mixed with 100 percent ethanol to form a slurry comprising approximately 50 volume percent solids and 50 volume percent ethanol. The slurry was then poured into a mold having approximate dimensions 3 inches (76 mm) by 3 inches (76 mm) by 1 inch (25 mm) and formed by a four-sided square steel frame and a bottom surface of plaster board. The four-sided steel frame was not connected to the plaster board and could be removed easily, as by lifting. The plaster board was utilized to draw moisture from the slurry. Upon drying, the slurry formed a preform having approximate dimensions of 3 inches (76 mm) by 3 inches (76 mm) by 1 inch (25 mm). An approximately 1½ inch (38 mm) by ¾ inch (19 mm) by ½ inch (38 mm) preform 5 was cut from the larger preform. An approximately 1 inch (39 mm) by 2 inch (51 mm) by ½ inch (25 mm) ingot of matrix metal 3 composed by weight of approximately 3 percent strontium, 8 percent silicon, 8 percent nickel and the balance aluminum, was coated on one surface with an approximately 0.25 millimeter layer 4 of an admixture comprising 50 percent by weight iron powder (from Serac, Inc., Milwaukee, Wis.) and 50 percent by weight aluminum nitride powder (Exolon-ESK Company, Tonawanda, N.Y.). The preform 5 was then placed on top of this aluminum nitride/iron powder layer 4 and the matrix metal/preform assembly was placed on top of an approximately 1 inch (25 mm) thick layer of particulate boron carbide 6 (Atlantic Equipment Engineers) contained within a box 2 produced from a 15/1000 inch (0.38 mm) thick grade GTB graphite tape product, produced by Union Carbide and sold under the trademark Grafoil ®. The box was produced by stapling appropriate sections of the Grafoil ® together and sealing the seams of the Grafoil ® box with a slurry made by mixing graphite powder (grade KS-44 from Lonza, Inc.) and colloidal silica (Ludox HS from DuPont). The weight ratio of graphite to colloidal silica was about ⅓. The box 2 was large enough to accommodate the matrix metal/preform assembly without contacting said assembly. The Grafoil ® box 2 rested on the bottom of an alumina refractory boat 1. Additional boron carbide 6 was added to the Grafoil box 2 until the matrix metal/preform assembly was completely surrounded and embedded in the boron carbide 6. An approximately ½ inch (13 mm) thick layer of the boron carbide covered the upper surface of the preform.

The setup, consisting of the alumina refractory boat 1 and its contents, was placed within an electric resistance heated tube furnace at room temperature. The furnace was then evacuated to approximately $1 \times 10^{-1}$ torr. and backfilled at room temperature with nitrogen to approximately 1 atmosphere. After backfilling the furnace with nitrogen, a continuous nitrogen gas flow rate of approximately 600 cc/minute was established within the furnace. The furnace temperature was then ramped to about 1200° C. at a rate of approximately 200° C./hour. The furnace temperature was maintained at about 1200° C. for about 10 hours and then ramped to room temperature at about 250° C./hour. After reaching room temperature, the setup was removed from the furnace and disassembled. A metal matrix composite comprising matrix metal embedding the preform was obtained.

Figure 6:
FIG. 6 is a photomicrograph of the metal matrix composite produced in accordance with Example 3.

FIG. 6 is a photomicrograph of the metal matrix composite produced in accordance with Example 3.

Thus, this example demonstrates that it is possible to spontaneously infiltrate a matrix metal into a preform of filler material in an aluminum alloy/strontium/nitrogen system.

EXAMPLE 4

Figure 7:
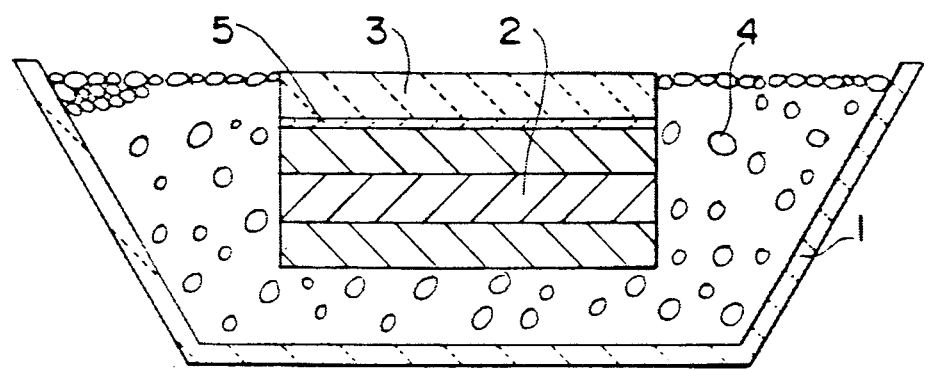
FIG. 7 is a schematic cross-sectional representation of a lay-up for producing a spontaneously infiltrated metal matrix composite.

FIG. 7 shows a setup in cross-section which was used to form a metal matrix composite by spontaneous infiltration in accordance with the present invention. In order to produce a preform, approximately 85 percent by weight of A-17 Calcined alumina, from Alcoa, was mixed with approximately 15 percent by weight water containing minor amount of Darvin-821A (supplied by R. T. Vanderbilt and Co., Norwalk, Conn.) as a dispersant, to form a slurry. The slurry was cast into a plaster or paris rectangular mold having dimensions of approximately 3 inches (76 mm) by 2 inches (51 mm) by 112 inch (13 mm). The slurry was allowed to dry for 8 hours in the mold before it was removed as a preform 3. The preform 3 was then allowed to dry for an additional 24 hours in air before being utilized in the instant invention.

A stack of 3 matrix metal ingots 2, each having approximate dimensions of 3 inches (76 mm) by 2 inches (51 mm) by ½ inch (13 mm) and composed of commercially available 170.1 aluminum alloy containing approximately 3 percent by weight zinc in addition to any zinc contained in the original alloy, was painted on the upper surface of the uppermost ingot with an approximately 0.05 inch (0.013 mm) thick layer 5 of a refractory material known as Leecote® LX-60 WPS (Acme Resin Corporation, Madison, Ohio). The preform 3 was then placed on top of this Leecote layer 5 and the matrix alloy ingots/preform assembly was placed on top of an approximately ½ inch (13 mm) thick layer of Nyad SP coarse grit wollastonite particulate 4 from NYCO, Inc., contained within an alumina refractory boat 1. The matrix alloy ingots/preform assembly was juxtaposed relative to the wollastonite layer so that the lowermost matrix alloy ingot was in contact with the layer. Additional wollastonite 4 was then added to the alumina refractory boat I until the surface of the wollastonite was approximately level with the upper surface of the preform 3.

The setup, consisting of the alumina refractory boat and its contents, was placed within an electric resistance heated furnace with an air atmosphere at atmospheric pressure. The furnace temperature was raised to about 1050° C. in about 10 hours; maintained at about 1050° C. for about 60 hours; and then ramped to about 40° C. in about 10 hours. Upon reaching approximately 40° C., the setup was removed from the furnace and disassembled. A metal matrix composite comprising matrix alloy embedding the preform was recovered.

Figure 8:
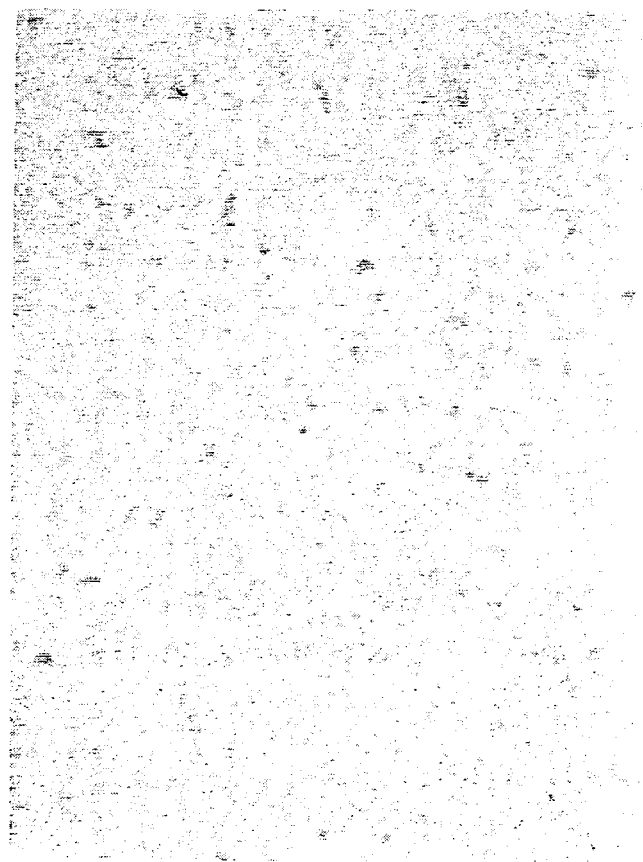
FIG. 8 is a photomicrograph of the metal matrix composite produced in accordance with Example 4.

FIG. 8 is a photomicrograph of the metal matrix composite produced in accordance with Example 4.

Thus, the present example demonstrates that it is possible to spontaneously infiltrate a preform of filler material in an aluminum alloy/zinc/oxygen system.

EXAMPLE 5

This Example demonstrates that a variety of filler material geometries can be used successfully to form metal matrix composite bodies by the spontaneous infiltration technique. Table I contains summaries of the experimental conditions employed to form a plurality of metal matrix composite bodies, including various matrix metals, filler material geometries, processing temperatures and processing times.

Sample A

Figure 9:
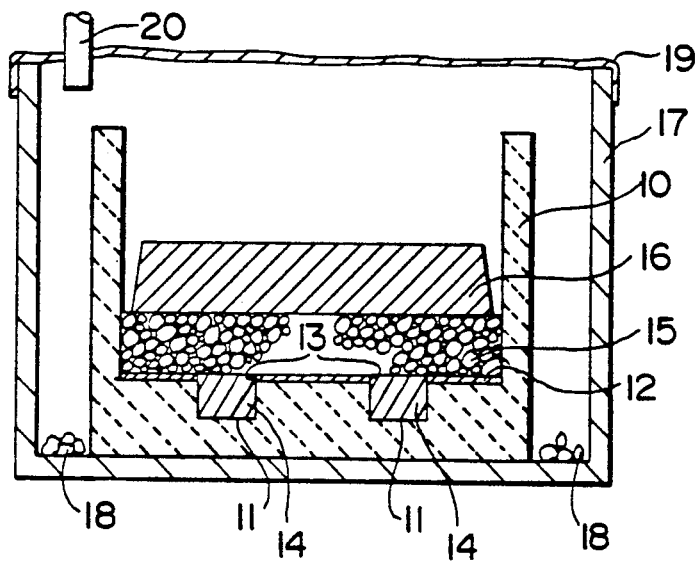
FIG. 9 is a schematic cross-sectional representation of a lay-up for producing a spontaneously infiltrated matrix metal composite according to Example 5.

FIG. 9 shows a schematic cross-section of the setup used to produce a metal matrix composite sample, as described below. Specifically, a silica mold 10 was prepared, having an inner cavity measuring about 5 inches (127 mm) long by about 5 inches (127 mm) wide by about 3.25 inches (83 mm) deep, and having five holes 11, about 0.75 inches (19 mm) diameter and about 0.75 inches (19 mm) deep, in the bottom of the silica mold. The mold was formed by first mixing a slurry comprising by weight of about 2.5 to 3 parts silica powder (RANCO-SIL ™ 4 from Ransom & Randolph, Maunee, Ohio), about 1 part colloidal silica (Nyacol® 830 by Nyacol Products, Inc., Ashland, Mass.) and about 1 to 1.5 parts silica sand (RANCO-SIL ™ A sold by Ransom & Randolph, Maunee, Ohio). The slurry mixture was poured into a rubber mold having a negative shape of the desired inner cavity of the silica mold and placed in a freezer overnight (about 14 hours). The silica mold 10 was subsequently separated from the rubber mold, fired at about 800° C. in an air atmosphere furnace for about 1 hour and cooled to room temperature.

The bottom surface of the formed silica mold 10 was covered with a piece of graphite foil 12 (Perma-Foil from TT America, Portland, Oreg.), having dimensions of about 5 inches (127 mm) long by about 5 inches (127 mm) wide by about 0.010 inches (0.25 mm) thick. Holes 13, about 0.75 inches (19 mm) in diameter, were cut into the graphite foil to correspond in position to the holes 11 in the bottom of the silica mold 10. The holes 11 in the bottom of the silica mold 10 were filled with matrix metal cylinders 14, measuring about 0.75 inches (19 mm) in diameter by about 0.75 inches (19 mm) thick, having a composition identical to the matrix metal, as described below. About 826 grams of a filler material mixture 15, comprising by weight about 95 percent 220 grit alumina (38 Alundum from Norton, Co., Worcester, Mass.) and about 5 percent −325 magnesium powder (sold by Aesar®, Johnson Matthey, Seabrook, N.H.), was prepared in an about 4 liter plastic jar and hand shaken for about 15 minutes. The filler material mixture 15 was then poured into the bottom of the silica mold 10 to a depth of about 0.75 inch (19 mm) and tapped lightly to level the surface of the filler material mixture. About 1220 grams of a matrix metal 16, comprising by weight approximately ≦0.25% Si, ≦0.30% Fe, ≦0.25% Cu, ≦0.15% Mn, 9.5–10.6% Mg, ≦0.15% Zn, ≦0.25% Ti and the balance aluminum, were placed on top of the filler material mixture 15 within the silica mold 10. The silica mold 10 and its contents were then placed into a stainless steel container 17, having dimensions of about 10 inches (254 mm) long by about 10 inches (254 mm) wide by about 8 inches (203 mm) high. A titanium sponge material 18, weighing about 15 grams (from Chemalloy Inc., Bryn Mawr, Pa.), was sprinkled around the silica mold 10 in the stainless steel container 17. A sheet of copper foil 19 was placed over the opening of the stainless steel container 17, so as to form an isolated chamber. A nitrogen purge tube 20 was provided through the sheet of copper foil 19, and the stainless steel container 17 and its contents were placed into an air atmosphere resistance heated box furnace.

The furnace was ramped from room temperature to about 600° C. at a rate of about 400° C./hour with a nitrogen flow rate of about 10 liters/minute (note that the isolated chamber is not gas tight and permits some nitrogen to escape therefrom), then heated from about 600° C. to about 750° C. at a rate of about 400° C./hour with a nitrogen flow rate of about 2 liters/minute. After holding the system at about 775° C. for approximately 1.5 hours with a nitrogen flow rate of about 2 liters/minute, the stainless steel container 17 and its contents were removed from the furnace. The silica mold 10 was removed from the stainless steel container 17, and a portion of the residual matrix metal was decanted from within the silica mold 10. A room temperature copper chill plate, about 5 inches (127 mm) long by about 5 inches (127 mm) wide by about 1 inch (25 mm) thick, was placed within the silica mold 10 such that it contacted the top portion of the residual matrix metal, to directionally solidify the formed metal matrix composite.

Sample B

Figure 10:
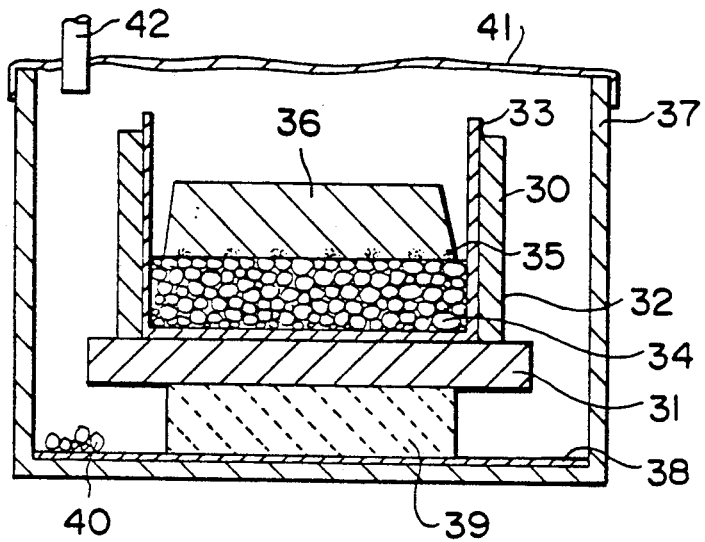
FIG. 10 is a schematic cross-sectional representation of a lay-up for producing a spontaneously infiltrated matrix metal composite according to Example 5.

FIG. 10 shows a schematic cross-section of the setup used to produce a metal matrix composite sample, as described below. Specifically, a steel box 32 was formed by placing a steel frame 30, having inner cavity dimensions of about 5 inches (127 mm) long by about 5 inches (127 mm) wide by about 2.75 inches (70 mm) deep, and having a wall thickness of about 0.3 inch (7.9 mm), onto a steel plate 31, which measured about 7 inches (178 mm) long by about 7 inches (178 mm) wide by about 0.25 inch (6.4 mm) thick. The steel box 32 was lined with a graphite foil box 33, measuring about 5 inches (127 mm) long by about 5 inches (127 mm) wide by about 3 inches (76 mm) tall. The graphite foil box 33 was fabricated from a piece of graphite foil (Perma-Foil from TT America, Portland, Oreg.) which was about 11 inches (279 mm) long by about 11 inches (279 mm) wide by about 0.010 inches (0.25 mm) thick. Four parallel cuts, about 3 inches (76 mm) from the side and 3 inches (76 mm) long were made into the graphite foil. The cut graphite foil was then folded and stapled to form the graphite foil box 33.

About 782 grams of a filler material mixture 34, comprising by weight about 95 percent alumina (C-75 RG from Alcan Chemicals, Montreal, Canada) and about 5 percent −325 mesh magnesium powder (sold by AESAR®, Johnson Matthey, Seabrook, N.H.) were prepared by co a plastic jar and shaking by hand for about 15 minutes. The filler material mixture 34 was then poured into the graphite foil box 33 to a depth of about 0.75 inches (19 mm), and the mixture was tapped lightly to level the surface. The surface of the filler material mixture 34 was coated with about 4 grams of −50 mesh magnesium powder 35 (sold by Alpha Products, Morton Thiokol, Denvers, Mass.). About 1268 grams of a matrix metal 36, comprising by weight about ≦0.25% Si, ≦0.30% Fe, ≦0.25% Cu, ≦0.15% Mn, 9.5–10.6% Mg, ≦0.15% Zn, ≦0.25% Ti and the balance aluminum, were placed on the filler material mixture 34 coated with the magnesium powder 35.

The steel box 32 and its contents were placed into a stainless steel container 37 measuring about 10 inches (254 mm) long by about 10 inches (254 mm) wide by about 8 inches (202 mm) high. The bottom of the stainless steel container 37 had been prepared by covering the bottom of the box with a piece of graphite foil 38 measuring about 10 inches (254 mm) long by about 10 inches (254 mm) wide by about 0.010 inch (0.25 mm) thick and a fire brick 39 had been placed on the graphite foil 38 to support the steel box 32 within the stainless steel container 37. Approximately 20 grams of a titanium sponge material 40 (from Chemalloy Company, Inc., Bryn Mawr, Pa.), was sprinkled onto the graphite foil 38 in the bottom of the stainless steel container 37 around the fire brick 39 supporting the steel box 32. A sheet of copper foil 41 was placed over the opening of the stainless steel container 37 to form an isolated chamber. A nitrogen purge tube 42 was provided through the sheet of copper foil 41. The stainless steel container 37 and its contents were placed into a resistance heated air atmosphere box furnace.

The furnace was heated from room temperature to about 600° C. at a rate of about 400° C./hour with a nitrogen flow rate through the tube 42 of about 10 liters/minute, then heated from about 600° C. to about 800° C. at a rate of about 400° C./hour with a nitrogen flow rate of about 2 liters/minute. The system was maintained at about 800° C. for about 2 hours with a nitrogen flow rate of about 2 liters/minute. The stainless steel container 37 and its contents were then removed from the furnace, and the steel box 32 was removed from the stainless steel container 37 and placed onto a room temperature water cooled copper chill plate, having dimensions of about 8 inches (203 mm) long by about 8 inches (203 mm) wide by about 0.5 inches (13 mm) thick, to directionally solidify the metal matrix composite.

Sample C

Figure 11:
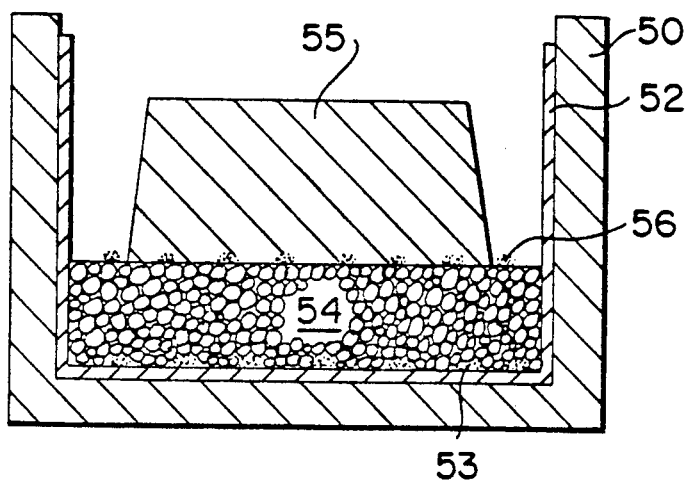
FIG. 11 is a schematic cross-sectional representation of a lay-up for producing a spontaneously infiltrated matrix metal composite according to Example 5.

FIG. 11 shows a schematic cross-section of the setup used to produce a metal matrix composite sample, as described below. Specifically, a graphite boat 50 was provided, having an inner cavity measuring about 12 inches (305 mm) long by about 8 inches (203 mm) wide by about 5.25 inches (13.3 mm) high, made from ATJ graphite manufactured by Union Carbide. Three graphite foil boxes 52, measuring about 8 inches (203 mm) long by about 4 inches (102 mm) wide by about 5 inches (127 mm) high, were placed in the bottom of the graphite boat 50. The graphite foil box 52 was made from a piece of graphite foil (Grafoil® from Union Carbide), measuring about 14 inches (356 mm) long by about 12.5 inches (318 mm) wide by about 0.015 inches (0.38 mm) thick. Four parallel cuts, about 5 inches (127 mm) from the side and about 5 inches (127 mm) long, were made into the graphite foil. The cut graphite foil was then folded into a graphite foil box 52, glued with a mixture comprising by weight about 1 part graphite powder (KS-44 from Lonza, Inc., Fair Lawn, N.J.) and about 3 parts colloidal silica (LUDOX® SM from E. I. du Pont de Nemours & Co., Inc., Wilmington, Del.) and stapled to hold the box together. The bottom of the graphite foil box 52 was uniformly coated with a layer of −50 mesh magnesium powder 53 (sold by Alpha Products, Morton Thiokol, Denvers, Mass.). The magnesium powder 53 was adhered to the bottom of the graphite foil box 52 with a mixture comprising by volume about 25 to 50 percent graphite cement (RIGID-LOCK TM from Polycarbon, Valencia, Calif.) and the balance ethyl alcohol.

About 1000 grams of a filler material mixture 54, comprising about 98 percent −60 grit tabular alumina (T-64 from Alcoa Industrial Chemicals Division, Bauxite, Ark.) and about 2 percent −325 mesh magnesium powder (sold by AESAR®, Johnson Matthey, Seabrook, N.H.) were placed into a plastic jar and blended on a ball mill for at least 2 hours. The filler material mixture 54 was then poured into the bottom of the graphite foil box 52 lining the graphite boat 50, hand packed and coated with a 6 gram layer of −50 mesh magnesium powder 56 (Alpha Products, Inc., Morton Thiokol, Denvers, Mass.). About 1239 grams of a matrix metal 55, comprising by weight about ≦0.35% Si, ≦0.40% Fe, 1.6–2.6% Cu, ≦0.20% Mn, 2.6–3.4% Mg, 0.18–0.35% Cr, 6.8–8.0% Zn, ≦0.20% Ti and the balance aluminum, were placed onto the filler material mixture 54 in the graphite foil box 52.

The graphite boat 50 and its contents were placed into a room temperature retort lined resistance heated furnace. The retort door was closed and the retort was evacuated to at least 30 inches (762 mm) Hg. After the vacuum had been reached, nitrogen was introduced into the retort chamber at a flow rate of about 2.5 liters/minute. The retort lined furnace was then heated to about 700° C. at a rate of about 120° C./hour and held for about 10 hours at about 700° C. with a flowing nitrogen atmosphere of about 2.5 liters/minute. The retort lined furnace was then ramped from about 700° C. to about 675° C. at a rate of about 150° C./hour. At about 675° C., the graphite boat 50 and its contents were removed from the retort and directional solidification was effected. Specifically, the graphite boat 50 was placed onto a room temperature graphite plate and approximately 500 ml of an external hot-topping material (Feedol®-9, sold by Foseco Inc., Brook Park, Ohio) were poured onto the top of the molten matrix metal contained within the graphite foil box 52, and about 2 inch (51 mm) thick ceramic fiber blanket (CERABLANKET ™, Manville Refractory Products) was wrapped around the the graphite boat 50. At room temperature, the graphite foil box 52 was disassembled to reveal that a metal matrix composite body had formed.

Sample D

Figure 12:
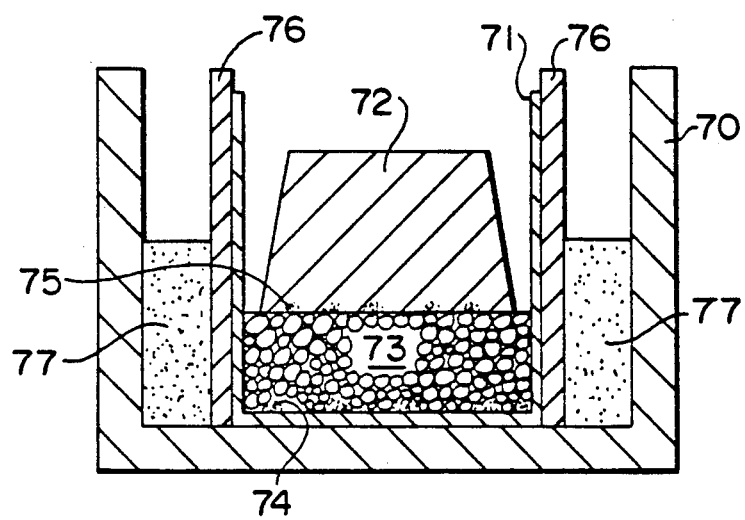
FIG. 12 is a schematic cross-sectional representation of a lay-up for producing a spontaneously infiltrated matrix metal composite according to Example 5.

FIG. 12 shows a schematic cross-section of the setup used to form a metal matrix composite sample, as described below. Specifically, a graphite boat 70 with an inner cavity measuring about 8 inches (203 mm) long by about 4 inches (102 mm) wide by about 2.5 inches (63 mm) deep, made from ATJ graphite manufactured by Union Carbide, was provided. A graphite foil box 71, having dimensions of about 8 inches (203 mm) long by about 1.5 inches (38 mm) wide by about 3 inches (76 mm) high, was placed into the graphite boat 70. The graphite foil box 71 was made from a piece of graphite foil (Grafoil® from Union Carbide), measuring about 14 inches (356 mm) long by about 7.5 inches (191 mm) wide by about 0.015 inch (0.38 mm) thick. Four parallel cuts about 3 inches (76 mm) from the side and 3 inches (76 mm) long, were made into the graphite foil. The graphite foil was then folded into a graphite foil box 71, glued with a graphite cement (RIGIDLOCK ™ from Polycarbon, Valencia, Calif.) and stapled. Once sufficiently dried, the graphite foil box 71 was placed into the graphite boat 70.

About 1000 grams of a filler material mixture 73, comprising by weight about 96 percent alumina platelets measuring about 10 microns in diameter and about 2 microns thick (Developmental Grade F αAl$_2$O$_3$ platelets supplied by E. I. du Pont de Nemours & Co., Inc., Wilmington, Del.), and about 4 percent −325 mesh magnesium powder (from AESAR®, Johnson Mathey, Seabrook, N.H.), were placed into an about 4 liter plastic jar and the remaining volume of the plastic jar was filled with ethyl alcohol to create a slurry mixture. The plastic jar and its contents were then placed on a ball mill for at least 3 hours. The slurry mixture was subjected to vacuum filtration to separate the ethyl alcohol from the filler material mixture 73. After substantially removing the ethyl alcohol, the filler material mixture 73 was placed into an air oven set at about 110° C. and dried overnight. The filler material mixture 73 was then forced through a 40 mesh sieve to complete its preparation. This liquid dispersion technique will be referred to as the "LD technique" hereinafter.

The bottom of the graphite foil box 71 was coated with an approximately 1.5 gram layer of −50 mesh magnesium powder 74 (Alpha Products, Inc., Morton Thiokol, Denvers, Mass.) and adhered to the bottom of the graphite foil box 71 with a graphite cement (RIGIDLOCK ™ sold by Polycarbon, Valencia, Calif.). The filler material mixture 73 was then poured into the bottom of the graphite foil box 71, hand packed and coated with a 1.5 gram layer of −50 mesh magnesium powder 75 (Alpha Products, Inc., Morton Thiokol, Denvers, Mass.). Approximately 644 grams of a matrix metal 72, comprising by weight about ≦0.25% Si, ≦0.30% Fe, ≦0.25% Cu, ≦0.15% Mn, 9.5–10.6% Mg, ≦0.15% Zn, ≦0.25% Ti and the balance aluminum, were placed on the filler material mixture 73 in the graphite foil box 71. Two graphite support plates 76, about 8 inches (203 mm) long by about 3 inches (76 mm) wide by about 0.5 inches (13 mm) thick, were placed along the outer sides of the graphite foil box 71, as shown in FIG. 12. A 220 grit alumina material 77, (38 Alundum from Norton Co., Worcester, Mass.), was placed into the graphite boat around the graphite plates 76.

The system, comprising the graphite boat 70 and its contents, was placed into a room temperature retort lined resistance heated furnace. The retort door was closed, and the retort was evacuated to at least 20 inches (508 mm) Hg. The retort lined furnace was then heated to about 775° C. at a rate of about 100° C./hour with a nitrogen flow rate of about 4 liters/minute. After about 10 hours at about 775° C., with a nitrogen flow rate of about 4 liters/minute, the graphite boat 70 and its contents were removed from the retort furnace and directional solidification was effected. Specifically, the graphite boat 70 was placed onto a room temperature water cooled alumina quench plate and approximately 500 ml of an external hot-topping material (Feedol®-9, sold by Foseco Inc., Brook Park, Ohio) were poured onto the top of the molten matrix metal contained within the graphite foil box 71, and an about 2 inch (51 mm) thick ceramic fiber blanket (CERABLANKET ™, Manville Refractory Products) was wrapped around the the graphite boat 70. At room temperature, the graphite foil box 71 was disassembled to reveal that a metal matrix composite body had formed.

The formed metal matrix composite was subsequently heat treated. Specifically, the composite was placed into a stainless steel wire basket which was then placed into a resistance heated air atmosphere furnace. The furnace was ramped to about 435° C. in about 40 minutes, held for about 18 hours, then the composite was removed from the furnace and quenched in a room temperature water bath.

Example E

Figure 13:
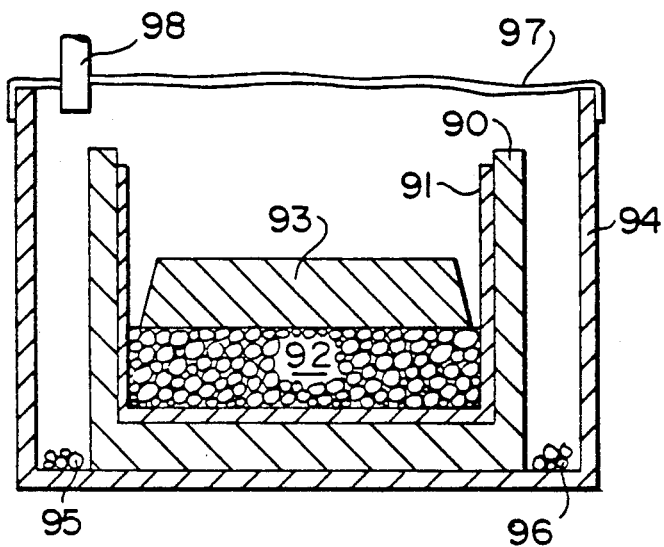
FIG. 13 is a schematic cross-sectional representation of a lay-up for producing a spontaneously infiltrated matrix metal composite according to Example 5.

FIG. 13 shows a schematic cross-section of the setup used to produce a metal matrix composite sample, as described below. Specifically, a stainless steel box 90, having dimensions of about 6 inches (152 mm) long by about 3 inches (76 mm) wide by about 5 inches (127 mm) high, was fabricated by welding together sheets of 300 series stainless steel. The stainless steel box 90 was lined with a graphite foil box 91 measuring about 6 inches (152 mm) long by about 3 inches (76 mm) wide by about 5 inches (127 mm) high. The graphite foil box 91 was made from a piece of graphite foil (Grafoil® from Union Carbide), measuring about 16 inches long (406 mm) by about 13 inches (330 mm) wide by about 0.015 (38 mm) inches thick. Four parallel cuts, 5 inches (127 mm) from the side and 5 inches (127 mm) long were made into the graphite foil. The graphite foil was folded and stapled to form the graphite foil box 91, then placed inside the stainless steel box 90.

A filler material mixture 92 was prepared by mixing in a four liter plastic jar approximately 600 grams of a mixture comprising about 73 percent by weight 1000 grit silicon carbide (39 Crystolon from Norton Co., Worcester, Mass.) about 24 percent by weight silicon carbide whiskers (from NIKKEI TECHNORESEARCH Co., LTD, Japan) and about 3 percent by weight −325 mesh magnesium powder (from AESAR®, Johnson Matthey, Seabrook, N.H.) and placing the jar on a ball mill for approximately one hour.

An approximately 0.75 inch (19 mm) layer of filler material mixture 92 was poured into the bottom of the graphite foil box 91 contained within the stainless steel box 90. Matrix metal ingots 93, comprising by weight about 10 percent silicon, 5 percent copper and the balance aluminum, and having a total weight of about 1216 grams, were placed on top of the filler material mixture 92 contained within the graphite foil box 91. The stainless steel box 90 and its contents were then placed into an outer stainless steel container 94, measuring about 10 inches (254 mm) long by about 8 inches (203 mm) wide by about 8 inches (203 mm) deep. About 15 grams of a titanium sponge material 95 (from Chemalloy Company, Inc., Bryn Mawr, Pa.), and about 15 grams of a −50 mesh magnesium powder 96 (from Alpha Products, Morton Thiokol, Denvers, Mass.), were sprinkled into the outer stainless steel container 94 around the stainless steel box 90. A sheet of copper foil 97 was placed over the opening of the outer stainless steel container 94. A nitrogen purge tube 98 was provided through the copper foil 97.

The system, comprising the stainless steel container 94 and its contents, was placed into a resistance heated air atmosphere furnace. The furnace was heated from room temperature to about 800° C. at a rate of about 550° C./hour with a nitrogen flow rate into the stainless steel container 94 of about 2.5 liters/minute. After about 2.5 hours at about 800° C. with a nitrogen flow rate of about 2.5 liters/minute, the outer stainless steel container 94 and its contents were removed from the furnace. The graphite foil lined stainless steel box 90 was removed from the outer stainless steel container 94 and its contents was placed onto a room temperature copper chill plate, measuring about 8 inches (203 mm) long by about 8 inches (203 mm) wide and about 0.5 inches (13 mm) high, to directionally solidify the metal matrix composite. At room temperature, the graphite foil box 91 was disassembled to reveal that a metal matrix composite had formed.

Sample F

Figure 14:
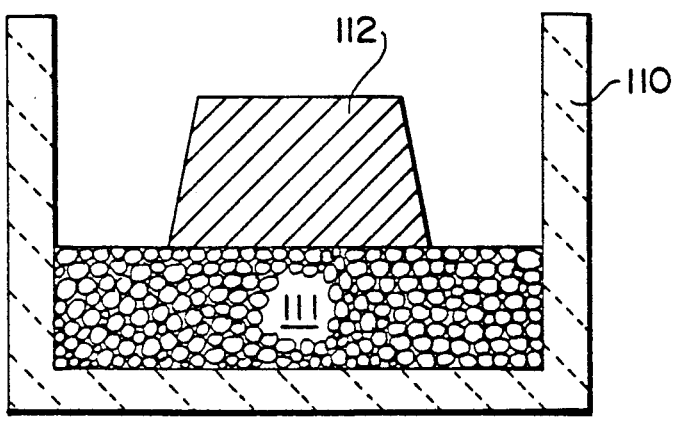
FIG. 14 is a schematic cross-sectional representation of a lay-up for producing a spontaneously infiltrated matrix metal composite according to Example 5.

FIG. 14 shows a schematic in cross-section of the setup used to produce the metal matrix composite sample, as described below. Specifically, an alumina boat with inner cavity dimensions of about 3.75 inches (95 mm) long by about 1.8 inches (45 mm) wide by about 0.79 inches (20 mm) deep, was used. An approximately ⅛ inch layer of a filler material 111 comprising hollow alumina spheres (Aerospheres, sold by Ceramic Fillers Inc., Atlanta, Ga.), was placed into the bottom of the alumina boat 110. Matrix metal ingots 112, comprising by weight about ≦0.25% Si, ≦0.30% Fe, ≦0.25% Cu, ≦0.15% Mn, 9.5–10.6% Mg, ≦0.15% Zn, ≦0.25% Ti and the balance aluminum, were placed onto the layer of filler material 111 in the alumina boat 110.

The alumina boat 110 and its contents were placed into a room temperature resistance heated tube furnace. The tube furnace was substantially sealed, and the tube was evacuated to at least 30 inches (762 mm) Hg. Subsequently, nitrogen at a flow rate of about 0.5 liters/minute was introduced into the tube, and the tube furnace was heated to about 800° C. at a rate of about 300° C./hour. The system was held at about 800° C. for about 0.5 hours with a nitrogen flow rate of about 0.5 liters/minute. The tube furnace was then cooled to room temperature at a rate of about 300° C./minute. At room temperature, the alumina boat 110 was removed from the tube furnace to reveal that a metal matrix composite body had formed.

Sample G

Figure 15:
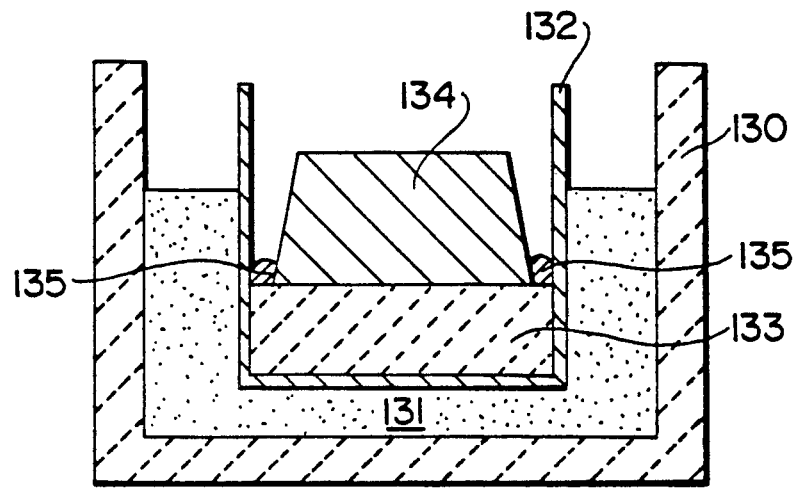
FIG. 15 is a schematic cross-sectional representation of a lay-up for producing a spontaneously infiltrated matrix metal composite according to Example 5.

FIG. 15 shows a schematic cross-section of the setup used to produce a metal matrix composite sample, as described below. Specifically, a graphite boat 130 measuring about 4 inches (102 mm) long by about 4 inches (102 mm) wide by about 3 inches (76 mm) high, made from ATJ graphite manufactured by Union Carbide was provided. A 24 grit alumina material 131 (38 Alundum from Norton Co., Worcester, Mass.), was placed into the bottom of the graphite boat 130. A graphite foil box 132, measuring about 2 inches (51 mm) long by about 2 inches (51 mm) wide by about 3 inches (76 mm) high, was placed on the 24 grit alumina 131 coating the bottom of the graphite boat 130, and the graphite box was surrounded with additional 24 grit alumina 131. The graphite foil box 132 was made from a piece of graphite foil (Grafoil ® from Union Carbide), measuring about 8 inches (203 mm) long by about 8 inches (203 mm) wide by about 0.015 inches (0.38 mm) thick. Four parallel cuts, about 2 inches (51 mm) from the side and about 3 inches (76 mm) long, were made into the graphite foil. The cut graphite foil was then folded, glued with a mixture comprising by weight about 1 part graphite powder (KS-44 from Lonza, Inc., Fair Lawn, N.J.), and about 3 parts colloidal silica (LUDOX ®SM from E. I. du Pont de Nemours & Co., Inc., Wilmington, Del.), and stapled to form the graphite foil box 132.

An alumina fiber preform 133, measuring about 2 inches (51 mm) long by about 2 inches (51 mm) wide by about 0.8 inch (20 mm) thick, was made from a mixture comprising by weight about 90 weight percent chopped alumina fibers having a diameter of about 20 μm (Fiber FP ®, from E. I. du Pont de Nemours & Company, Inc., Wilmington, Del.), about 10 weight percent alumina fibers having a diameter of about 3 μm (designated Saffil ® from ICI Americas, Wilmington, Del.), and which was bonded with a colloidal alumina. The alumina fiber preform 133, which comprised approximately 12 volume percent ceramic fibers, was placed into the bottom of the graphite foil box 132 in the graphite boat 130. Two ingots of matrix metal 134, having dimensions of about 2 inches (51 mm) long by about 2 inches (51 mm) wide by about 1 inch (25 mm) high, comprising by weight about 10.5% Mg, 4% Zn, 0.5% Si, 0.5% Cu and the balance aluminum, were placed on the alumina fiber preform 133 in the graphite foil box 132. The space between the perimeter of the matrix metal ingots 134 and the side wall of the graphite foil box 132 was filled with a pasty graphite mixture 135, comprising by weight about 1 part graphite powder (KS-44 sold by Lonza, Inc., Fair Lawn, N.J.) and about 3 parts colloidal silica (LUDOX ®SM, sold by E. I. du Pont de Nemours & Co., Inc., Wilmington, Del.).

The graphite boat 130 and its contents were placed into a room temperature controlled atmosphere furnace. The furnace door was closed, and the furnace was evacuated to at least 30 inches (762 mm) Hg. The furnace was then heated to about 200° C. in about 0.75 hours. After at least 2 hours at about 200° C., with a vacuum of at least 30 inches (762 mm) Hg, the furnace was backfilled with nitrogen at a flow rate of about 2 liters/minute and heated to about 675° C. in about 5 hours. After about 20 hours at about 675° C., with a nitrogen flow rate of about 2 liters/minute the furnace was turned off and cooled to room temperature. At room temperature, the graphite foil box 132 was disassembled to reveal that a metal matrix composite body had formed.

Sample H

Figure 16:
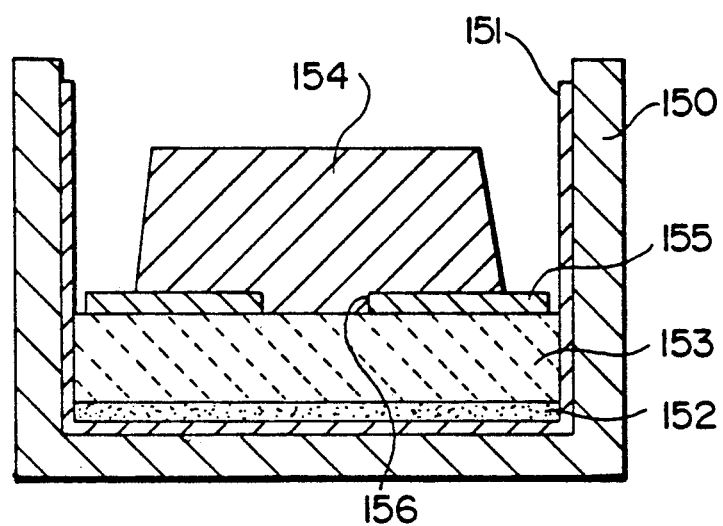
FIG. 16 is a schematic cross-sectional representation of a lay-up for producing a spontaneously infiltrated metal matrix composite according to Example 5.

FIG. 16 shows a schematic cross-section of the setup used to form a fiber reinforced metal matrix composite sample, as described below. A stainless steel container 150, about 6.5 inches (165 mm) long by about 6.5 inches (165 mm) wide by about 3 inches (76 mm) high, was made by welding together sheets of 300 series stainless steel. The stainless steel container 150 was lined with a graphite foil box 151, measuring about 6 inches (152 mm) long by about 6 inches (152 mm) wide by about 3 inches (76 mm) high. The graphite foil box 151 was made from a piece of graphite foil (Grafoil® from Union Carbide), measuring about 9 inches (229 mm) long by about 9 inches (229 mm) wide by about 0.015 inches (0.38 mm) thick. Four parallel cuts, 3 inches (76 mm) from the side and 3 inches (76 mm) long were made into the graphite foil. The cut graphite foil was then folded, glued with a mixture comprising by weight about 1 part graphite powder (KS-44, sold by Lonza, Inc., Fair Lawn, N.J.) and about 3 parts colloidal silica (LUDOX®SM sold by E. I. du Pont de Nemours & Co., Inc., Wilmington, Del.), and stapled to form the graphite foil box 151. After the glue had substantially dried, the graphite foil box 151 was placed into the bottom of the stainless steel container 150. An approximately 0.25 inch (6.4 mm) thick layer of 90 grit SiC 152 (39 Crystolon from Norton Co., Worcester, Mass.), was poured into the bottom of the graphite foil box 151.

A continuous fiber preform 153, measuring about 6 inches (152 mm) long by about 6 inches (152 mm) wide by about 0.5 inches (13 mm) thick, made from alumina fiber having a diameter of about 20 μm (Fiber FP® sold by E. I. du Pont de Nemours & Company, Inc. of Wilmington, Del.) was placed on top of the layer of 90 grit SiC 152 in the graphite foil box 151 lining the stainless steel container 150. A graphite foil sheet 155 (Grafoil® from Union Carbide), measuring approximately 6 inches (152 mm) by 6 inches (152 mm) by 0.015 inches (0.38 mm) with an approximately 2 inch (51 mm) diameter hole 156 in the center of the graphite sheet was placed on the continuous fiber preform 153. Matrix metal ingots 154, each measuring about 3.5 inches (89 mm) long by about 3.5 inches (89 mm) wide by about 0.5 inch (13 mm) thick, and comprising by weight about ≦0.25% Si, ≦0.30% Fe, ≦0.25% Cu, ≦0.15% Mn, 9.5–10.6% Mg, ≦0.15% Zn, ≦0.25% Ti and the balance aluminum, were placed onto the graphite sheet 155.

The stainless steel container 150 and its contents were placed into a room temperature resistance heated retort lined furnace. The retort door was closed, and the retort was evacuated to at least 30 inches (762 mm) Hg. The retort lined furnace was then heated to about 200° C. in about 0.75 hours. After about 2 hours at about 200° C. with a vacuum of about 30 inches (762 mm) Hg, the evacuated retort was backfilled with nitrogen at a flow rate of about 2.5 liters/minute. The retort lined furnace was then heated to about 725° C. at a rate of about 150° C./hour with a nitrogen flow rate of about 2.5 liters/minute. The system was held at about 725° C. for about 25 hours with a nitrogen flow rate of about 2.5 liters/minute. The stainless steel container 150 and its contents were then removed from the retort. Directional solidification was then effected by placing the stainless steel container 150 onto graphite plates, and pouring 90 grit alumina (38 Alundum sold by Norton Co., Worcester, Mass.), which had been preheated to at least 700° C., onto residual molten matrix metal, and the stainless steel container and its contents were covered with a ceramic fiber blanket (CERABLANKET ™, Manville Refractory Products). At room temperature, the setup was disassembled to reveal that a continuous fiber reinforced metal matrix composite had formed.

Sample I

A setup similar to that used for Sample G and shown in FIG. 15 was used to form a metal matrix composite sample, as described below. Specifically, a graphite boat, measuring about 22.75 inches (578 mm) long by about 9.75 inches (248 mm) wide by about 6 inches (152 mm) high, made from ATJ graphite sold by Union Carbide, was used. A graphite foil box, measuring about 17 inches (452 mm) long by about 1 inch (25 mm) wide by about 1 inch (25 mm) high was made from a piece of graphite foil (Grafoil® from Union Carbide), as described in Sample G.

The graphite foil box was placed into the graphite boat and surrounded with 24 grit alumina (38 Alundum sold by Norton Co., Worcester, Mass.). A layer of loose CVD silicon carbide-coated graphite fibers (Thornel T 300 Grade 309 ST Carbon Pitch Fibers, Amoco Performance Products, Inc.) was placed into the bottom of the graphite foil box. The same graphite powder/colloidal silica mixture used to glue the graphite foil box together was used to coat the ends of the CVD silicon carbide-coated graphite fibers. A matrix metal ingot, measuring about 12 inches (305 mm) long by about 0.75 inches (19 mm) wide by about 1 inch (25 mm) thick, and comprising by weight about 6% Mg, 5% Zn, 12% Si and the balance aluminum, was placed onto the loose silicon carbide-coated graphite fibers in the graphite foil box. The graphite boat and its contents were placed into a room temperature controlled atmosphere furnace. The furnace door was closed, and the chamber was evacuated to at least 30 inches (762 mm) Hg, while at room temperature. The furnace was then heated to about 200° C. in about 0.75 hour. After about 2 hours at about 200° C. with a vacuum of at least 30 inches (762 mm) Hg, the furnace was backfilled with nitrogen at a rate of about 1.5 liters/minute. The furnace was then ramped to about 850° C. in about 5 hours. After about 10 hours at about 850° C., with a nitrogen atmosphere flowing at about 1.5 liter/minute, the furnace was cooled to room temperature in about 3 hours. At room temperature, the graphite foil box was disassembled to reveal the formed metal matrix composite.

Figure 17A:
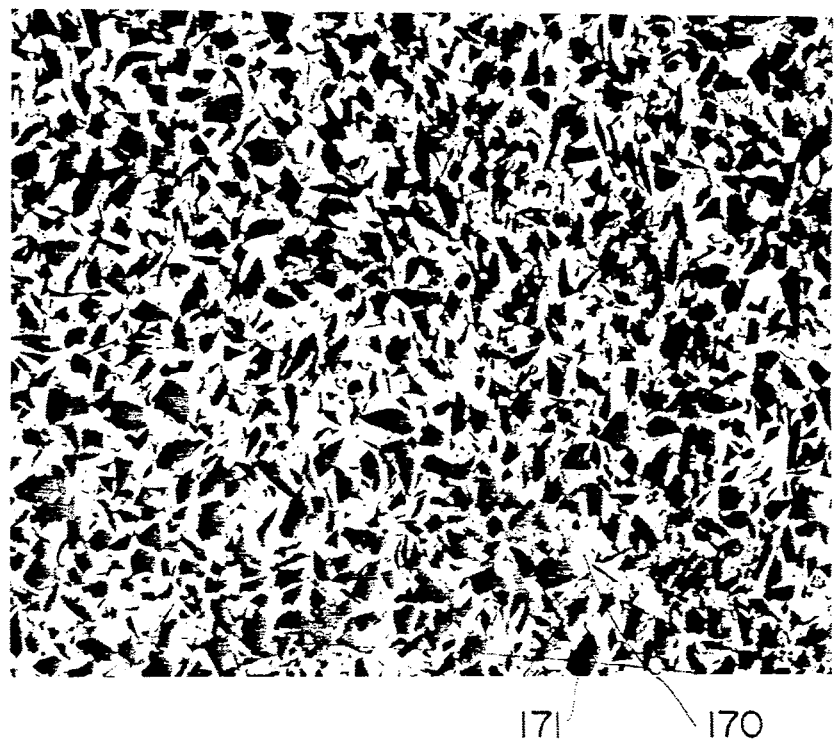
FIGS. 17a-i follow.
Figure 17B:
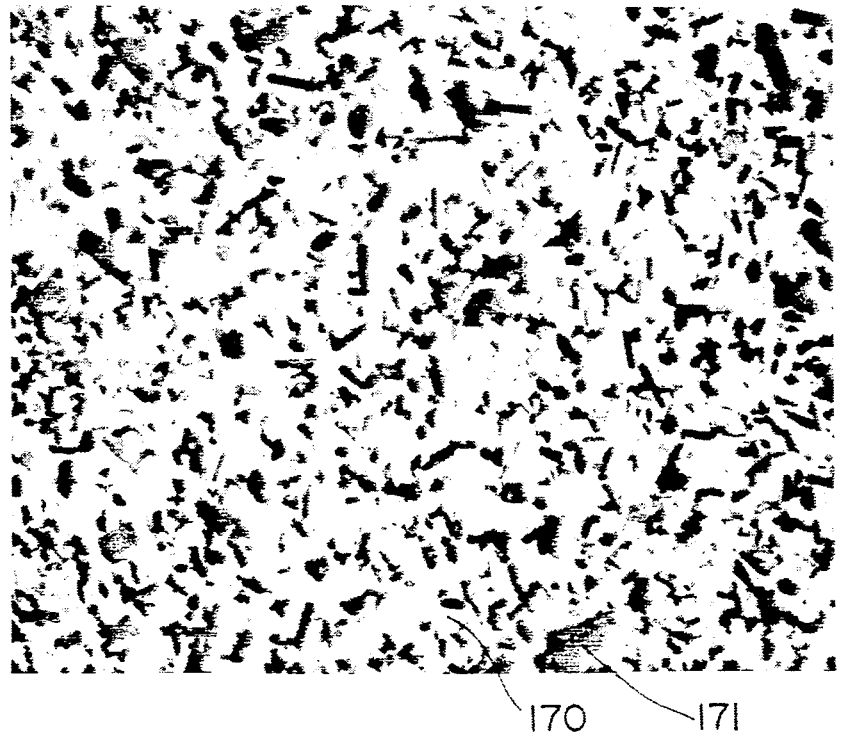
Figure 17C:
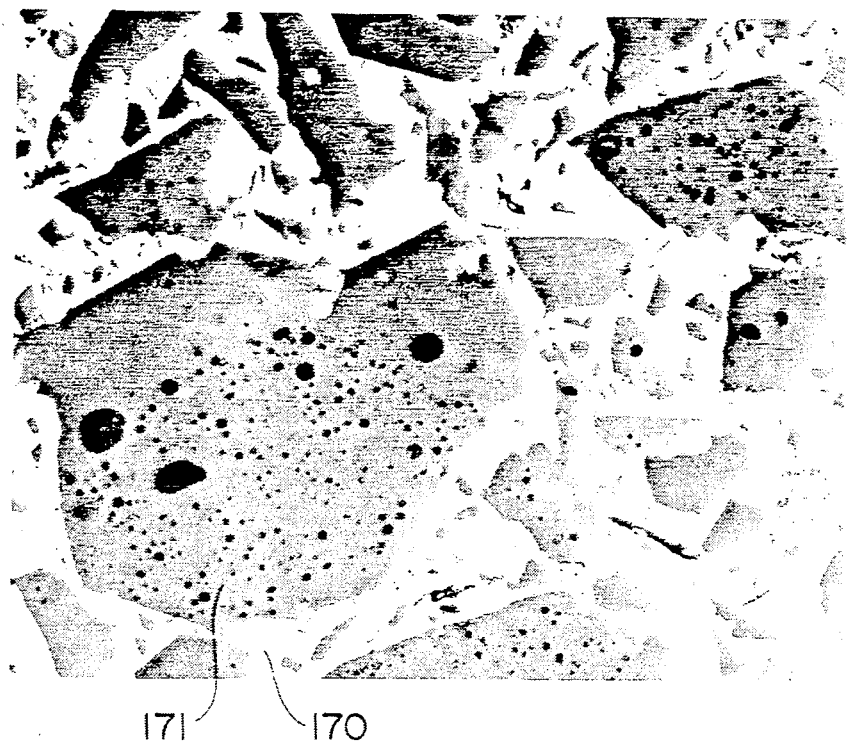
Figure 17D:
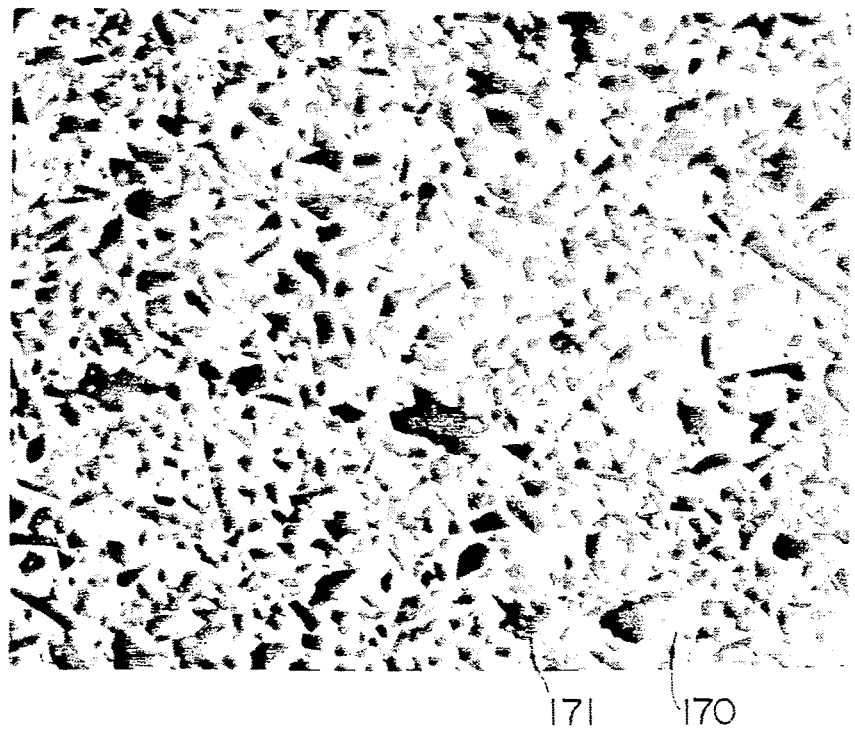
Figure 17E:
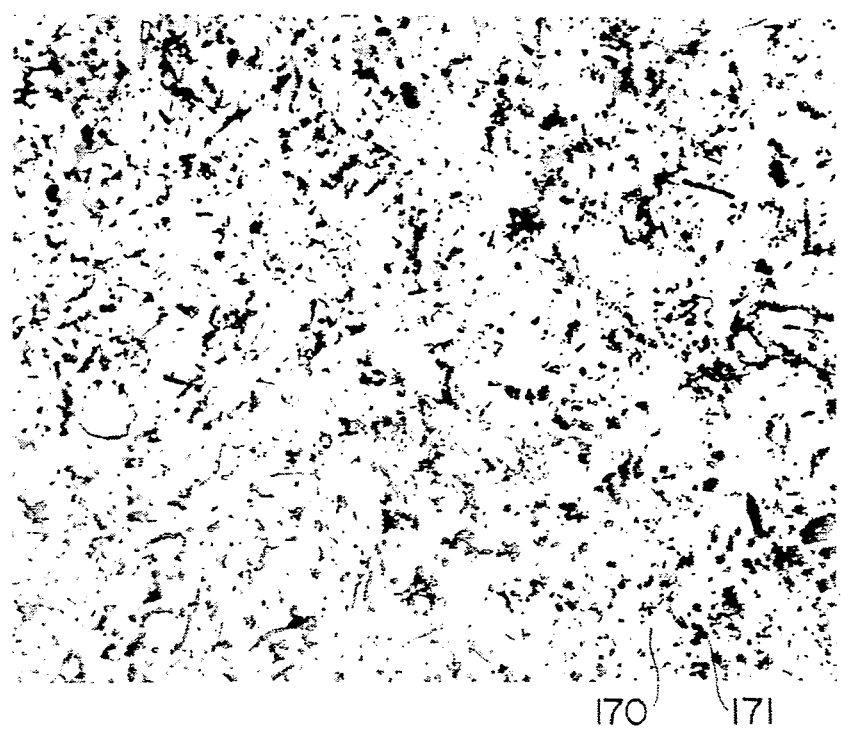
Figure 17F:
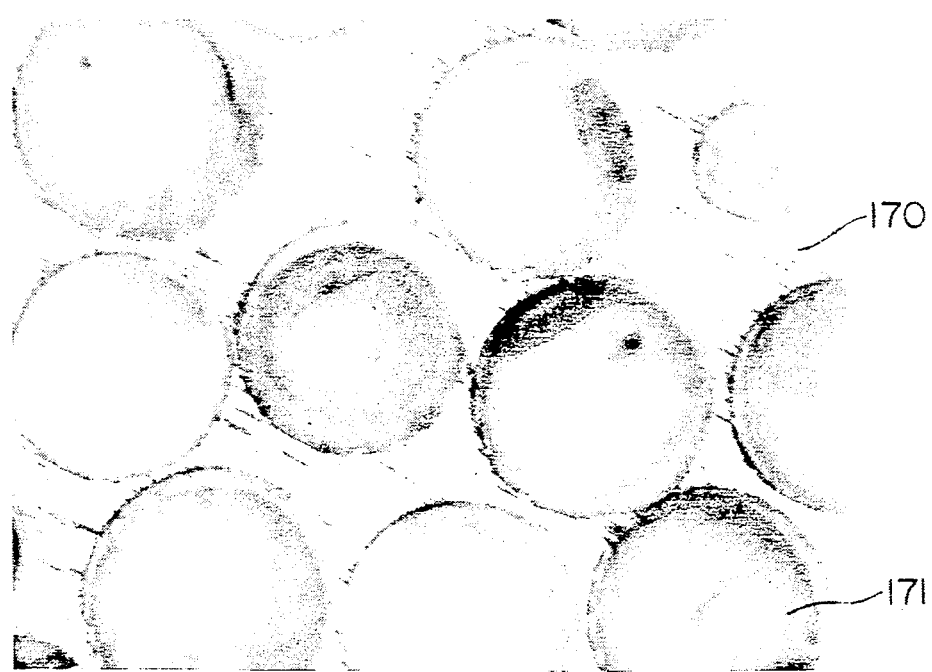
Figure 17G:
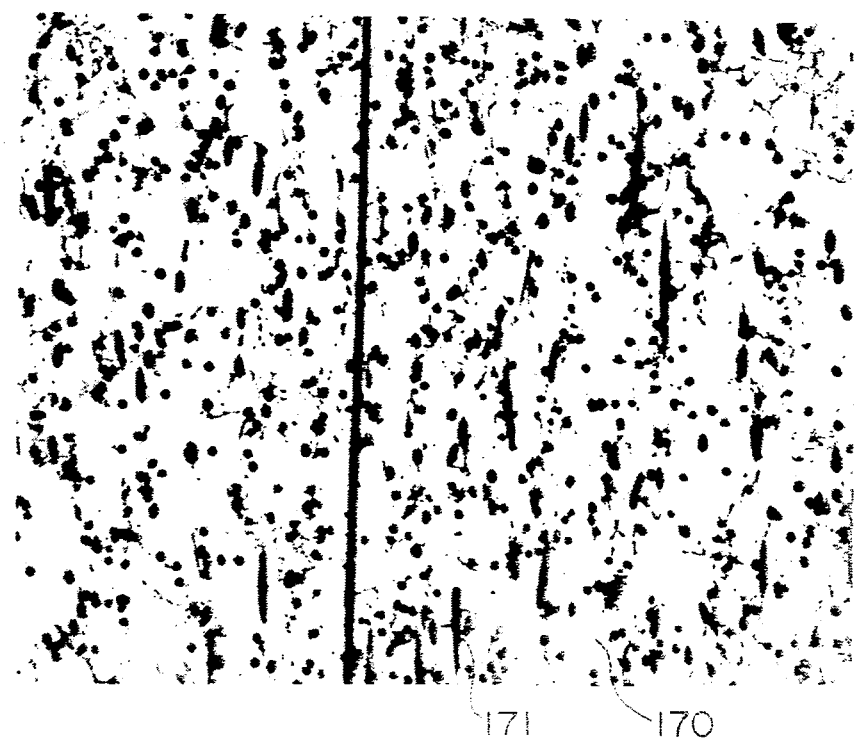
Figure 17H:
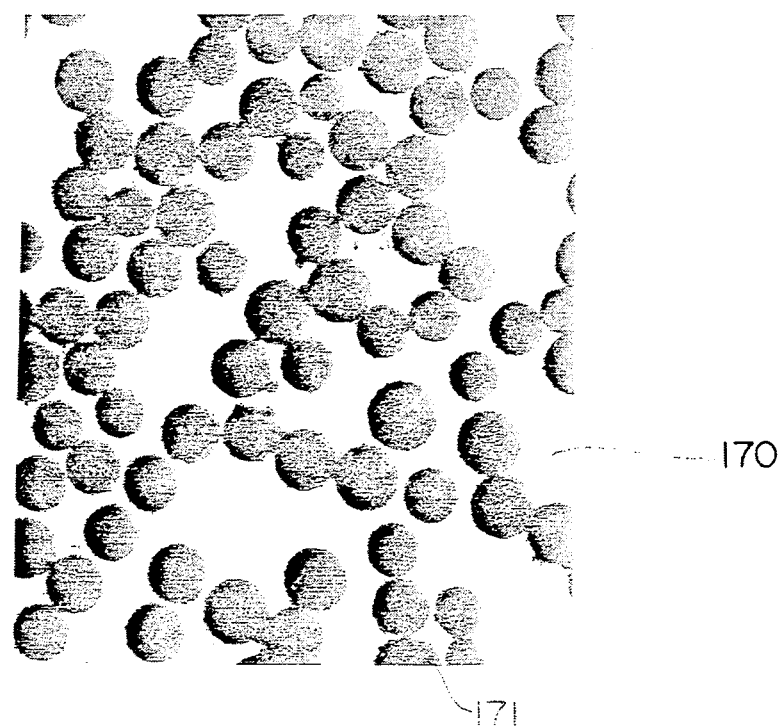
Figure 17I:
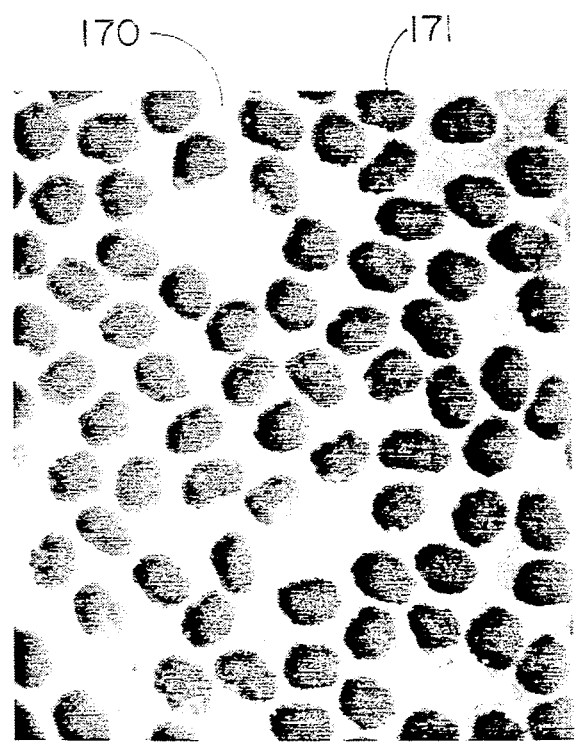

After each of Samples A-I discussed above had cooled to room temperature, each was cross-sectioned to determine whether a metal matrix composite body had formed. All of the Samples A-I of this Example were observed to form aluminum metal matrix composites. Specifically, FIG. 17a is a photomicrograph taken at 50× which corresponds to Sample A; FIG. 17b is a photomicrograph taken at 1000× which corresponds to Sample B; FIG. 17c is a photomicrograph taken at about 400× which corresponds to Sample C; FIG. 17d is a photomicrograph taken at 1000× which corresponds to Sample D; FIG. 17e is a photomicrograph of the whisker reinforced area of the composite taken at 400× which corresponds to Sample E; FIG. 17f is a photomicrograph taken at about 15× which corresponds to Sample F; FIG. 17g is a photomicrograph taken at about 50× which corresponds to Sample G; FIG. 17h is a photomicrograph taken at about 400× which corresponds to Sample H; and FIG. 17i is a photomicrograph taken at about 1000× which corresponds to Sample I. In each of the above-described Figures, the matrix metal is identified by the numeral 170 and the filler material is identified by the numeral 171.

TABLE I

| Sample | Matrix Metal | Filler Material | Processing Time (Hrs.) | Processing Temp. (°C.) | FIG. NO. |
|---|---|---|---|---|---|
| A | 520+ | 220# fused Al$_2$O$_3$[1] | 1.5 | 775 | 17a |
| B | 520.0+ | calcined Al$_2$O$_3$[2] | 2.0 | 800 | 17b |
| C | 7001# | tabular Al$_2$O$_3$[3] | 10 | 700 | 17c |
| D | 520.0+ | Al$_2$O$_3$ Platelets[4] | 10 | 775 | 17d |
| E | Al-10Si-5Cu | SiC Whiskers[5] & 100# SiC particulate[6] | 2.5 | 775 | 17e |
| F | 520.0+ | Al$_2$O$_3$ Microspheres[7] | 0.5 | 800 | 17f |
| G | Al-10.5Mg-4Zn-.5Si-.5Cu | Al$_2$O$_3$ chopped fibers[8&9] | 20 | 675 | 17g |
| H | 520.0+ | Al$_2$O$_3$ continuous fibers[8] | 25 | 725 | 17h |
| I | Al-12Si-6Mg-5Zn | SiC coated carbon[10] | 10 | 850 | 17i |

[1]38 Alundum, Norton Co., Worcester, MA.
[2]C-75 RG. Alcan Chemicals, Montreal, Canada.
[3]T-64 tabular alumina, Alcoa, Pittsburgh, PA.
[4]Developmental Grade F αAl$_2$O$_3$ Platelets, E. I. Du Pont de Nemours & Co., Inc., Wilmington, DE.
[5]NIKKEI TECHNO-RESEARCH Co., LTD, Japan.
[6]39 Crystolon, Norton Co., Worcester, MA.
[7]Aerospheres, Ceramic Fillers Inc., Atlanta, GA.
[8]Fiber FP ® alumina fibers, E. I. du Pont de Nemours & Co., Inc., Wilmington, DE.
[9]Saffil ® alumina fibers, ICI Americas, Wilmington, DE.
[10]Thornel ® T 300 Grade 309 ST Carbon Pitch Fibers, Amoco Performance Products, Inc., Greenville, SC.
+ ≦0.25% Si, ≦0.30% Fe, ≦0.25% Cu, ≦0.15% Mn, 9.5–10.6% Mg, ≦0.15% Zn, ≦0.25% Ti and the balance aluminum.
≦0.35% Si, ≦0.40% Fe, 1.6–2.6% Cu, ≦0.20% Mn, 2.6–3.4% Mg, 0.18–0.35% Cr, 6.8–8.0% Zn, ≦0.20% Ti and the balance aluminum.

EXAMPLE 6

This Example demonstrates that a variety of filler material compositions can be used successfully to form metal matrix composite bodies by the spontaneous infiltration technique. Table II contains a summary of the experimental conditions employed to form metal matrix composite bodies using various matrix metals, filler materials, processing temperatures and processing times.

Samples A-D

Samples A-D, as discussed in Example 5, were formed using a fused alumina filler material, calcined alumina filler material, tabular alumina filler material, and platelet alumina filler material, respectively. Each of Sample A-D are contained in Table II.

Sample J

This sample was formed with a setup substantially similar to that of Sample C, as shown in FIG. 11. Specifically, a graphite foil box, about 4 inches (102 mm) long by about 4 inches (102 mm) wide and about 3 inches (76 mm) tall (made from Grafoil ®, a product of Union Carbide Corporation) was placed into a graphite boat. Approximately 300 grams of magnesium oxide powder (TECO MgO, Grade 120S, C-E Minerals, Greenville, S.C.) was placed into the bottom of the graphite foil box lining the graphite boat. The surface of the magnesium oxide powder was substantially covered with −50 mesh magnesium powder (from Alpha Products, Inc., Morton Thiokol, Denvers, Mass.). A matrix metal ingot comprising by weight ≦0.25% Si, ≦0.30% Fe, ≦0.25% Cu, ≦0.15% Mn, 9.5–10.6% Mg, ≦0.15% Zn, ≦0.25% Ti and the balance aluminum, and measuring about 4.5 inches (114 mm) long by about 1.5 inches (38 mm) wide by about 1.5 inches (38 mm) tall, was placed into the magnesium oxide powder and the −50 mesh magnesium powder in the graphite foil box.

The graphite boat and its contents were placed into a retort lined resistance heated furnace. The retort door was closed and at room temperature, the retort was evacuated to at least 30 inches (762 mm) Hg. After the vacuum was attained, the furnace was backfilled with nitrogen at a flow rate of about 4 liters/minute. The retort lined furnace was then heated to about 750° C. at a rate of about 200° C./hour with a nitrogen flow rate of about 4 liters/minute. After about 19 hours at about 750° C. with a nitrogen flow rate of about 4 liters/minute, the retort lined furnace was cooled to about 650° C. at a rate of about 200° C./hour. At about 650° C., the retort door was opened, and the graphite boat and its contents were removed and placed into contact with a graphite plate to directionally solidify the metal matrix composite and the residual matrix metal. At room temperature, the graphite foil box was disassembled to reveal that a metal matrix composite containing a magnesium oxide filler had been formed.

Sample K

Figure 18:
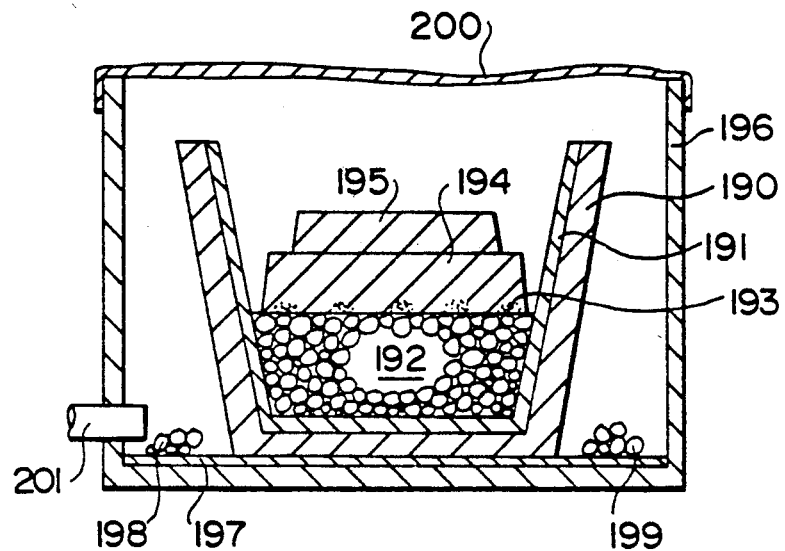
FIG. 18 is a schematic cross-sectional representation of a lay-up for producing a spontaneously infiltrated metal matrix composite according to Example 6.

FIG. 18 shows a schematic cross-section of the setup used to produce a metal matrix composite sample, as described below. Specifically, a steel mold 190 having a trapezoidal cross-section with closed-end dimensions measuring about 3 inches (76 mm) long and 3 inches (76 mm) wide, open-end dimensions measuring about 3.75 inches (95 mm) 3.75 inches (95 mm) wide, and a height of about 2.5 inches (64 mm), was made from 14 gauge (1.9 mm) thick carbon steel. The inner surface of the steel mold was coated with a graphite mixture 191 comprising about 1.5 parts by volume ethanol (from Pharmco Products, Inc., of Byon, N.J.) and about 1 part by volume DAG-154 colloidal graphite (from Acheson Colloid, Port Huron, Mich.). At least three coats of the graphite mixture were applied with an air brush onto the inner surface of the container. Each coat of the graphite mixture was permitted to dry before a subsequent coat was applied. The steel mold was placed into a resistance heated air atmosphere furnace set at about 330° C. for about 2 hours to dry and adhere the colloidal graphite coating 191 to the steel mold 190.

About 2.2 lbs (1 kg) of a partially stablized zirconia (HSY-3SD, Zirconia Sales, Inc., Altlanta, Ga.) was prefired in an alumina crucible, measuring about 7 inches (177.8 mm) high with an upper diameter of about 6.25 inches (159 mm), and a bottom diameter of about 3.75 inches (95 mm) for about 1 hour at about 1350° C. A filler material mixture 192 was made by mixing in a 4 liter plastic jar approximately 600 grams of a mixture comprising about 95 percent by weight prefired $ZrO_2$ and about 5 percent by weight −325 mesh magnesium powder (from Reede Manufacturing Company, Lake Hurst, N.J.). The mixture was ball milled for approximately 1 hour, then handshaken for an additional 10 minutes.

A layer of filler material mixture 192 was poured into the bottom of the colloidal graphite-coated mold 190 to a depth of about 0.75 inches (19 mm). The filler material was substantially covered with a layer of −50 mesh Mg powder 193 (from Alpha Products, Morton Thiokol, Denvers, Mass.). Matrix metal ingots comprising about 99.7 percent by weight aluminum and the balance trace elements, with a total weight of about 537 grams, were placed on top of the filler material mixture 192 and the magnesium powder layer 193 within the colloidal graphite-coated steel mold 190. An additional 16.9 grams of a second matrix metal 195, comprising about 15 percent by weight silicon and the balance aluminum, were added to the top of the original matrix metal 194. The mold 190 and its contents were then placed into an outer carbon steel container 196, measuring about 12 inches (305 mm) long by about 10 inches (254 mm) wide by about 10 inches (254 mm) high. A piece of graphite foil 197 (designated PF-25-H and sold under the trade name Perma-Foil from TT America, Portland, Oreg.) measuring about 12 inches (305 mm) long by about 10 inches (254 mm) wide with a thickness of about 0.01 inch (0.25 mm), covered the bottom of the inner cavity of the outer carbon steel container 196. A titanium sponge material 198 weighing about 20 grams (from Chemalloy Company, Inc., Bryn Mawr, Pa.) and −50 mesh magnesium powder 193 (Alpha Products, Inc., Morton Thiokol, Denvers, Mass.), weighing about 0.8 grams, were sprinkled into the outer carbon steel container 196 around the colloidal graphite coated steel mold 190 and on the graphite foil 197. A sheet of copper foil 200 was placed over the opening of the outer steel container 196. A nitrogen purge tube 201 was provided in the side wall of the outer carbon steel container 196. The outer steel container 196 and its contents were placed into a resistance heated utility furnace. The furnace was ramped from room temperature to about 600° C. at a rate of about 400° C./hour with a nitrogen flow rate of about 10 liters/minute, then from about 600° C. to about 800° C. at a rate of about 400° C./hour with a nitrogen flow rate of about 2 liters/minute. The furnace was held at about 800° C. for about 1 hour with a nitrogen flow rate of about 2 liters/minute. The outer carbon steel container 196 and its contents were removed from the furnace, and the colloidal graphite-coated steel mold 190 was removed from the outer steel container and contacted with a room temperature copper chill plate, measuring about 8 inches (203 mm) long by 8 inches (203 mm) wide and 0.5 inches (13 mm) high, to directionally solidify the formed metal matrix composite.

Sample L

Sample L was produced by utilizing a setup similar to that shown in FIG. 18 for Sample K. A mold having a trapezoidal cross-section was prepared in a manner identical to that of Sample K, except the mold was fired for 2 hours to set the colloidal graphite coating.

Approximately, 2.2 lbs (1 kg) of a $ZrO_2$ toughened $Al_2O_3$ (ZTA-85, Zirconia Sales, Inc., Atlanta, Ga.) was prepared in a manner identical to that of the filler material in Sample K. A layer of filler material mixture was poured into the bottom of the colloidal graphite-coated steel mold to a depth of about 0.75 inches (19 mm). The filler material was substantially covered with a layer of −50 mesh magnesium powder (from Alpha Products, Morton Thiokol, Denvers, Mass.). Matrix metal ingots comprising about 99.7 percent by weight aluminum and the balance trace elements, and weighing about 368 grams, were placed on top of the filler material mixture which was covered with the magnesium powder. A second matrix metal comprising by weight about 15 percent silicon and the balance aluminum, and weighing about 17.11 grams, was placed on top of the first matrix metal. The colloidal graphite-coated steel mold and its contents were placed into an outer carbon steel container, about 12 inches (305 mm) long by about 10 inches (254 mm) wide by about 10 inches (254 mm) high. A piece of graphite tape product (designated PF-25-H and sold under the trade name Perma-Foil from TT America, Portland, Oreg.), and measuring about 12 inches (305 mm) long by about 10 inches (254 mm) wide with a thickness of about 0.01 inch (0.25 mm), covered the bottom of the inner cavity of the outer carbon steel container. A titanium sponge material weighing about 20 grams (from Chemalloy Company, Inc., Bryn Mawr, Pa.), and a −50 mesh magnesium powder, weighing about 2 grams, were sprinkled around the colloidal graphite-coated mold and on the graphite tape product within the outer carbon steel container . A sheet of copper foil was placed over the opening of the outer carbon steel container. A nitrogen purge tube was provided in the side wall of the outer carbon steel container.

The covered steel container and its contents were placed into a resistance heated utility furnace. The furnace was ramped from room temperature to about 600° C. at a rate of about 400° C./hour with a nitrogen flow rate of about 10 liters/minute, then from about 600° C. to about 800° C. at a rate of about 400° C./hour with a nitrogen flow rate of about 2 liters/minute. The furnace was held at about 800° C. for about 1 hour with a nitrogen flow rate of about 2 liters/minute, then cooled to about 580° C. The outer carbon steel container and its contents were then removed from the furnace, and the colloidal graphite-coated steel mold was removed from the outer carbon steel container to a room temperature copper chill plate, measuring about 8 inches (203 mm) long by about 8 inches (203 mm) wide by about 0.5 inches (13 mm) high, to directionally solidify the formed metal matrix composite.

Sample M

Figure 19:
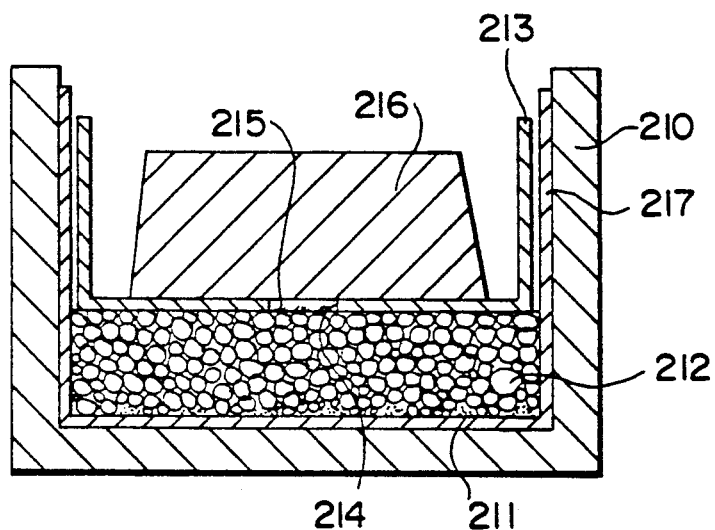
FIG. 19 is a schematic cross-sectional representation of a lay-up for producing a spontaneously infiltrated metal matrix composite according to Example 6.

FIG. 19 shows a schematic cross-section of the setup used to form a metal matrix composite sample, as described below. Specifically, a graphite boat 210 was provided, having inner cavity dimensions of about 12 inches by about 9 inches by about 5.5 inches high (ATJ Grade fror, Union Carbide, manufactured by MGP, Inc., Womelsdorf, Pa.). An approximately 8 inch (203 mm) by 4 inch (102 mm) wide by 3 inch (76 mm) deep graphite foil box 217 (Grafoil ® from Union Carbide) was formed, as described in Sample C. Approximately 1 gram of −50 mesh magnesium powder 211 (from Alpha Products, Inc., Morton Thiokol, Denvers, Mass.) was placed in the bottom of the box 217. A light spray coating (not shown in FIG. 19) of graphite cement (RIGID-LOCK ® from Polycarbon, Valencia, Calif.) was provided on the bottom of the graphite foil box 217 to adhere the magnesium powder to the bottom of the box 217.

A filler material mixture 212 was prepared by mixing approximately 763 grams of a mixture comprising by weight about 98 percent, 1000 mesh silicon carbide (39 Crystolon from Norton Co., Worcester, Mass.) and about 2 weight percent, −325 mesh magnesium powder (Aesar ®, Johnson Mathey, Seabrook, N.H.) in a slurry of ethanol (by the LD technique discussed in Sample D of Example 5). This filler material mixture 212 was then placed into the graphite box 217 on top of the magnesium powder 211.

A layer of graphite foil 213 (Grafoil ® from Union Carbide) having dimensions of approximately 8 inches (203 m) by 4 inches (102 mm) wide by 0.015 inches (0.38 mm) thick, and having an approximately 1.25 inch (32 mm) diameter hole 214 in the center of the graphite foil, was placed onto the surface of the silicon carbide filler material 212 within the graphite boat 210. Approximately 1 gram of −50 mesh magnesium powder 215 (from Alpha Products, Inc., Morton Thiokol, Denvers, Mass.) was placed onto the exposed surface of the filler material 212 over the hole 214 in the graphite foil 213.

A matrix metal ingot 216 weighing approximately 1237 grams and comprised of a 413.0 alloy (having a nominal composition of approximately 11.0–13.0% Si, ≦2.0% Fe, ≦1.0% Cu, ≦0.35% Mn, ≦1.0% Mg, ≦0.50% Ni, ≦0.50% Zn, ≦0.15% Sn and the balance aluminum) was placed onto the surface of the graphite foil 213, such that the alloy 216 covered the hole 214 in the graphite sheet 213.

The reaction system, comprising the boat 210 and its contents, was placed into a retort lined resistance heated furnace. The furnace was evacuated to at least 20 inches (508 mm) Hg, then backfilled with nitrogen gas at a flow rate of approximately 4.5 liters/minute. The furnace temperature was ramped from room temperature to approximately 775° C. at a rate of about 200° C./hour. The system was held at approximately 775° C. for approximately 20 hours, then ramped down to about 760° C. at a rate of about 150° C./hour. At a temperature of approximately 760° C., the system was removed from the furnace and placed onto a water cooled aluminum quench plate. Approximately 500 ml of an exothermic hot-topping material (Feedal ®-9, Foseco, Inc., of Brook Park, Ohio) was sprinkled on top of the setup, and a ceramic fiber blanket (CERABLANKET, Manville Refractory Products) was wrapped around the graphite boat. The Feedal ®-9 was utilized to create an exothermic reaction on top of the setup to force the metal matrix composite to solidify directionally as it cooled, thus inhibiting the formation of shrinkage porosity within the metal matrix composite.

Sample N

This sample was formed with a setup substantially similar to that described in Sample D of Example 5, as shown in FIG. 12. Specifically, two ATJ Grade graphite plates measuring approximately 8 inches (203 mm) long by 3 inches (76 mm) wide by 0.5 inches (0.3 mm) thick were placed into an approximately 8 inch (203 mm) by 4 inch (102 mm) by 3 inch (76 mm) high graphite boat to form a cavity within a graphite boat having dimensions of approximately 8 inches (203 mm) by 2 inches (50.8 mm) by 3 inches (76 mm) high. The portion of the graphite boat outside of the graphite plates was filled with 220 grit alumina (38 Alundum from Norton Company). Into the cavity between the alumina plates was placed an approximately 8 inch (203 mm) by 2 inch (50.8 mm) by 3 inches (76 mm) graphite foil box (Grafoil ® from Union Carbide) which was formed as described in Sample C. Into the inner portion of the graphite foil box was placed approximately 1.5 grams of −50 mesh magnesium powder (Alpha Products, Inc., Morton Thiokol, Denvers, Mass.), adhered to the bottom of the graphite foil box with a graphite cement (RIGID-LOCK ™ from Polycarbon, Ltd., Valencia, Calif.).

A silicon carbide platelet filler material mixture was prepared by the LD technique, described in Sample D of Example 5, whereby approximately 303 grams of a mixture of about 96 percent by weight silicon carbide platelets, having a diameter of about 50 microns and a thickness of about 10 microns, (C-Axis Technology, Ltd., Jonquiere, Quebec, Canada) and about 4 percent by weight −325 mesh magnesium powder (Aesar ®, Johnson Mathey, Seabrook, N.H.) was prepared. This filler material mixture was placed on top of the magnesium layer in the graphite boat. A second layer of approximately 1.5 grams of −50 mesh magnesium powder (Alpha Products, Morton Thiokol, Denvers, Mass.) was placed on top of the silicon carbide filler material mixture. An ingot weighing approximately 644 grams and comprised of a 413.0 alloy, having a composition as set forth at the bottom of Table II, was placed on top of the magnesium layer in the system.

The system, comprising the graphite boat and its contents, was placed into a retort lined resistance heated tube furnace. The furnace was evacuated to at least −20 inches (508 mm) Hg, then backfilled with nitrogen gas at a flow rate of approximately 4.0 liters/minute. The temperature in the oven was ramped from room temperature to approximately 775° C. at a rate of about 100° C./hour. The system was held at approximately 775° C. for about 10 hours, then ramped down to about 760° C. at a rate of about 200° C./hour. The system was removed from the furnace at approximately 760° C. and placed on a water cooled aluminum quench plate. Approximately 500 ml of an exothermic hot-topping material (Feedal ®-9 from Foseco, Inc., of Brook Park, Ohio) was sprinkled on top of the setup, and a ceramic fiber blanket was wrapped around the surface of the graphite boat. The Feedal ®-9 was utilized to create an exothermic reaction on top of the setup to force the metal matrix composite to solidify directionally as it cooled, thus inhibiting the formation of shrinkage porosity within the metal matrix composite.

Sample O

This sample was produced in accordance with the schematic setup for Sample M, as shown in FIG. 19. Specifically, a graphite boat was provided, having inner cavity dimensions of about 12 inches by about 9 inches by about 5.5 inches high (ATJ Grade from Union Carbide, manufactured by MGP, Inc., Womelsdorf, Pa.). An approximately 8 inch (203 mm) by 4 inch (102 mm) wide by 3 inch (76 mm) deep graphite foil box (Grafoil ® from Union Carbide) was formed, as described in Sample C. Approximately 1 gram of −50 mesh magnesium powder (from Alpha Products, Inc., Morton Thiokol, Denvers, Mass.) was placed on the bottom of the graphite foil box. A light spray coating of graphite cement (RIGIDLOCK ® from Polycarbon, Valencia, Calif.) was provided on the bottom of the graphite foil box to adhere the magnesium powder to the bottom of the box.

A filler material was prepared by mixing approximately 94 percent by weight titanium diboride platelets, having a diameter of about 10 microns and a thickness of about 2.5 microns (HTC-30 from Union Carbide) and approximately 6 percent by weight of −325 mesh magnesium powder (Aesar ® from Johnson Mathey, Seabrook, N.H.) by the LD technique, as described in Sample D of Example 5. This filler material mixture was then poured on top of the magnesium powder in the graphite foil box.

An approximately 8 inch (203 mm) by 4 (102 mm) inch by 0.015 (0.38 mm) inch thick graphite foil (Grafoil ® from Union Carbide), having a hole of approximately 1.25 inches (32 mm) in diameter in the center of the foil, was placed on top of the filler material. Approximately 1 gram of −50 mesh magnesium powder (Alpha Products, Morton Thiokol, Denvers, Mass.) was placed onto the exposed surface of the filler material through the hole in the graphite sheet. A matrix metal ingot of approximately 1498 grams of 520 alloy (comprising by weight about ≦0.25% Si, ≦0.35% Fe, ≦0.25% Cu, ≦0.15% Mn, 9.5-10.6% Mg, ≦0.15% Zn, ≦0.25% Ti, and the balance aluminum) was placed on top of the graphite foil sheet.

The graphite boat and its contents were placed into a room temperature retort lined resistance heated furnace. The retort door was closed, and the retort was evacuated to at least 20 inches (508 mm) Hg. The retort was then backfilled with nitrogen at a flow rate of about 4.5 liters/minute. The retort lined furnace was then heated from room temperature to about 775° C. at a rate of about 200° C./hour. After about 20 hours at about 775° C., the retort lined furnace was cooled to about 760° C. at a rate of about 150° C./hour. At about 760° C., the retort door was opened and the graphite boat and its contents were removed from the retort onto a room temperature water cooled aluminum chill plate, having dimensions of about 12 inches (305 m) long by about 9 inches (229M) wide by about 2 inches (51 mm) thick. Approximately 500 ml exothermic hot-topping material (Feedal ®-9 from Foseco, Inc., of Brook Park, Ohio) was sprinkled on top of the setup, and a ceramic fiber blanket (CERABLANKET, Manville Refractory Products) was wrapped around the surface of the graphite boat. The hot-topping material was utilized to create an exothermic reaction on top of the residual matrix metal to help force the metal matrix composite to solidify directionally as it cooled, thus inhibiting the formation of shrinkage porosity within the metal matrix composite.

Sample P

Figure 20:
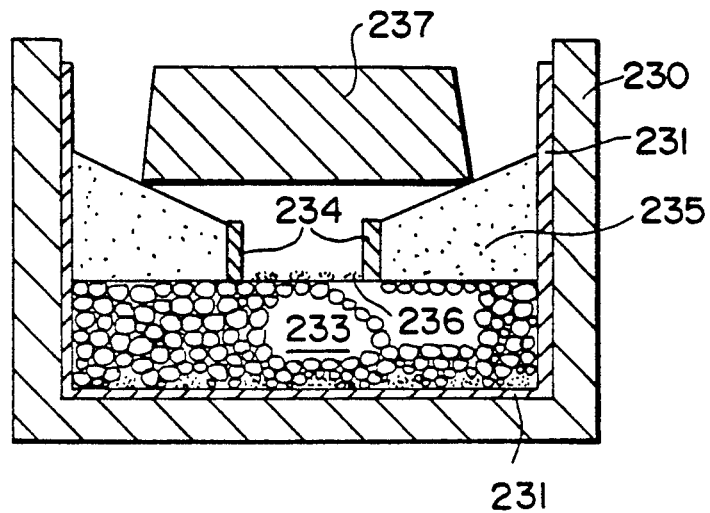
FIG. 20 is a schematic cross-sectional representation of a lay-up for producing a spontaneously infiltrated metal matrix composite according to Example 6.

FIG. 20 shows a schematic cross-section of the setup used to produce a metal matrix composite body, as described below. Specifically, a stainless steel container 230 having dimensions of approximately 6 inches (152 mm) long by 6 inches (152 mm) wide by 7.5 inches (191 mm) deep was lined with a graphite foil box 231 having dimensions of approximately 6 inches (152 mm) by 6 inches (152 mm) by 7.5 inches (191 mm), prepared in accordance with the above-described examples. Approximately 2 grams of −325 mesh magnesium powder 232 (Aesar ® from Johnson Mathey, Seabrook, N.H.) was adhered to the bottom of the graphite box with graphite cement (RIGIDLOCK TM from Polycarbon, Valencia, Calif.). An approximately 500 gram mixture of about 95 percent by weight aluminum nitride powder, having an average particle size diameter of about 3−6 microns, (A-200 AlN from Advanced Refractory Technology, Inc., Buffalo, N.Y.) and about 5 percent by weight −325 mesh magnesium powder (Aesar ® from Johnson Mathey, Seabrook, N.H.), was mixed by mechanical means in a four liter plastic jar for at least 2 hours to obtain an uniform filler material mixture 233. This filler material mixture 233 was placed into the graphite foil box 231. An approximately 1 inch (25 mm) long graphite tube gate 234 having an inner diameter of about 2 inches (51 mm) was placed on top of the filler material 233. A loose bed of 220 grit alumina 235 (E-38 Alundum from Norton Colo.) was poured around the outer diameter of the graphite tube gate 234 which had been centered on top of the filler material 233 within the graphite box 230. Sufficient 220 grit alumina 235 was added to substantially surround the graphite tube gate 234. Approximately 5 grams of −50 mesh magnesium powder 236 (Alpha Products, Morton Thiokol, Danvers, Mass.) was placed into the inner portion of the graphite tube gate to cover the interface of the filler material 233. Approximately 1210 grams of a matrix metal alloy 237, having a nominal composition of 413.0, comprising by weight about 11.0-13.0% Si, ≦2.0% Fe, ≦1.0% Cu, ≦0.35% Mn, ≦0.10% Mg, ≦0.50% Ni, ≦0.50% Zn, ≦0.15% Sn and the balance aluminum, was placed on top of the reaction components, as shown in FIG. 20.

The system, comprising the steel container 230 and its contents, was placed into a retort lined resistance heated furnace, and the furnace was evacuated to at least −20 inches (508 mm) Hg and backfilled with nitrogen gas flowing at a rate of approximately 4.0 liters/minute. The furnace was ramped from room temperature to about 200° C. at a rate of approximately 200° C./hour, held at about 200° C. for approximately 49 hours, then ramped to approximately 550° C. at a rate of about 200° C./hour, held at approximately 550° C. for about 1 hour, then ramped to about 775° C. at a rate of approximately 150° C./hour. The system was held at approximately 775° C. for about 10 hours, then ramped down to about 760° C. at a rate of approximately 150° C./hour. At approximately 760° C., the system was removed from the furnace and directionally cooled by hot-topping. Specifically, the system was placed onto a water cooled aluminum chill plate having dimensions of about 12 inches (305 m) long by about 9 inches (229 mm) wide by about 2 inches (51 mm) thick. Approximately 500 ml of an exothermic hot-topping material (Feedal ®-9 from Foseco, Inc., of Brook Park, Ohio) was sprinkled on top of the setup. A ceramic fiber blanket (CERABLANKET, Manville Refractory Products) was wrapped around the stainless steel container to insulate the system. The hot-topping material was utilized to create an exothermic reaction on top of the residual matrix metal to assist the metal matrix composite to solidify directionally as it cooled, thus inhibiting the formation of shrinkage porosity within the metal matrix composite.

Mechanical properties of some of the metal matrix composite bodies formed in accordance with this Example are shown in Table II. A description of the methods used to determine the mechanical properties is provided below.

Measurement of Ultimate Tensile Strength (U.T.S.)

The tensile strength of some metal matrix composites was determined using ASTM #BS57-84 "Standard Methods of Tension Testing Wrought and Cast Aluminum and Magnesium Products". Rectangular tension test specimens having dimensions of 6 inches (154 mm) long by 0.5 inch (13 mm) wide and 0.1 inches (2.5 mm) thick were used. The gauge section of the rectangular tensile test specimens was about ⅜ inch (10 mm) wide by about 0.75 inches (19 mm) long and the radii from end section to the guage section were about 3 inches (76 mm). Four aluminum gripping tabs, about 2 inches (51 mm) long by about 0.5 inch (13 mm) wide and about 0.3 inches (7.6 mm) thick, were fastened to the end sections of each rectangular tension test specimens with an epoxy (designated Epoxy-patch ™, Dexter Corporation of High Sol Aerospace and Industrial Products, Seabrook, N.H.). The strain of the rectangular tension test specimens was measured with strain gauges (350 ohm bridges) designated CEA-06-375UW-350 from Micromeasurements of Raleigh, N.C.. The rectangular tension test specimens, including the aluminum gripping tabs and strain gauges, were placed in wedge grips on a Syntec 5000 pound (2269 kg) load cell (Universal Testing Machine, Model No. CITS 2000/6 manufactured by System Integration Technology Inc. of Straton, Mass.). A computer data acquisition system was connected to the measuring unit, and the strain gauges recorded the test responses. The rectangular tension test specimens were deformed at a constant rate of 0.039 inches/minute (1 mm/minute) to failure. The maximum stress, maximum strain, strain to failure and yield strength were calculated from the sample geometry and recorded responses with programs within the computer.

Measurement of Modulus by the Resonance Method

The elastic modulus of the metal matrix composites was determined by a sonic resonance technique which is substantially the same as ASTM method C848-88. Specifically, a composite sample measuring from about 1.8 to 2.2 inches long, about 0.24 inches wide and about 1.9 inches thick (about 45 mm to about 55 mm long, about 6 mm wide and about 4.8 mm thick) was placed between two transdusers isolated from room vibrations by an air table supporting a granite stone. One of the transducers was used to excite frequencies within the composite sample while the other was used to monitor the frequency response of the metal matrix composite. By scanning through frequencies, monitoring and recording the response levels for each frequency, and noting the resonant frequency the elastic modulus was determined.

Measurement of the Fracture Toughness for Metal Matrix Material Using a Chevron Notch Specimen The method of Munz, Shannon and Bubsey, was used to determine the fracture toughness of metal matrix materials. The fracture toughness was calculated from the maximum load of Chevron notch specimen in four point loading. Specifically, the geometry of the Chevron notch specimen was about 1.8 to 2.2 inches (45 to 55 mm) long, about 0.19 inches (4.8 mm) wide and about 0.24 inches (6 mm) high. A Chevron notch was cut with a diamond saw to propagate a crack through the sample. The Chevron notched samples, the apex of the Chevron pointing down, were placed into a fixture within a Universal test machine. The notch of the Chevron notch sample, was placed between two pins 1.6 inches (40 mm) apart and approximately 0.79 inch (20 mm) from each pin. The top side of the Chevron notch sample was contacted by two pins 0.79 inch (20 mm) apart and approximately 0.39 inch (10 mm) from the notch. The maximum load measurements were made with a Sintec Model CITS-2000/6 Universal Testing Machine manufactured by System Integration Technology Incorporated of Straton, Mass. A cross-head speed of 0.02 inches/minute (0.58 millimeters/minute) was used. The load cell of the Universal testing machine was interfaced to a computer data acquisition system. Chevron notch sample geometry and maximum load were used to calculate the fracture toughness of the material. Several samples were used to determine an average fracture toughness for a given material.

Quantitative Image Analysis (QIA)

Volume fraction of filler, volume fraction of matrix metal and volume fraction of porosity, were determined by quantitative image analysis. A representative sample of a composite material was mounted and polished. A polished sample was placed on the stage of a Nikon Microphoto-FX optical microscope with a DAGE-MTI Series 68 video camera manufactured in Michigan City, Ind. attached to the top port. The video camera signal was sent to a Model DV-4400 Scientific Optical Analysis System produced by Lamont Scientific of State College, Pa. At an appropriate magnification, ten video images of the microstructure were acquired through optical microscope and stored in the Lamont Scientific Optical Analysis System. Video images acquired at 50×to 100×, and in some cases at 200×, were digitally manipulated to even the lighting. Video images acquired at 200×to 1000×required no digital manipulation to even the lighting. Video images with even lighting, specific color and gray level intensity ranges were assigned to specific microstructural features, specific filler material, matrix metal, or porosity, etc.). To verify that the color and intensity assignments were accurate, a comparison was made between a video image with assignments and the originally acquired video image. If discrepancies were noted, corrections were made to tile video image assignments with a hand hold digitizing pen and a digitizing board. Representative video images with assignments were analyzed automatically by the computer software contained in the Lamont Scientific Optical Analysis System to give area percent filler, area percent matrix metal and area percent porosity, which are substantially the same as volume percents.

Figure 21A:
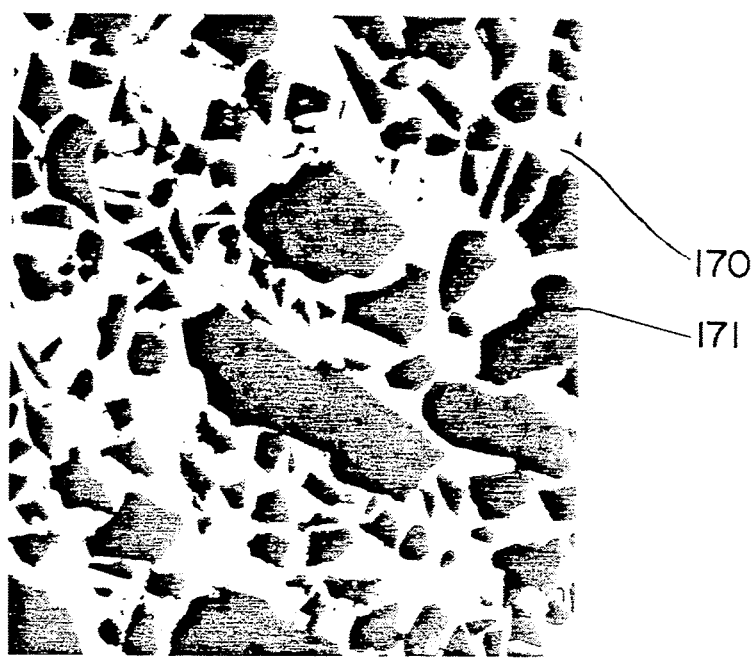
FIGS. 21a-c follow.
Figure 21B:
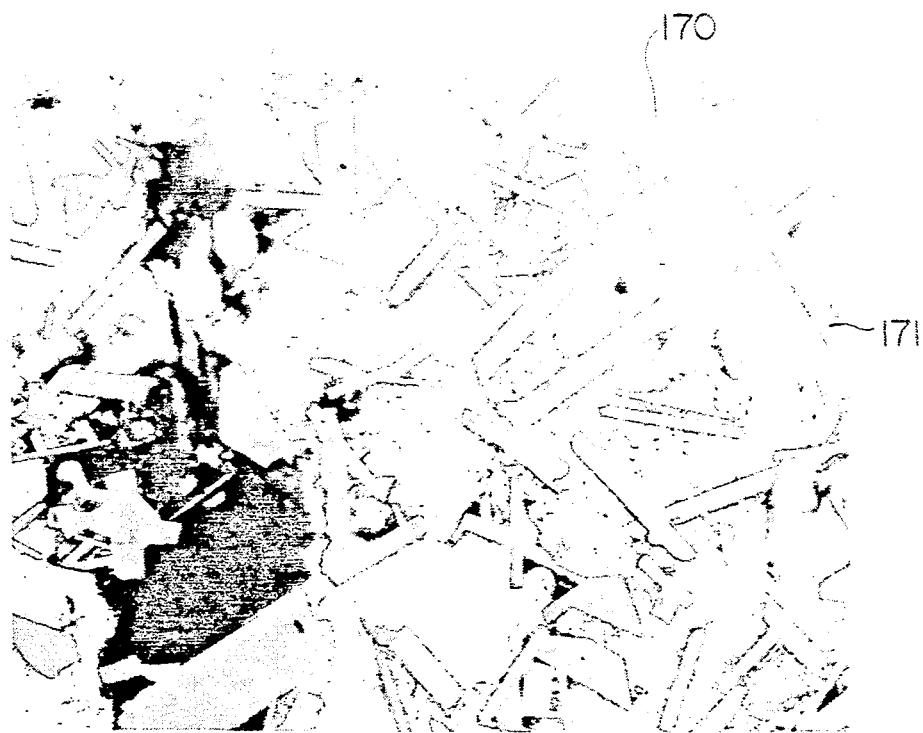
Figure 21C:
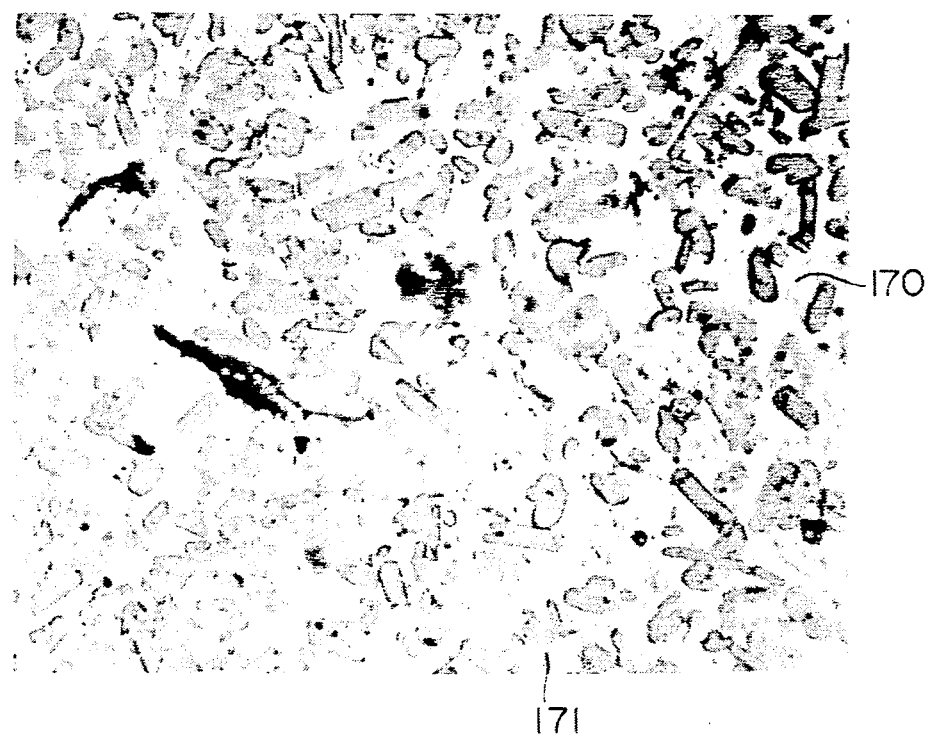

After the samples discussed above had cooled to room temperature, each was cross-sectioned to determine whether a metal matrix composite body had formed. All of the Samples A–C and J–P of this Example were observed to form aluminum metal matrix composites. Specifically, FIG. 17a is a photomicrograph taken at 50×which corresponds to Sample A; FIG. 17b is a photomicrograph taken at 400×which corresponds to Sample B; FIG. 17c is a photomicrograph taken at 400×which corresponds to Sample C; FIG. 21a is a photomicrograph taken at 100×which corresponds to Sample J; FIG. 21b is a photomicrograph taken at 400×which corresponds to Sample N; FIG. 21c is a photomicrograph taken at 1000×which corresponds to Sample O.

Figure 22A:
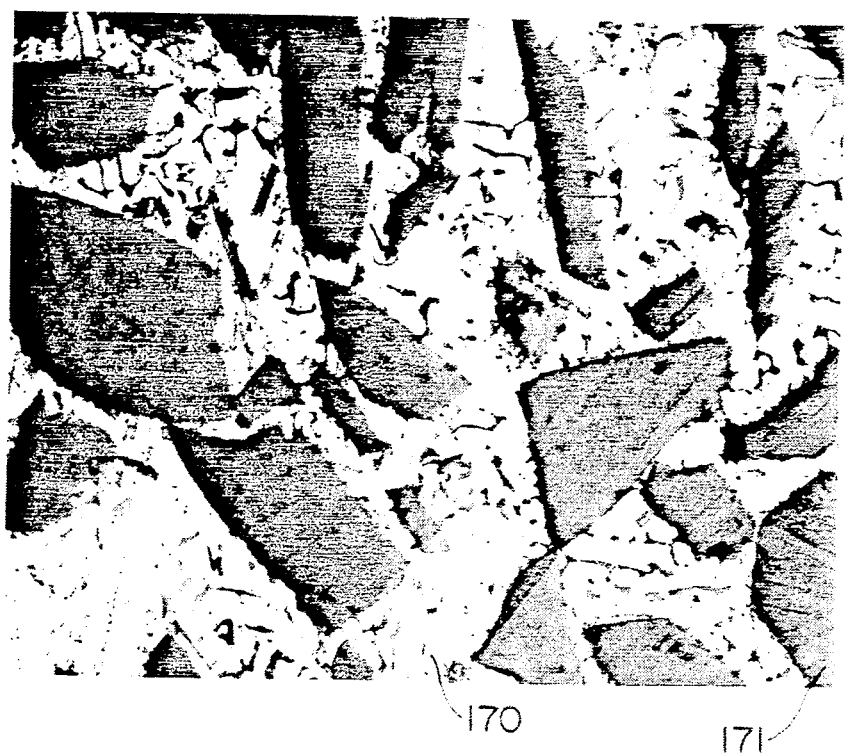
FIGS. 22a-o follow.
Figure 22B:
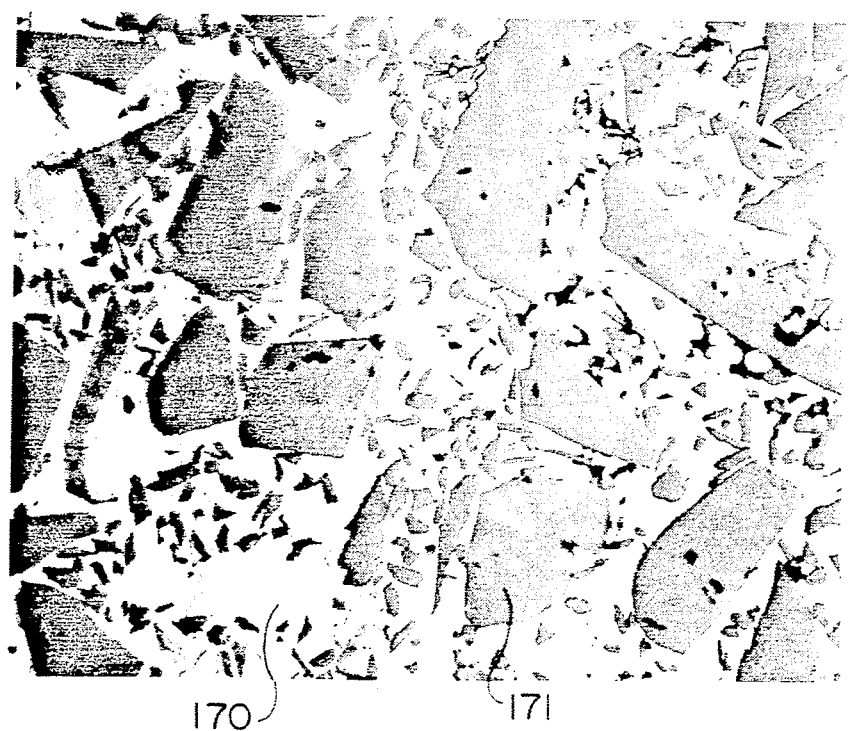
FIG. 22b is a photomicrograph of the metal matrix composite body corresponding to Sample R.
Figure 22C:
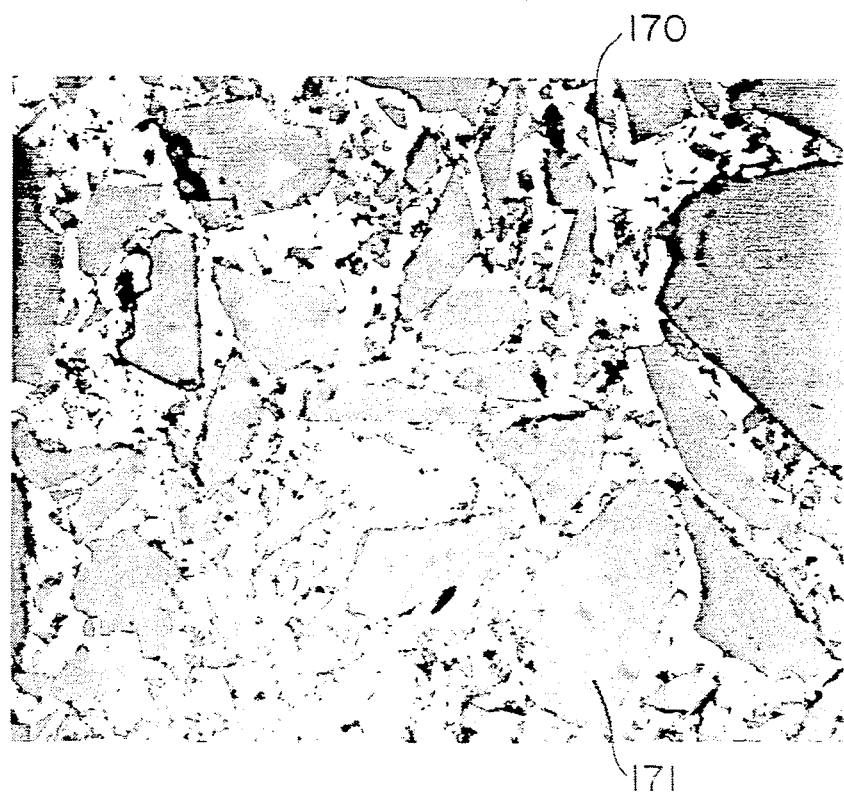
FIG. 22c is a photomicrograph of the metal matrix composite body corresponding to Sample S.

In each of the above-described Figures, the matrix metal is identified by the numeral 170 and the filler material is identified by the numeral 171. Moreover, mechanical properties for the samples are tabulated in Table II.

mine whether a metal matrix composite body had formed. All of the Samples Q-AJ of this Example were observed to form aluminum metal matrix composites. FIG. 22a is a photomicrograph taken at about 400×which corresponds to Sample Q; FIG. 22b is a photomicrograph taken at about 400×which corresponds to Sample R; FIG. 22c is a photomicrograph taken at about 400×which corresponds to Sample S;

TABLE II

| | | Processing | | | | Mechanical Properties | | | |
| | | | | | Proportional | Strain to | Elastic | Fracture | Volume |
| Sample | Matrix Metal | Filler Material | Time (Hrs.) | Temp. (°C.) | U.T.S. (MPa) | Limit (MPa) | Failure (%) | Modulus (GPa) | Toughness (MPa·m$^{1/2}$) | Filler (%) |
|---|---|---|---|---|---|---|---|---|---|---|
| A | 520.0+ | 500# fused Al$_2$O$_3$[1] | 1.5 | 775 | — | — | — | — | — | 41 |
| B | 520.0+ | calcined Al$_2$O$_3$[2] | 2.0 | 800 | — | — | — | — | — | 36 |
| C | 7001# | tabular Al$_2$O$_3$[3] | 10 | 700 | 256 (5) | — | .164 | 176 | 13.04 | 57 |
| D | 520.0+ | Al$_2$O$_3$ Platelets[4] | 10 | 775 | 453 ± 28 (6) | 181 ± 12 (6) | .641 | 128 | 20-30 | 47 |
| J | 520.0+ | MgO[11] | 19 | 750 | — | — | — | — | — | — |
| K | 170.1++ & Al-15Si | ZrO$_2$[12] | 1 | 800 | — | — | — | — | — | — |
| L | 520.0+ & Al-15Si | ZrO$_2$ toughened Al$_2$O$_3$[13] | 1 | 800 | — | — | — | — | — | — |
| M | Al-12Si | SiC particles[14] | 20 | 775 | 265 ± 40 (6) | 62 ± 9 (6) | .392 | 136 | 12.7 ± .5 (7) | |
| N | Al-12Si | SiC platelets[15] | 10 | 775 | 156 ± 22 (6) | 82 ± 18 (6) | .116 | 146 | | 46 |
| O | 520.0+ | TiO$_2$ platelets[16] | 20 | 775 | 461 ± 36 (10) | 143 ± 9 (10) | .754 | 135 | 19.1 ± .9 (9) | 48 |
| P | 413.0§ | AlN[17] | 10 | 775 | — | — | — | — | — | — |

[1]38 Alundum, Norton Co., Worchester, MA.
[2]C-75 RG, Alcan, Montreal, Canada.
[3]T-64 tabular alumina, Alcoa, Pittsburgh, PA.
[4]Developmental Grade F αAl$_2$O$_3$ Platelets, E. I. Du Pont de Nemours & Co., Inc., Wilmington, DE.
[11]TiCO MgO, Grade 120S, C-E Minerals, Greenville, TN.
[12]HSY-35O, Zirconia Sales Inc., Atlanta, GA.
[13]ZTA-85, Zirconia Sales Inc., Atlanta, GA.
[14]1000# 39 Crystolon, Norton Co., Worchester, MA.
[15]C-Axis Technology Ltd., Jonquiere, Quebec, Canada.
[16]HTC-30, Union Carbide.
[17]A-200, Advanced Refractory Technologies, Inc., Buffalo, NY.
+≦0.25% Si, ≦0.30% Fe, ≦0.25% Cu, ≦0.15% Mn, 9.5-10.6% Mg, ≦0.15% Zn, ≦0.25% Ti and the balance aluminum
≦0.35% Si, ≦0.40% Fe, 1.6-2.6% Cu, ≦0.20% Mn, 2.6-3.4% Mg, 0.18-0.35% Cr, 6.8-8.0% Zn, ≦0.20% Ti and the balance aluminum.
§11.0-13.0% Si, ≦2.0% Fe, ≦1.0% Cu, ≦0.35% Mn, ≦0.10% Mg, ≦0.50% Ni, ≦0.50% Zn, ≦0.15% Sn and the balance aluminum.
++99.7% Al and the balance trace elements.

EXAMPLE 7

This Example demonstrates that different filler material mixtures of silicon carbide can be used to form successfully metal matrix composite bodies by the spontaneous infiltration technique. Further, varying filler loadings may be obtained depending on the size of the filler material and/or the processing conditions employed. Table III contains summaries of the experimental conditions employed to form the metal matrix composite bodies of this Example, including varying matrix metals, filler materials, processing temperatures and processing times.

Samples Q-AH

These samples were formed in a manner substantially similar to that of Sample C in Example 5, and as shown in the schematic cross-section of FIG. 11, except that no magnesium powder was placed on the bottom of the graphite foil box prior to adding filler material.

Examples AI-AJ

These samples were formed in a manner substantially similar to that of Sample K in Example 5, and as shown in the schematic cross-section of FIG. 18.

After the samples discussed above had cooled to room temperature, each was cross-sectioned to determine whether a metal matrix composite body had formed. All of the Samples Q-AJ of this Example were observed to form aluminum metal matrix composites.

Figure 22D:
FIG. 22d is a photomicrograph of the metal matrix composite body corresponding to Sample T.
Figure 22E:
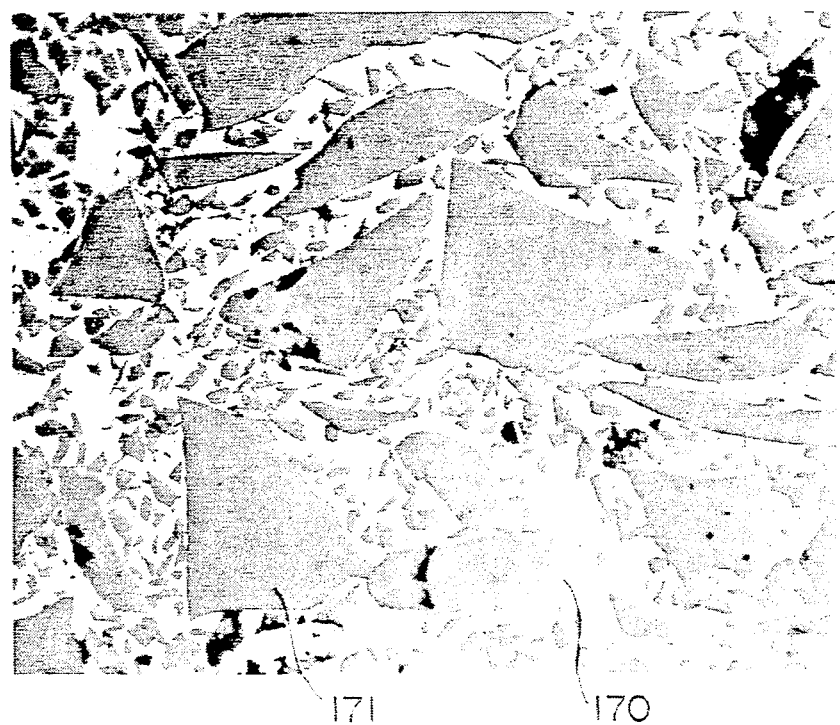
FIG. 22e is a photomicrograph of the metal matrix composite body corresponding to Sample U.
Figure 22F:
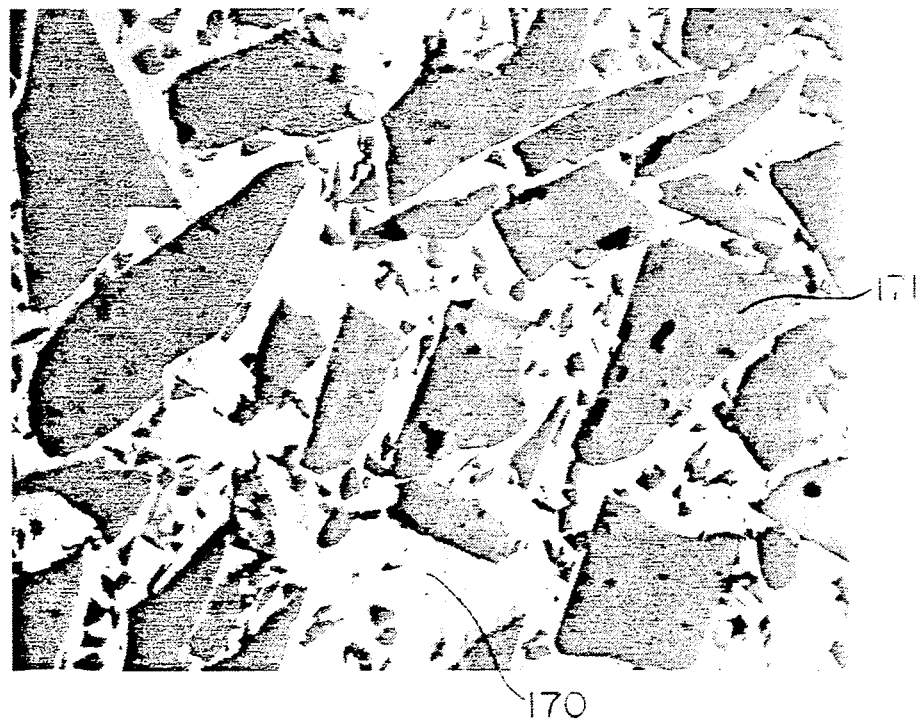
FIG. 22f is a photomicrograph of the metal matrix composite body corresponding to Sample V.
Figure 22G:
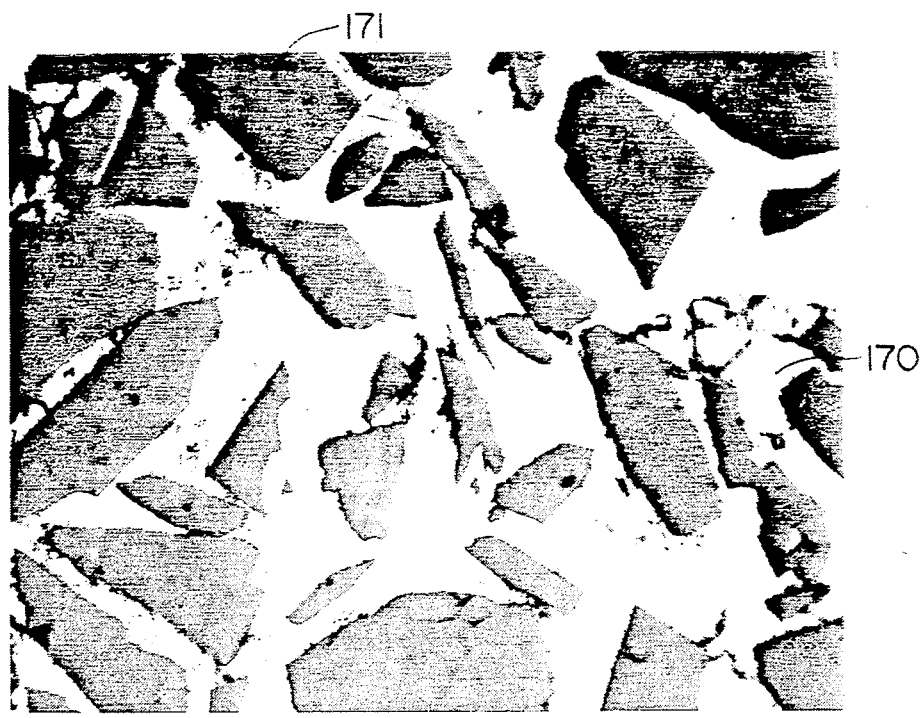
FIG. 22g is a photomicrograph of the metal matrix composite body corresponding to Sample W.
Figure 22H:
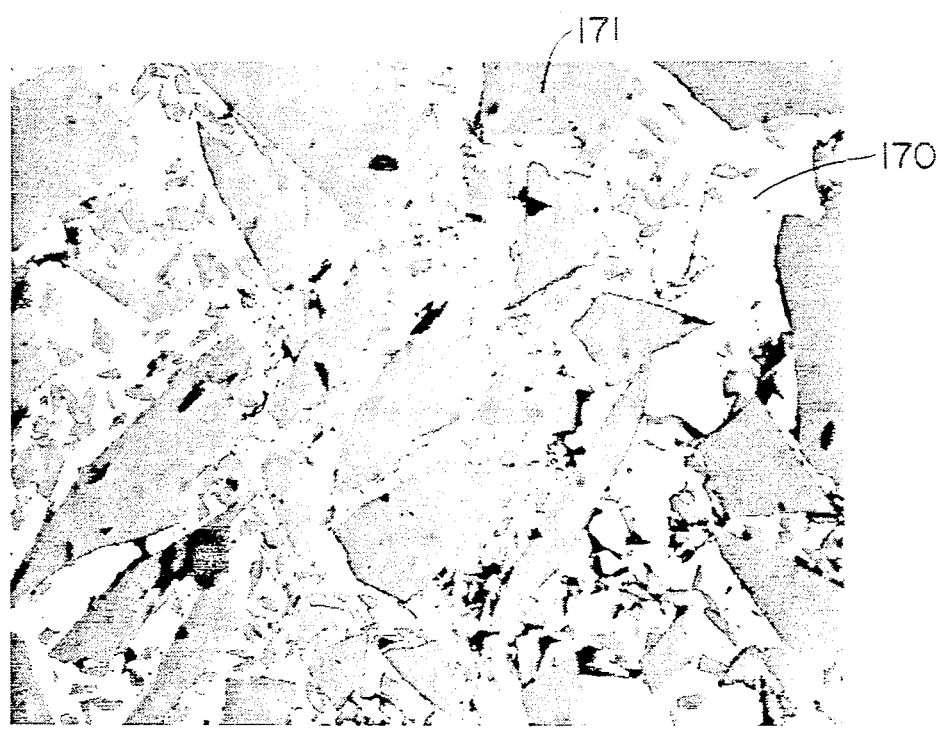
FIG. 22h is a photomicrograph of the metal matrix composite body corresponding to Sample X.
Figure 22I:
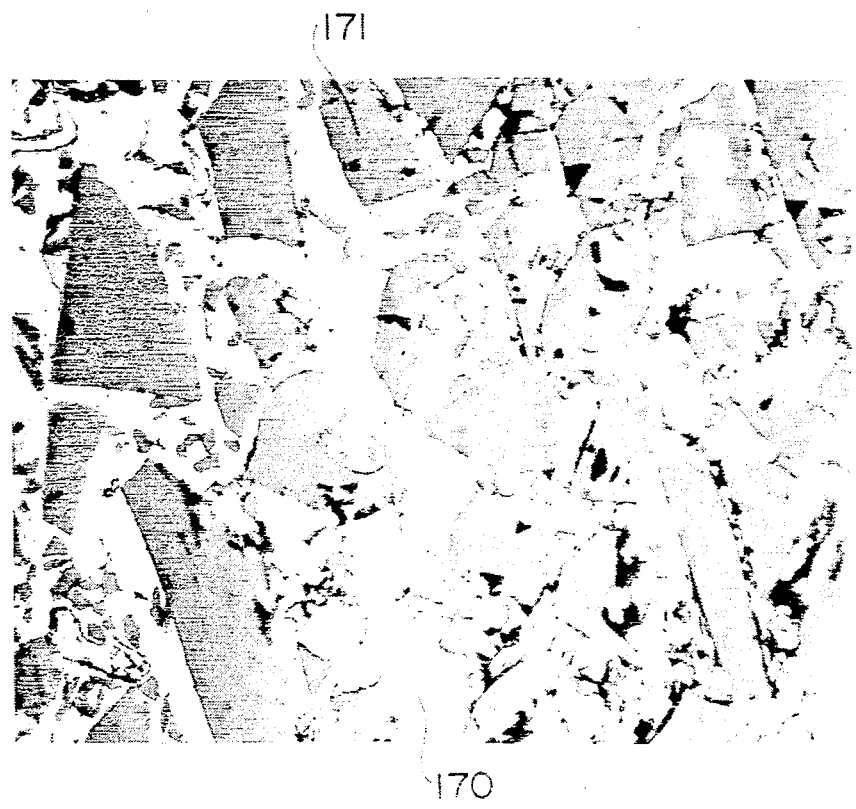
FIG. 22i is a photomicrograph of the metal matrix composite body corresponding to Sample Y.
Figure 22J:
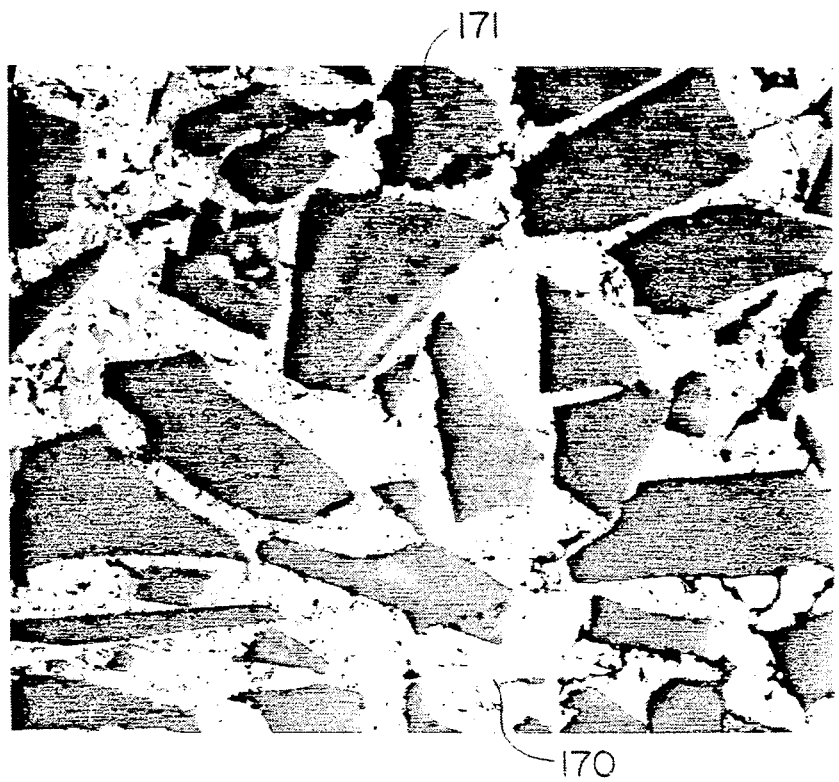
FIG. 22j is a photomicrograph of the metal matrix composite body corresponding to Sample AC.
Figure 22K:
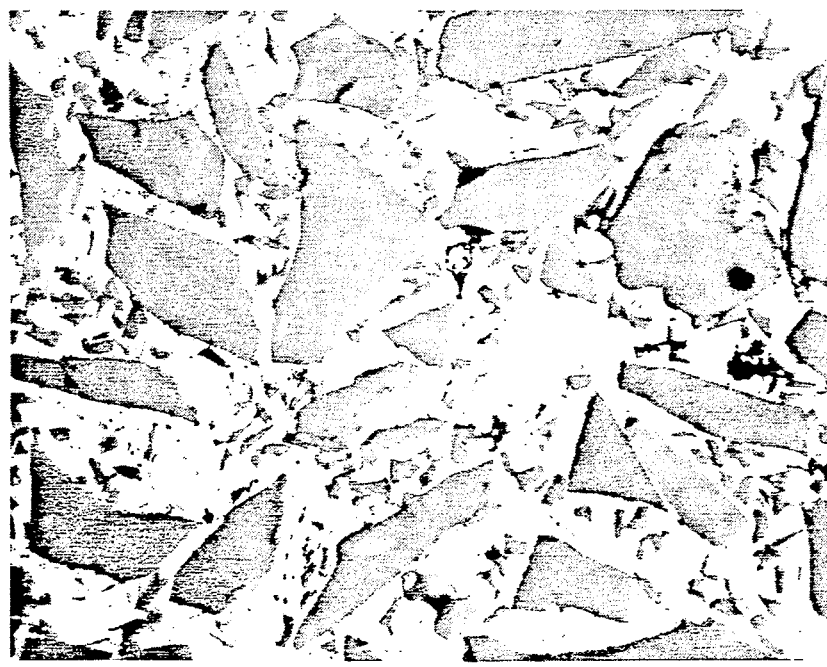
FIG. 22k is a photomicrograph of the metal matrix composite body corresponding to Sample AD.
Figure 22L:
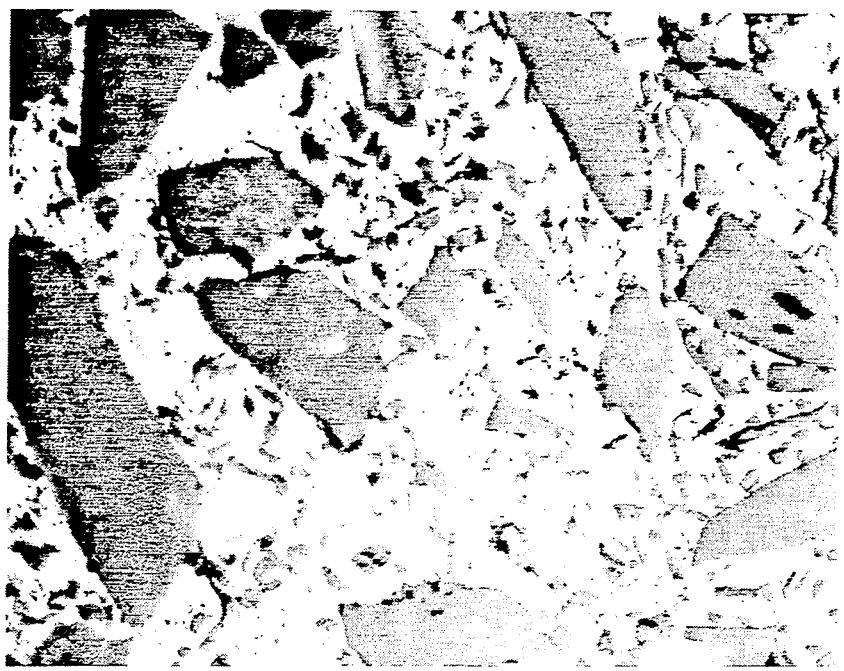
FIG. 22l is a photomicrograph of the metal matrix composite body corresponding to Sample AE.
Figure 22M:
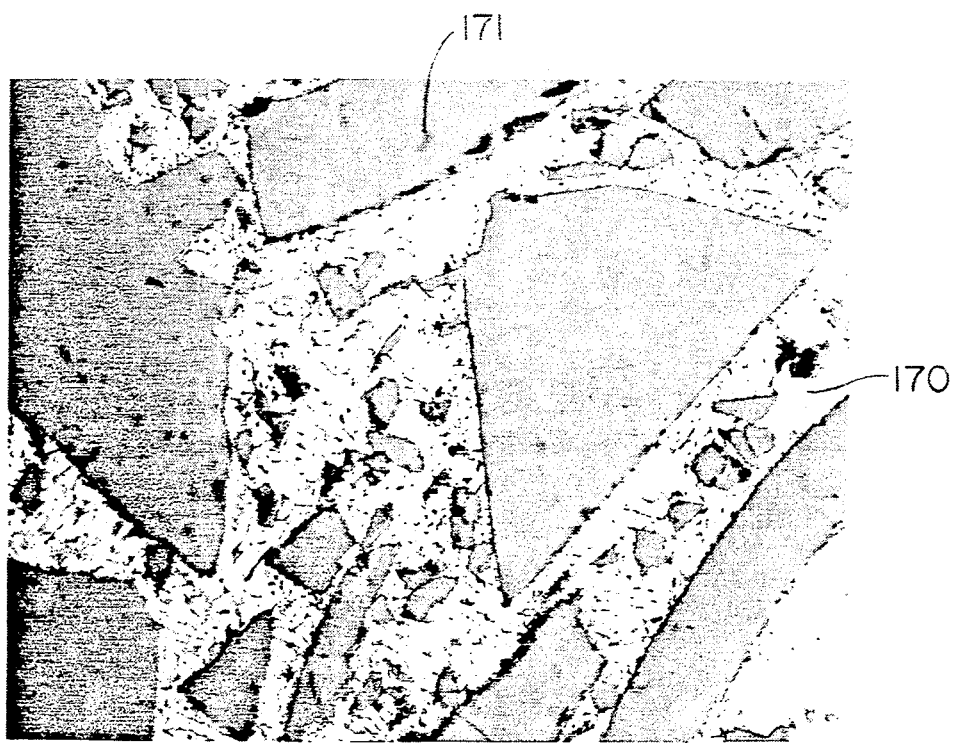
FIG. 22m is a photomicrograph of the metal matrix composite body corresponding to Sample AF.
Figure 22N:
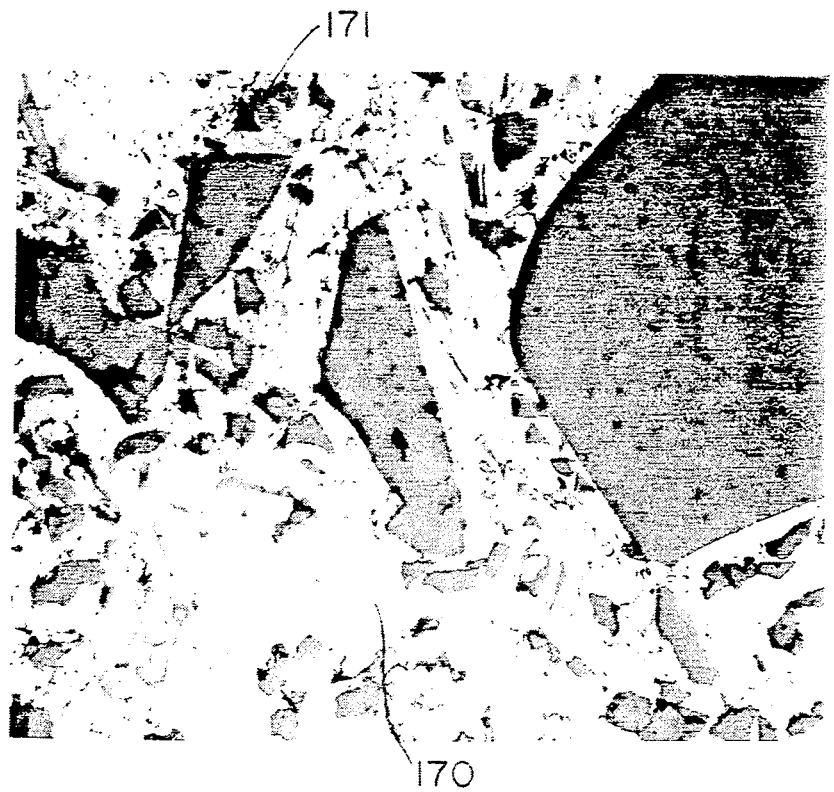
FIG. 22n is a photomicrograph of the metal matrix composite body corresponding to Sample AG.
Figure 22O:
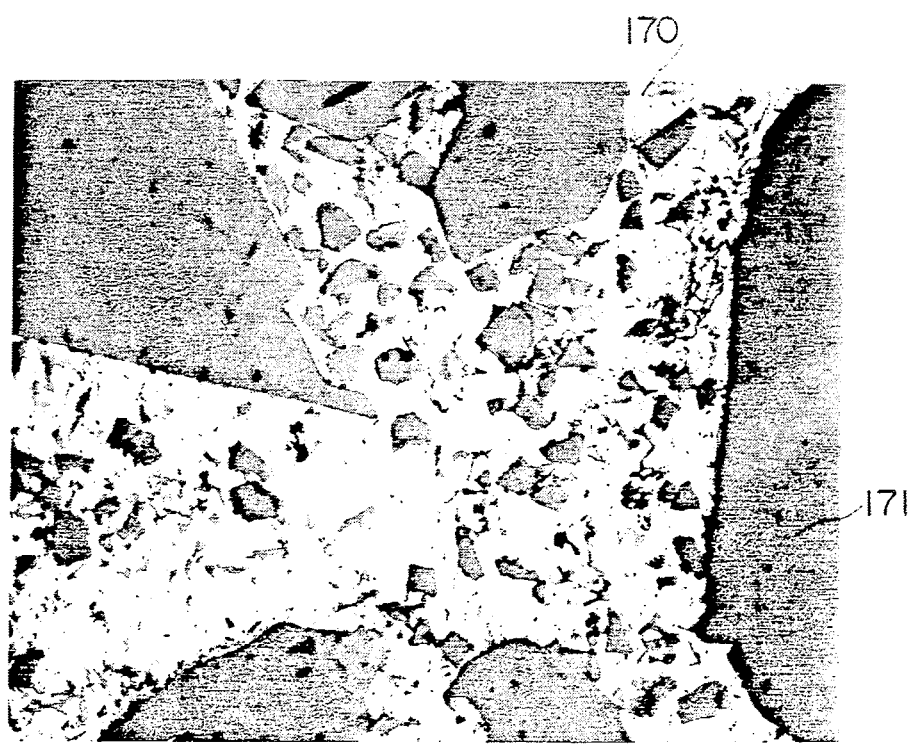

FIG. 22d is a photomicrograph taken at about 400×which corresponds to Sample T; FIG. 22e is a photomicrograph taken at about 400×which corresponds to Sample U; FIG. 22f is a photomicrograph taken at about 400×which corresponds to Sample V; FIG. 22g is a photomicrograph taken at about 400×which corresponds to Sample W; FIG. 22h is a photomicrograph taken at about 400×which corresponds to Sample X; FIG. 22i is a photomicrograph taken at about 400×which corresponds to Sample Y; FIG. 22j is a photomicrograph taken at about 400×which corresponds to Sample AC; FIG. 22k is a photomicrograph taken at about 400×which corresponds to Sample AD; FIG. 22l is a photomicrograph taken at about 400×which corresponds to Sample AE; FIG. 22m is a photomicrograph taken at about 400×which corresponds to Sample AF; FIG. 22n is a photomicrograph taken at about 400×which corresponds to Sample AG; FIG. 22o is a photomicrograph taken at about 400×which corresponds to Sample AH. In each of the above-described Figures, the matrix metal is identified by the numeral 170 and the filler material is identified by the numeral 171.

Mechanical properties of the samples were measured by standard testing procedures, as discussed earlier, and the mechanical properties of the samples are set forth in Table III.

TABLE III

| Sample | Matrix Metal | Filler Material | Processing Time (Hrs.) | Processing Temp. (°C.) | U.T.S (MPa) | Strain Failure (%) | Elastic Modulus (GPa) | C.T.E.[c] per °C. (× 10[−6]) | Fracture Toughness (MPa · m[1/2]) | Den. (g/cm³) | Volume Filler (%) |
|---|---|---|---|---|---|---|---|---|---|---|---|
| Q | Al-12Si-2Mg | 220# SiC[6] | 15 | 750 | 145 (6)[d] | .133 | 164 | 12.2 | 10.37 (5) | 2.87 | 51 |
| R | Al-12Si-2Mg | (75% 220#, 25% 800#) SiC[6] | 15 | 750 | 182 (6) | .161 | 165 | 11.4 | 9.26 (5) | 2.84 | 56 |
| S | Al-12Si-2Mg | (85% 220#, 15% 800#) SiC[6] | 15 | 750 | 160 (5) | .133 | 183 | 11.4 | 11.03 (6) | 2.89 | 65 |
| T | 336.0* | 220# SiC[6] | 15 | 750 | 155 (4) | .110 | 198 | 10.6 | 8.30 (13) | 2.91 | 55 |
| U | 336.0* | (75% 220#, 25% 800#) SiC[6] | 15 | 750 | 143 (5) | .094 | 185 | 9.5 | 8.67 (9) | 2.92 | 64 |
| V | 336.0* | (85% 220#, 15% 800#) SiC[6] | 15 | 750 | 176 (5) | .135 | 195 | 10.4 | 8.42 (8) | 2.91 | 59 |
| W | 390.2 | 220# SiC[6] | 15 | 750 | 86 (6) | .055 | 190 | 10.0 | 8.00 (6) | 2.95 | 52 |
| X | 390.2 | (75% 220#, 25% 800#) SiC[6] | 15 | 750 | 138 (6) | .078 | 219 | 9.7 | 9.23 (6) | 2.93 | 64 |
| Y | 390.2 | 85% 220#, 15% 800#) SiC[6] | 15 | 750 | 169 (5) | .098 | 197 | 9.8 | 8.62 (6) | 2.91 | 55 |
| Z | 413.0[§] | 220# SiC[6] | 15 | 750 | 182 (5) | .184 | 174 | 11.3 | 10.17 (5) | 2.89 | — |
| AA | 413.0[§] | (85% 220#, 15% 800#) SiC[6] | 15 | 750 | 178 (5) | .149 | 175 | 11.2 | 9.99 (9) | 2.90 | — |
| AB | 413.0[§] | (75% 220#, 25% 800#) SiC[6] | 15 | 750 | 230 (5) | .228 | 209 | 10.8 | 10.41 (5) | 2.89 | — |
| AC | Al-12Si-5Zn | 220# SiC[6] | 15 | 740 | 203 (5) | .165 | 160 | 13.4 | 9.63 (5) | 2.94 | 54 |
| AD | Al-12Si-5Cu | (85% 220# 15% 800#) SiC[6] | 15 | 750 | 201 (6) | .135 | 177 | 11.9 | 10.51 (5) | 2.95 | 57 |
| AE | Al-12Si-5Cu | (75% 220#, 25% 800#) SiC[6] | 15 | 750 | 232 (6) | .163 | 176 | 11.7 | 10.38 (6) | 3.02 | 57 |
| AF | Al-12Si-2Mg | SiC Mixture[18] | 15 | 750 | 122 (4) | .087 | 190 | 10.2 | 8.76 (6) | 3.06 | 67 |
| AG | 413.0[§] | SiC Mixture[18] | 15 | 750 | 148 (5) | .096 | 210 | 10.2 | 10.18 (6) | 2.90 | 65 |
| AH | 336.2* | SiC Mixture[18] | 15 | 750 | 123 (5) | .079 | 188 | 8.7 | 7.52 (6) | 2.95 | 65 |
| AI | Al-15Si | SiC Mixture[18] | 1.5 | 800 | — | — | — | — | — | — | 72 |
| AJ | Al-15Si | SiC Mixture[18] | 1.5 | 800 | — | — | — | — | — | — | 71 |

[6]39 Crystolon, Norton Co., Worcester, MA.
[18]55% 54# SiC, 20% 90# SiC, 15% 180# SiC$_2$ and 10% 500# SiC, 39 Crystolon, Norton Co., Worcester, MA.
[c]Average C.T.E from 20-500° C., measured with Model D1-24 Dilitometer, Adamel Lhomargy, France.
[d]Numbers in parenthesis () indicate number of specimens tested.
*11.0–13.0% Si, ≦2.0% Fe, ≦1.0% Cu, ≦0.35% Mn, ≦0.10% Mg, ≦0.50% Ni, ≦0.50% Zn, ≦0.15% Sn and the balance aluminum.
 16.0–18.0% Si, 0.6–1.0% Fe, 4.0–5.0% Cu, ≦0.10% Mn, 0.5–0.65% Mg, ≦0.10% Zn, ≦0.20% Ti and the balance aluminum.
[§]11.0–13.0% Si, ≦2.0% Fe, ≦1.0% Cu, ≦0.35% Mn, ≦0.10% Mg, ≦0.50% Ni, ≦0.50% Zn, ≦0.15% Sn and the balance aluminum.

EXAMPLE 8

This Example demonstrates that metal matrix composite bodies may be formed over a range of processing times. Specifically, the time period for infiltrating a filler material with a matrix metal in the presence of an infiltrating atmosphere and an infiltration enhancer or infiltration enhancer precursor may be varied, depending on the desired result. Table IV contains a summary of the experimental conditions employed to form metal matrix composite bodies over a range of processing times, including matrix metal, filler material and processing conditions.

Samples AL–AN

These samples were produced in a manner substantially similar to that of Sample C in Example 5, and as shown in the schematic cross-section of FIG. 11, except that the graphite boat was coated with a colloidal graphite (DAG-154 from Acheson Colloid, Port Huron, Mich.) rather that lined with a graphite foil box. The system was heated from room temperature to about 350° C. at a rate of about 200° C., held at about 350° C. for about 7 hours, then heated to about 550° C. at a rate of about 200° C., held at about 550° C. for about 1 hour, then heated to about 775° C. at about 150° C./hour and held at about 775° C. for the times shown in Table IV. Moreover, once the reaction system was removed from the furnace, the formed composite was placed onto a water-cooled aluminum quench plate to directionally solidify the composite.

TABLE IV

| Sample | Matrix Metal | Filler Material | Processing Time (Hrs) | Processing Temp (°C.) |
|---|---|---|---|---|
| AL | 520.0[+] | −325 Al$_2$O$_3$[3] | 2 | 775 |
| AM | 520.0[+] | −325 Al$_2$O$_3$[3] | 4 | 775 |
| AN | 520.0[+] | −325 Al$_2$O$_3$[3] | 8 | 775 |

[3]T-64 tabular alumina, Alcoa, Pittsburgh, PA.
[+]≦0.25% Si, ≦0.30% Fe, ≦0.25% Cu, ≦0.15% Mn, 9.5–10.6% Mg, ≦0.15% Zn, ≦0.25% Ti and the balance aluminum.

EXAMPLE 9

This Example demonstrates that the mechanical properties of metal matrix composite bodies may be altered by directional solidification and/or a subsequent heat treatment. Table V contains summaries of the experimental conditions employed to produce the metal matrix composite bodies and the mechanical properties obtained for the formed composite bodies.

Samples C, AO–AS

These samples were formed in a manner identical to that described for Sample C of Example 5, with a schematic cross-section as shown in FIG. 11. Samples AQ-AS were subjected to a T-6 heat treatment schedule, as discussed below.

T6 Heat Treatment

The composites were placed into a stainless steel wire basket which was then placed into a resistance heated air atmosphere furnace set at about 500° C. The composites were heated for about 1 hour at about 500° C., then removed from the furnace and quenched in a room temperature water bath. To allow the precipitation process to occur, the composites were either artificially aged at 160° C. for 10 hours or naturally aged at room temperature for about one week.

Samples AT-AY

These samples were formed in a manner substantially similar to that of Sample C in Example 5, except that (1) no magnesium was placed in the bottom of the graphite foil box utilized; and (2) the reaction systems were held at about 750° C. for about 15 hours. Samples AW-AY were subjected to a T4 heat treatment, as discussed in Sample E of Example 5.

Figure 23A:
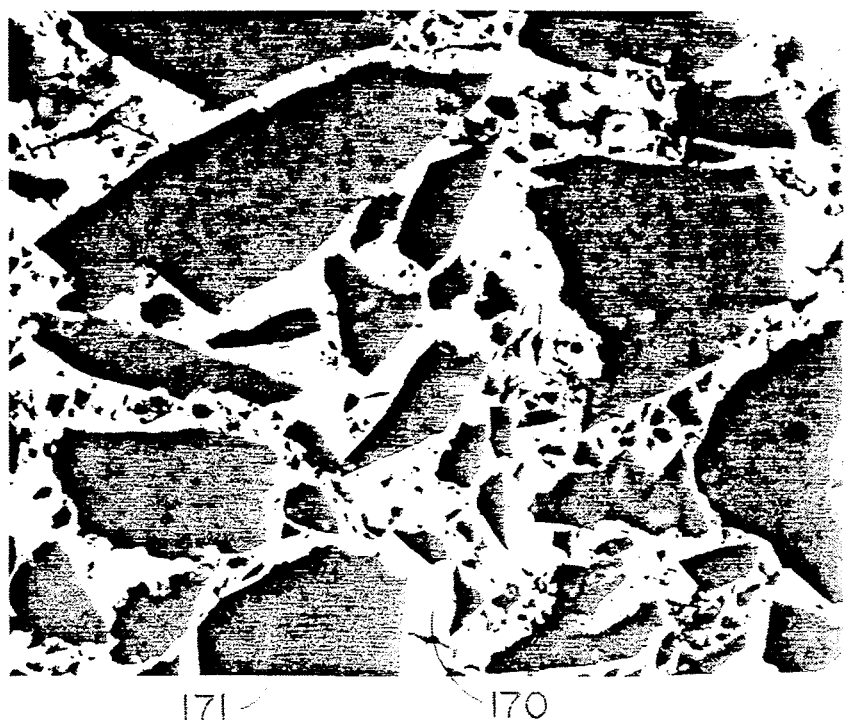
FIGS. 23a-h follow.
Figure 23B:
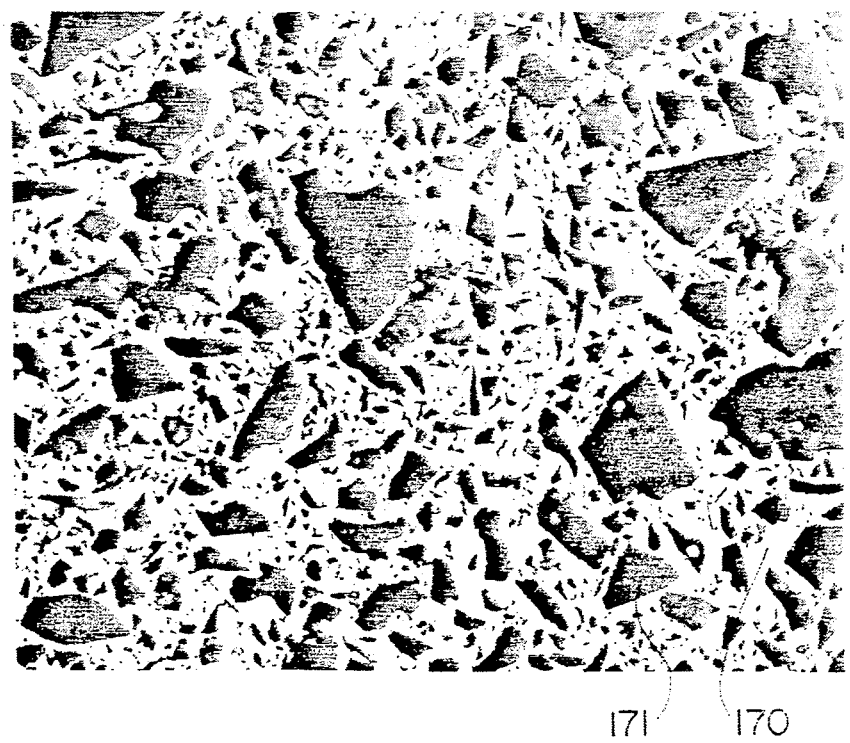
Figure 23C:
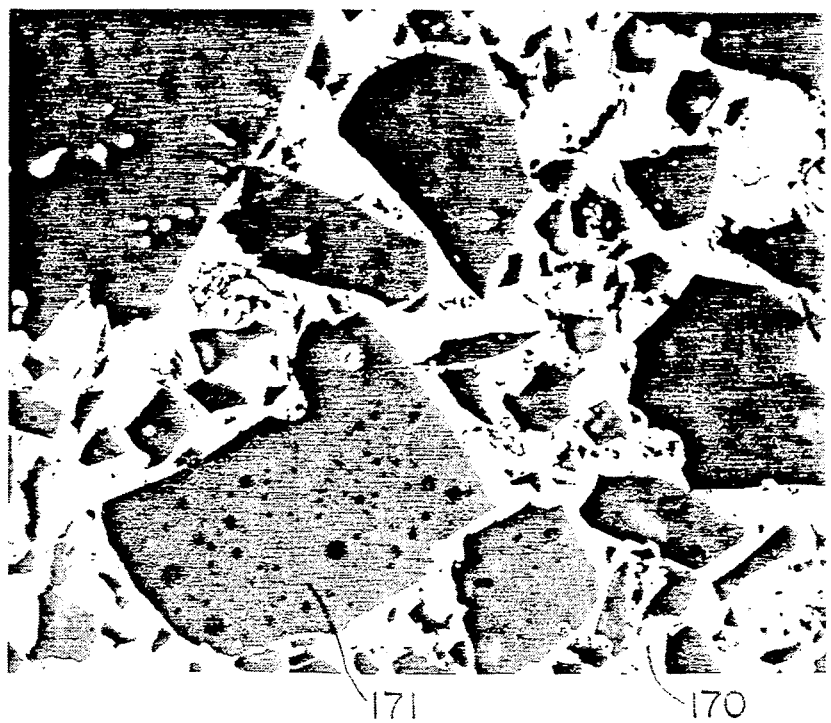
Figure 23D:
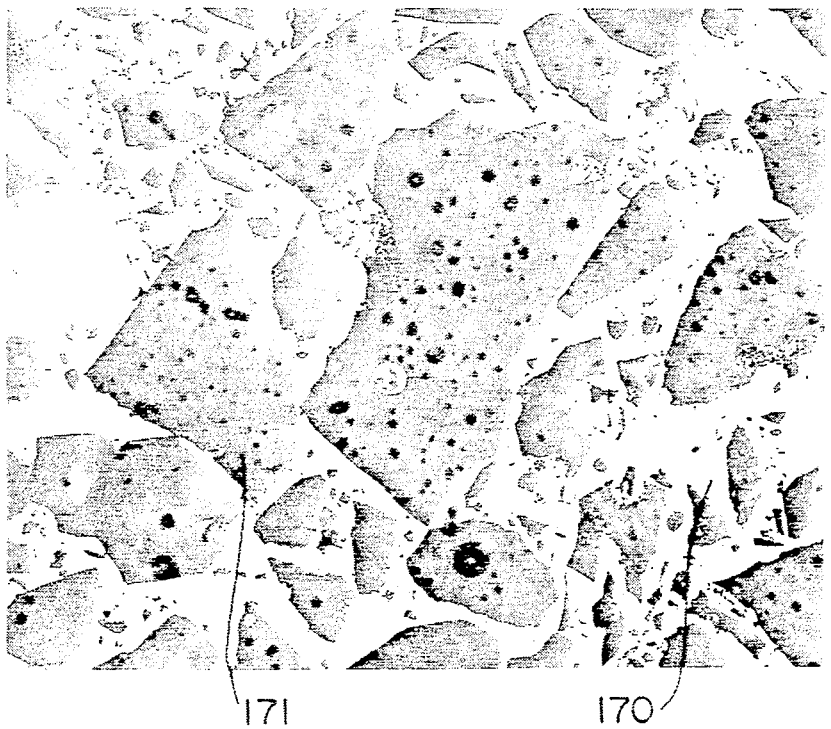
Figure 23E:
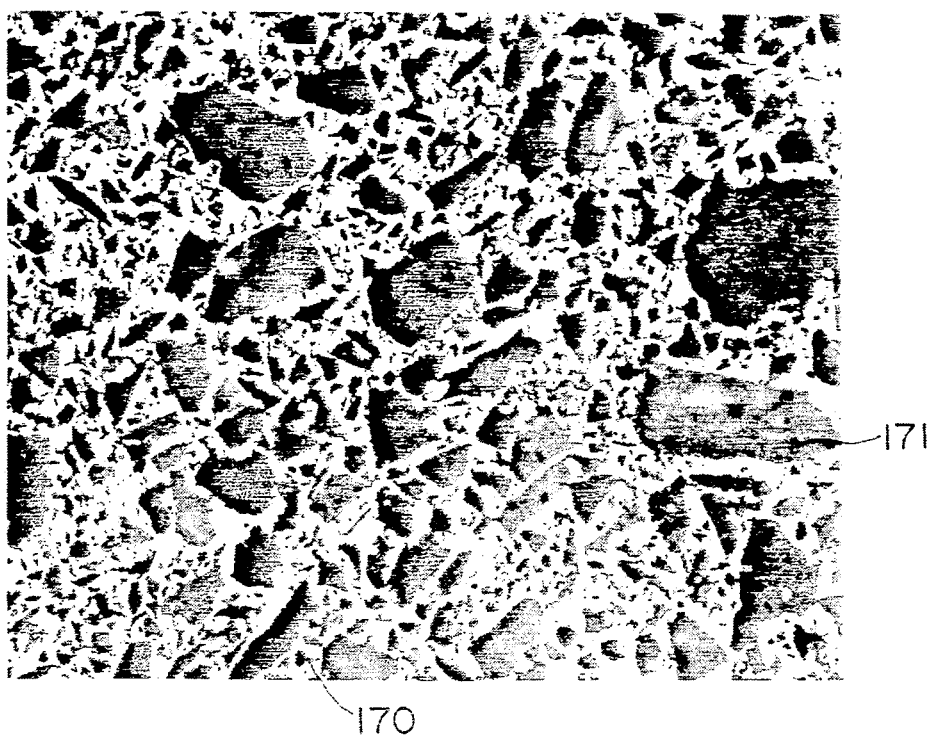
Figure 23F:
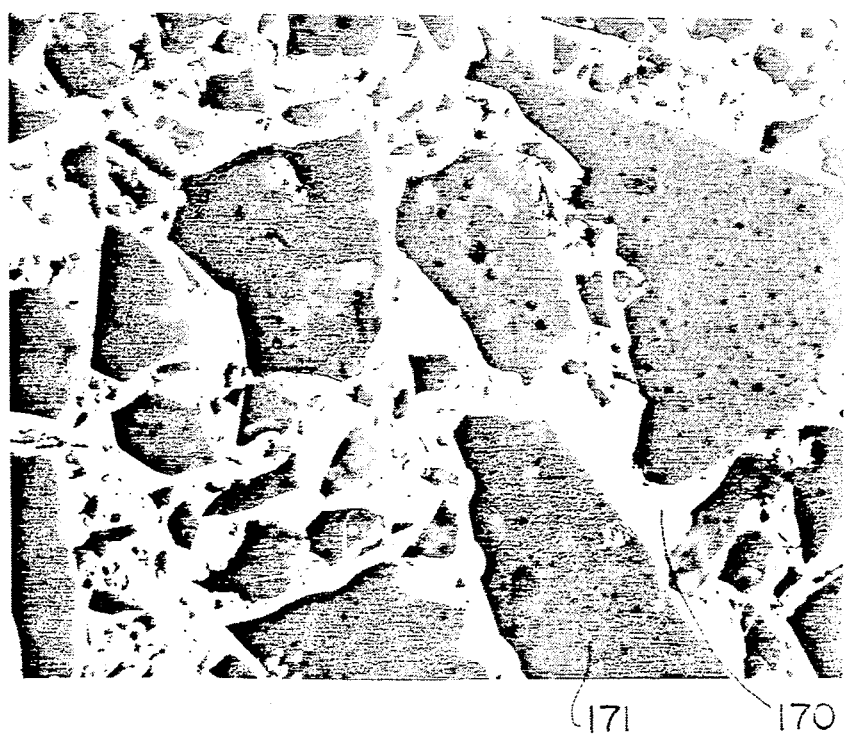
Figure 23G:
Figure 23H:
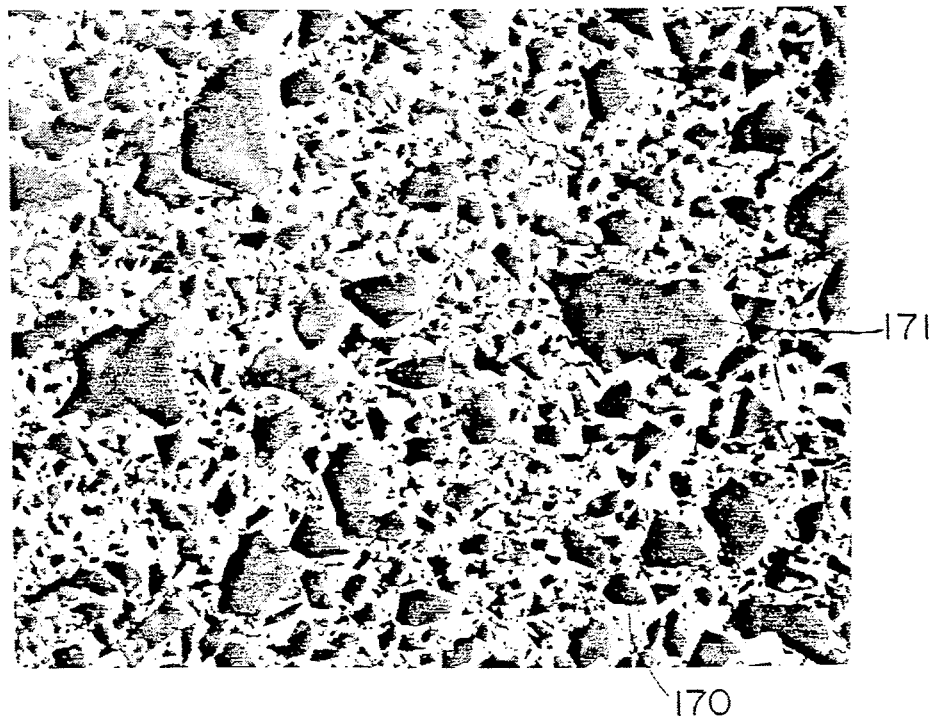

After the samples discussed above had cooled to room temperature, each was cross-sectioned to show the metal matrix composite body which had formed. Specifically, FIG. 17C is a photomicrograph taken at about 400× which corresponds to Sample C; FIG. 23a is a photomicrograph taken at about 400× which corresponds to Sample AO; FIG. 23b is a photomicrograph taken at about 400× which corresponds to Sample AP; FIG. 23c is a photomicrograph taken at about 400× which corresponds to Sample AQ; FIG. 23d is a photomicrograph taken at about 400× which corresponds to Sample AR; FIG. 23e is a photomicrograph taken at about 400× which corresponds to Sample AS; FIG. 23f is a photomicrograph taken at about 400× which corresponds to Sample AT; FIG. 23g is a photomicrograph taken at about 400× which corresponds to Sample AU; FIG. 23h is a photomicrograph taken at about 400× which corresponds to Sample AV. In each of the above-described Figures, the metal matrix is identified by the numeral 170 and the filler material is identified by the numeral 171.

ple, including matrix metals, filler materials, processing temperatures and processing times, and the nitrogen content of each formed metal matrix composite body.

Samples AZ-BB

These samples were formed in a manner substantially similar to the method used in Sample F of Example 5, and as shown in the schematic cross-section of FIG. 14.

Sample BC

This sample was formed in a manner substantially similar to that of Sample B in Example 5, and as shown in the schematic cross-section of FIG. 10.

Sample BD

This sample was formed in a manner substantially similar to that of Sample K in Example 6, and as shown in the schematic cross-section of FIG. 18, except that the interior of the steel mold was spray coated with a graphite material (Dylon grade AE, Dylon Industries, Inc., Berea, Ohio) and fired at about 260° C. for about 1 hour, rather than lining the steel mold with a graphite foil box.

Sample BE

This sample was a control sample which was utilized to determine the nitrogen content of an aluminum alloy which did not contain filler material. Specifically, the interior cavity of a steel mold which was substantially similar to that used in Sample BD was coated with a graphite material (Dylon grade AE, Dylon Industries, Inc., Berea, Ohio). A 520.0 aluminum alloy was then placed into the steel mold, and the reaction system was heated as shown in Table VI.

After the samples discussed above had cooled to room temperature, the nitrogen content of the compos-

TABLE V

| Sample | Matrix Metal | Filler Material | Heat Treatment | U.T.S (MPa) | Strain to Failure (%) | Elastic Modulus (GPa) | C.T.E.$^c$ per °C. ($\times 10^{-6}$) | Fracture Toughness (MPa·m$^{1/2}$) | Den. (g/cm$^3$) | Volume Filler (%) |
|---|---|---|---|---|---|---|---|---|---|---|
| C | 7001# | −60# Al$_2$O$_3$$^3$ | None | 256 (5)$^d$ | .164 | 176 | — | 13.0 (4) | 3.34 | 57 |
| AO | 7001# | −100# Al$_2$O$_3$$^3$ | None | 280 (5) | .177 | 176 | — | 13.3 (4) | 3.37 | 59 |
| AP | 7001# | −325# Al$_2$O$_3$$^3$ | None | 300 (5) | .263 | 149 | — | 17.5 (7) | 3.39 | 54 |
| AQ | 7001# | −60# Al$_2$O$_3$$^3$ | T6 | 238 (6) | .169 | 172 | 11.4 | 12.3 (6) | 3.37 | 60 |
| AR | 7001# | −100# Al$_2$O$_3$$^3$ | T6 | 300 (6) | .168 | 190 | 11.3 | 12.5 (6) | 3.45 | 59 |
| AS | 7001# | −325# Al$_2$O$_3$$^3$ | T6 | — | — | — | 13.6 | 15.8 (6) | 3.36 | 59 |
| AT | 520.0+ | −50# Al$_2$O$_3$$^3$ | None | 242 (5) | .169 | 177 | 14.5 | 12.1 (6) | 3.11 | 58 |
| AU | 520.0+ | −100# Al$_2$O$_3$$^3$ | None | 285 (3) | .201 | 175 | 14.0 | 13.3 (4) | 3.03 | 56 |
| AV | 520.0+ | −325# Al$_2$O$_3$$^3$ | None | 442 (3) | .637 | 140 | 17.7 | 18.2 (4) | 3.12 | 57 |
| AW | 520.0+ | −60# Al$_2$O$_3$$^3$ | T4 | 286 (2)$^d$ | .185 | 228 | — | 14.0 (4) | 3.24 | — |
| AX | 520.0+ | −100# Al$_2$O$_3$$^3$ | T4 | 318 (3) | .236 | 179 | — | 13.9 (4) | 3.20 | — |
| AY | 520.0+ | −325# Al$_2$O$_3$$^3$ | T4 | 460 (5) | .671 | 148 | — | 18.1 (4) | 3.14 | — |

$^c$Average C.T.E from 20-500° C., measured with Model D1-24 Dilitometer, Adamel Lhomargy, France.
$^d$Numbers in parenthesis () indicate number of specimens tested.
$^3$T-64 tabular alumina, Alcoa, Pittsburgh, PA.
+ ≦0.25% Si, ≦0.30% Fe, ≦0.25% Cu, ≦0.15% Mn, 9.5-10.6% Mg, ≦0.15% Zn, ≦0.25% Ti and the balance aluminum.
≦0.35% Si, ≦0.40% Fe, 1.6-2.6% Cu, ≦0.20% Mn, 2.6-3.4% Mg, 0.18-0.35% Cr, 6.8-8.0% Zn, ≦0.20% Ti and the balance aluminum.

EXAMPLE 10

This Example demonstrates that the nitrogen content of a metal matrix composite body formed by spontaneous infiltration can be varied. Specifically, depending on the combination of matrix metal, filler material, infiltrating atmosphere, and infiltration enhancer or infiltration enhancer precursor, and the given processing conditions, the nitrogen content of a formed metal matrix composite body may be tailored. Table VI contains a summary of the experimental conditions employed to form the metal matrix composite bodies of this Examite bodies was determined. Specifically, the nitrogen content of the metal matrix composites was measured using ASTM Method E 1019-87A "Determination of Carbon, Sulphur, Nitrogen, Oxygen and Hydrogen in Steels and in Iron, Nickel and Cobalt Alloys". This method uses inert gas fusion-thermal conductivity to measure the nitrogen content. Specifically, a specimen was contained in a small graphite crucible and fused with either copper or nickel under a flowing helium atmosphere at a minimum of about 1900° C. The nitrogen present in the sample was released as molecular nitrogen and separated from other molecular species (e.g., hydrogen and carbon monoxide) and the thermal conductivity of the nitrogen-helium gas mixture measured. This test was performed on a Leco TC436 oxygen-nitrogen commercial analyzer equipment designed for automatic operations and calibrated with standards of known nitrogen contents (NIST standard reference material, 73C with a $N_2$ content of 0.037% and AlN with a $N_2$ content of 32.6%).

TABLE VI

| Sample | Matrix Metal | Filler Material | Processing Time (Hrs) | Temp. (%) | Nitrogen (wt. %) |
|---|---|---|---|---|---|
| AZ | Al-2Mg | 500# $Al_2O_3$[1] | 4 | 1000 | 11.195 |
| BA | Al-6Mg | 220# $Al_2O_3$[1] | 4 | 900 | 0.895 |
| BB | Al-10.5Mg | 220# $Al_2O_3$[1] | 4 | 800 | 0.43 |
| BC | Al-15Si | 1000# SiC[6] | 2.5 | 800 | 0.277 |
| BD | 520.0+ | 500# $Al_2O_3$[1] | 800 | | 1.23 |
| BE | 520.0+ | None | 1 | 800 | 0.0011 |

[1] 38 Alundum, Noton Co., Worcester, MA.
[6] 39 Crystolon, Norton Co., Worcester, MA.
+ ≤0.25% Si, ≤0.30% Fe, ≤0.25% Cu, ≤0.15% Mn, 9.5-10.6% Mg, ≤0.15% Zn, ≤0.25% Ti and the balance aluminum.

EXAMPLE 11

This Example demonstrates that the wear resistance of a formed metal matrix composite body may be varied depending on the alumina filler material employed. Specifically, various alumina filler materials were used in combination with a matrix metal, an infiltrating atmosphere, and an infiltration enhancer or infiltration enhancer precursor to form metal matrix composite bodies of the present Example by spontaneous infiltration. Table VII contains a summary of the matrix metal, filler material, processing conditions and wear rate of the metal matrix composite bodies formed in this Example, as well as the wear rate of an unprocessed metal (Sample BL).

Samples A, BF, BG

These samples were formed in a manner substantially similar to that of Sample A in Example 5, and as shown in FIG. 9.

Samples BH-BK, B

These samples were formed in a manner substantially similar to that of Sample B in Example 5, and as shown in FIG. 10.

Sample BL

This sample was a comparative control sample, in which a 520.0 aluminum alloy was subjected to wear testing, as described below.

The wear testing procedure for the samples listed was effected by the Sliding Abrasion Test, which is a modification of the ASTM G75-82 "Slurry Abrasively by Miller Number Test" contained in ASTM Standard Volume 3.02. This modified test determines the wear rate of candidate materials exposed to a standard slurry. This type of sliding slurry abrasion test is popular with slurry pump manufacturers and used to evaluate candidate materials considered for slurry pump applications.

(a) Test Apparatus

The test apparatus includes four mechanical arms with wear blocks mounted to each arm. The mechanical arms are freely pivoted to a cross head, connected to a crank which is rotated at about 48 cycles/minute by an appropriate connecting rod and motor. This mechanism provides a horizontal, reciprocating harmonic motion to the wear arms with an approximately 8 inch (203 mm) travel. Each mechanical arm is loaded with an about 5 pound (2.3 kg) weight directly above the wear block. A cam is provided to momentarily lift each mechanical arm and therefore the wear block, off the rubber lap at the end of a cycle. Plastic trays, about 15 inches (381 mm) long by about 3 inches (76 mm) wide and about 2 inches (51 mm) high are used to contain the abrasive slurry, and each mechanical arm has a separate tray. An approximately 0.125 inch (3.2 mm) thick neoprene rubber lap is installed at the bottom of each tray. A molded elastomer is used to hold the rubber lap in place at the bottom of the trap and create a V-shaped trough along the length of the wear block travel. The 45° slope at the cam end of the cycle, generates a surge or back flow of slurry under the lifted wear block. Wear block holders, about 2 inches (51 mm) long by about 2 inches (51 mm) wide and about 0.5 inches (13 mm) thick, were machined from plastic with a slot to accept the wear block and a slit to allow securing of the wear block with a clamp bolt through the holder. The war block holder is mounted to the mechanical arm in a manner that allows adjustment of the wear block vertically and to establish parallelism with the rubber lap. The test apparatus can operate essentially unattended for an indefinite amount of time.

(b) Test Conditions

The possible range variations on the test conditions are:

| | | |
|---|---|---|
| I. | Particle Type: | Any (Silica, Aluminum, etc.) |
| II. | Particle Size: | 500-5000 micrometers (lm) |
| III. | Particle Concentration: | 0-100 weight percent solids |
| IV. | Slurry Volume: | 0-200 ml. |
| V. | Slurry Temperature: | 30° C. (room temperature) |
| VI. | Slurry pH: | 1-14 (with modification) |
| VII. | Wear Block Load: | 0-5 pounds (0-2.3 kg) |
| VIII. | Time | Indefinitely, four hours is typical |

(c) Test Specimen

The wear blocks were sectioned from a bulk material with a diamond cutting wheel and precision ground with a surface grinder to final dimensions of 1 inch (25 mm) long by 0.5 inch (13 mm) wide and 0.2 to 0.4 inch (5 to 9 mm) thick.

(d) Test Procedure

The wear blocks were ultrasonically cleaned in methanol for fifteen minutes, dried in a vacuum oven set at about 150° C. for at least about fifteen minutes, equilibrated to room temperature in a desiccator for fifteen minutes and then weighed to an accuracy of +0.1 mg. The wear blocks were then mounted to the wear block holders and checked for proper vertical and horizontal alignment. The appropriate amount of abrasive particles and water were weighed to +0.1 grams, mixed and then poured into the plastic slurry trays. The mechanical arms were lowered into place, thus lowering the wear blocks into the abrasive slurry, and the reciprocating motion started by turning on the electric motor.

Wear blocks were reciprocated through the abrasive slurry at a predetermined frequency for a prescribed period (typically four hours). After the prescribed period, the mechanical arms were lifted and the wear blocks removed. The wear blocks were then cleaned, dried, and reweighed according to substantially the same procedure as was followed at the start of the test. The weight loss and density of a wear block were used to calculate volume loss and, ultimately, wear rate in cubic centimeters per hour (cm³/h). The pH and the temperature of the slurry were measured at the start and end of the test.

Sample BR

This sample was formed in a manner substantially similar to that of Sample K in Example 6, and as shown in FIG. 18.

Sample BS

This sample was a comparative sample which was subjected to the wear testing procedure described in

TABLE VII

| Sample | Matrix Metal | Filler Material | Processing Time (Hrs) | Processing Temp. (°C.) | Mold | Density (g/cm³) | Filler Volume (%) | Wear Rate × 10⁻⁵ (cc/hr) |
|---|---|---|---|---|---|---|---|---|
| A | 520.0⁺ | 220# Al₂O₃¹ | 1.5 | 775 | silica | 3.06 | 41 | 1242 |
| BF | 520.0⁺ | 500# Al₂O₃¹ | 1.5 | 775 | silica | 3.12 | 46 | 2205 |
| BG | 520.0⁺ | 1000# Al₂O₃¹⁹ | 1.5 | 775 | silica | 2.87 | 42 | 2251 |
| BH | 520.0⁺ | 24# Al₂O₃¹ | 1.5 | 800 | steel | 2.94 | 48 | 724 |
| BI | 520.0⁺ | 220# Al₂O₃¹⁹ | 2.0 | 800 | steel | 3.0 | 45 | 510 |
| BJ | 520.0⁺ | 500# Al₂O₃¹ | 2.25 | 775–800 | steel | 2.91 | 49 | 2235 |
| BK | 520.0⁺ | 1000# Al₂O₃¹⁹ | 2.0 | 800 | steel | 2.59 | 37 | 2254 |
| B | 520.0⁺ | C75 RG² | 2.0 | 800 | steel | 2.94 | 36 | 1901 |
| BL (Matrix Metal) | 520.0⁺ | None | — | — | — | 2.7 | 0 | 2289 |

¹38 Alundum, Norton Co., Worcester, MA.
²C-75 RG, Alcan Chemicals, Montreal, Canada.
¹⁹E-67 Tabular alumina, Norton Co., Worcester, MA.
⁺ ≦0.25% Si, ≦0.30% Fe, ≦0.25% Cu, ≦0.15% Mn, 9.5–10.6% Mg, ≦0.15% Zn, ≦0.25% Ti and the balance aluminum.

Example 12.

TABLE VIII

| Sample | Matrix Metal | Filler Material | Processing Time (Hrs) | Processing Temp. (°C.) | Mold | Volume Filler (%) | Density (g/cm³) | Wear Rate × 10⁻⁵ (cc/hr) |
|---|---|---|---|---|---|---|---|---|
| BM | Al-10Si-5Cu | 220# SiC⁶ | 2 | 775 | silica | 49 | 3.09 | 555 |
| BN | Al-10Si-5Cu | 500# SiC⁶ | 2 | 775 | silica | 46 | 2.90 | 3035 |
| BO | Al-10Si-5Cu | 24# SiC⁶ | 2 | 800 | steel | 47 | 3.21 | 637 |
| BP | Al-10Si-5Cu | 220# SiC⁶ | 2.5 | 800 | steel | 47 | 2.72 | 1028 |
| BQ | Al-10Si-5Cu | 1000# SiC⁶ | 2.5 | 800 | steel | 42 | 2.80 | 2355 |
| BR | Al-12Si | SiC¹⁸ | 1 | 800 | steel | — | 2.95 | 313 |
| BS (Matrix Metal) | Al-10Si-5Cu | None | — | — | — | 0 | 2.7 | 2958 |

⁶39 Crystolon, Norton Co., Worcester, MA.
¹⁸55% 54# SiC, 20% 90# SiC, 15% 100# SiC and 10% 500# SiC, 39 Crystolon, Norton Co., Worcester, MA.

EXAMPLE 12

This Example demonstrates that the wear resistance of the formed metal matrix composite body may be varied depending on the silicon carbide filler material employed. Specifically, various silicon carbide filler materials were used in combination with a matrix metal, an infiltrating atmosphere, and an infiltration enhancer or infiltration enhancer precursor to from metal matrix composite bodies of the present Examples by spontaneous infiltration. Table VIII contains a summary of the matrix metal, filler material, processing conditions and wear rate of the metal matrix composite bodies formed in this Example, as well as the wear rate of an unprocessed metal (Sample BS).

Samples BM, BN

These samples were formed in a manner substantially similar to that of Sample A in Example 5, and as shown in FIG. 9.

Samples BO-BO

These samples were formed in a manner substantially similar to that of Sample B in Example 5, and as shown in FIG. 10.

EXAMPLE 13

This Example demonstrates that the mechanical properties of a formed metal matrix composite body may be varied depending on the filler material size utilized. Table IX contains a summary of the matrix metal, filler material, processing conditions and mechanical properties of the metal matrix composite bodies of this Example formed by spontaneous infiltration.

Samples BT, BU, O, BV

These samples were formed in a manner substantially similar to that of Sample C in Example 5, with a schematic cross-sectional setup as shown in FIG. 11, except that no magnesium powder was provided on the bottom of the graphite foil box prior to adding filler material.

Figure 24A:
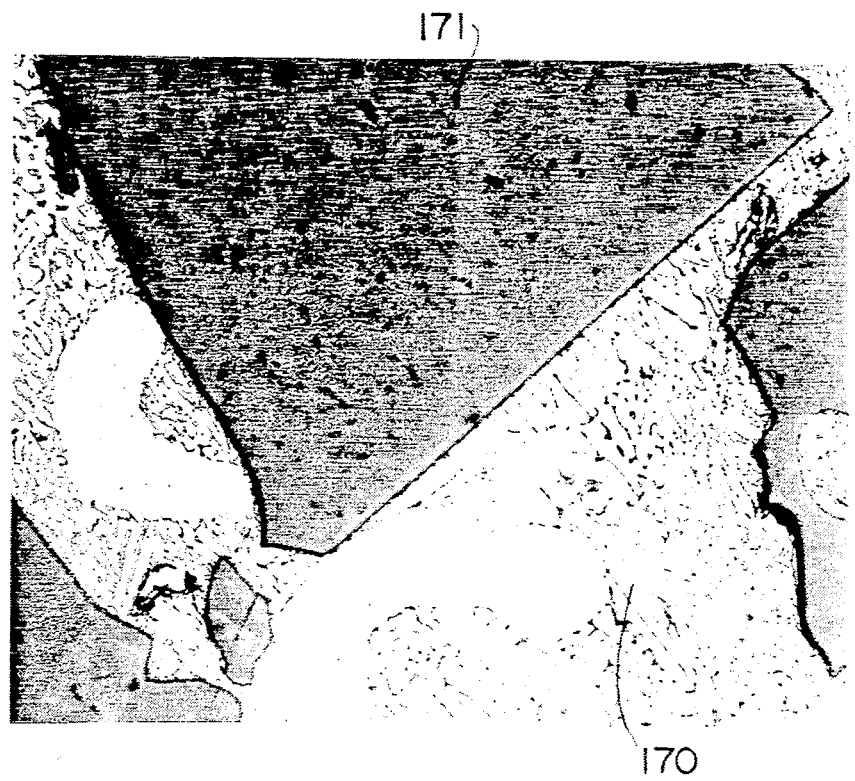
FIGS. 24a-c follow.
Figure 24B:
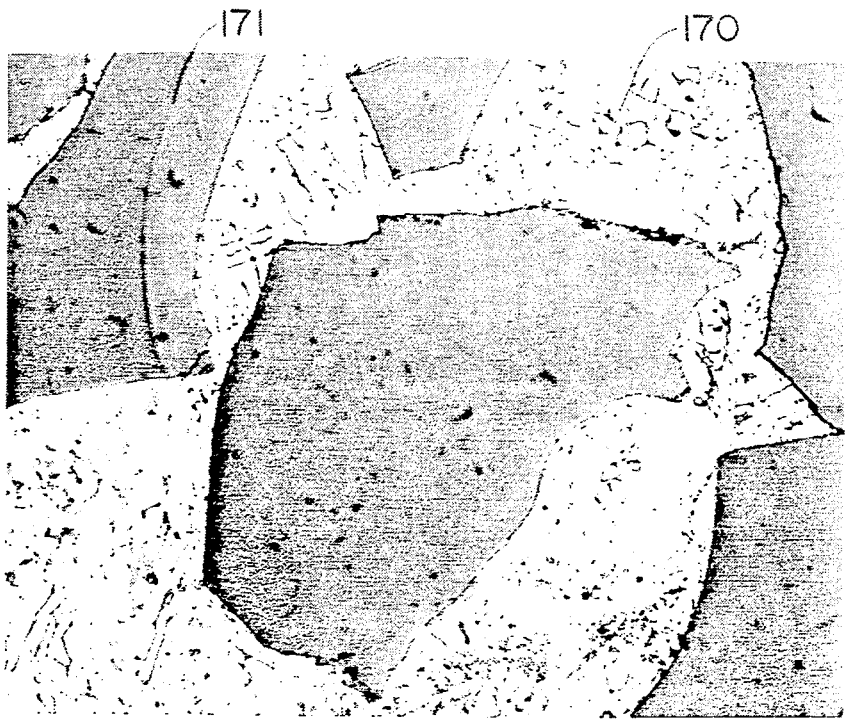
Figure 24C:
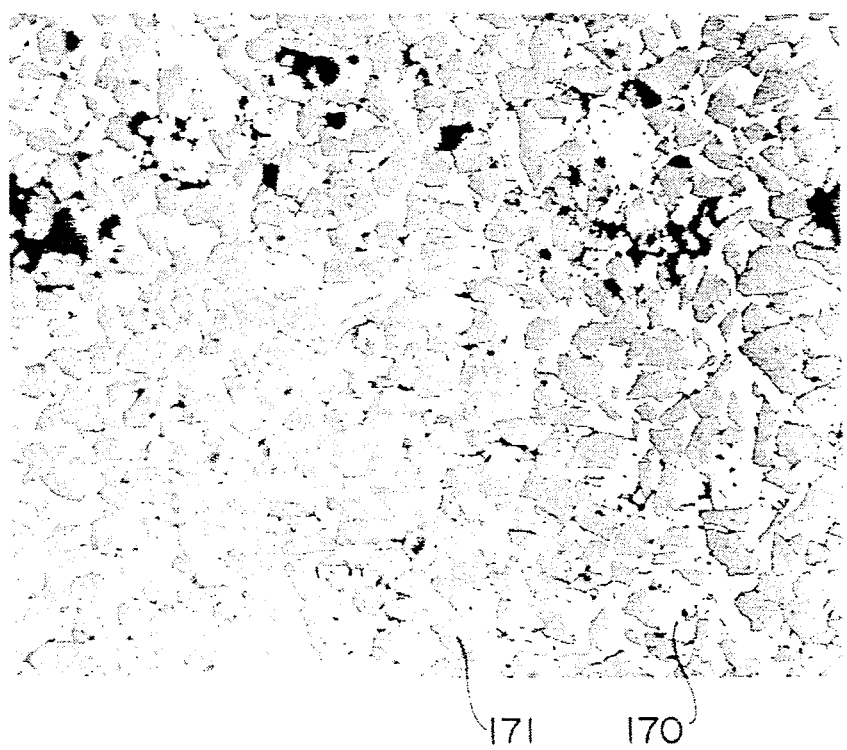

The metal matrix composite bodies formed in this Example were cross-sectioned and microstructural photographs were taken. Specifically, FIG. 24a is a photomicrograph taken at about 400× which corresponds to Sample BT; FIG. 24b is a photomicrograph taken at about 400× which corresponds to Sample BU; FIG. 24c is a photomicrograph taken at about 400× which corresponds to Sample BV. In each of the above-described figures, the metal matrix is identified by the numeral 170 and the filler material is identified by the numeral 171.

TABLE IX

| Sample | Matrix Metal | Filler Material | U.T.S. (MPa) | Strain to Failure (%) | Elastic Modulus (GPa) | C.T.E.[c] per °C. ($\times 10^{-6}$) | Fracture Toughness (MPa·m$^{1/2}$) | Den. (g/cm$^2$) | Volume Filler (%) |
|---|---|---|---|---|---|---|---|---|---|
| BT | Al-12Si-2Mg | 54# SiC[6] | 143 (5)[d] | .126 | 201 | 12.2 | 9.2 (4) | 2.77 | 58 |
| BU | Al-12Si-2Mg | 90# SiC[6] | 153 (5) | .143 | 173 | 13.1 | 10.4 (6) | 3.02 | 53 |
| Q | Al-12Si-2Mg | 220# SiC[6] | 145 (6) | .133 | 164 | 12.2 | 10.4 (5) | 2.87 | 51 |
| BV | Al-12Si-2Mg | 500# SiC[6] | 176 (5) | .176 | 145 | 11.6 | 8.2 (8) | 2.84 | 56 |

[c]Average C.T.E. from 20-500° C., measured with Model D1-25 Dilitometer, Adamel Lhomargy, France.
[d]Numbers in parenthesis () indicate number of specimens tested.
[6]39 Crystolon, Norton Co., Worchester, MA.

EXAMPLE 14

This Example demonstrates that the coefficient of thermal expansion of a metal matrix composite body formed by spontaneous infiltration and which incorporates a silicon carbide filler material may be varied depending on the particle size(s) of filler material. Specifically, Table X shows the matrix metal, filler material, processing conditions and coefficient of thermal expansion for the samples formed in this Example.

Samples BW-CS

These samples were formed in a manner substantially similar to Sample N in Example 6, with a schematic cross-sectional setup as shown in FIG. 19. Table X lists the reaction components and processing conditions for each Sample. In Sample CF, rather than utilizing a graphite foil box within the graphite boat, a graphite coating (DAG-154, Acheson Colloid, Port Huron, Mich.) was placed onto the inner cavity of the graphite boat. The filler material was then placed into the graphite boat, substantially similar to the schematic shown in FIG. 19.

Mechanical properties were obtained by the mechanical testing procedures described above.

TABLE X

| Sample | Matrix Metal | Filler Material | Processing Time (Hrs) | Processing Temp. (°C.) | Volume Filler (%) | C.T.E.[c] per °C. ($\times 10^{-6}$) |
|---|---|---|---|---|---|---|
| BW | 413.0[§] | 24# SiC[6] | 20 | 775 | 66 | 7.64 |
| BX | 413.0[§] | 54# SiC[6] | 15 | 750 | 61 | 9.36 |
| BY | 413.0[§] | 90# SiC[6] | 15 | 775 | 62 | 9.45 |
| BZ | 413.0[§] | 220# SiC[6] | 15 | 775 | 56 | 9.70 |
| CA | 413.0[§] | 500# SiC[6] | 15 | 775 | 58 | 9.75 |
| CB | 413.0[§] | 70% 24# & 30% 54# SiC[6] | 15 | 775 | — | 7.70 |
| CC | 413.0[§] | 70% 54# & 30% 90# SiC[6] | 15 | 775 | 64 | 8.30 |
| CD | 413.0[§] | 70% 90# & 30% 180# SiC[6] | 15 | 775 | 61 | 9.15 |
| CE | 413.0[§] | 70% 220# & 30% 500# SiC[6] | 15 | 775 | 59 | 9.38 |
| CF | 413.0[§] | 70% 220# & 30% 800# SiC[6] | 15 | 775 | — | 9.41 |
| CG | 413.0[§] | 65% 24# & 25% 220# & 10% 500# SiC[6] | 15 | 750 | — | 8.03 |
| CH | Al-12Si-2.5Ni-1Cu | 24# SiC[6] | 15 | 775 | 69 | 7.63 |
| CI | Al-12Si-2.5Ni-1Cu | 54# SiC[6] | 15 | 775 | — | 8.10 |
| CJ | Al-12Si-2.5Ni-1Cu | 90# SiC[6] | 15 | 775 | 56 | 8.34 |
| CL | Al-12Si-2.5Ni-1Cu | 500# SiC[6] | 15 | 775 | 53 | 9.27 |
| CM | Al-12Si-2.5Ni-1Cu | 70% 24# & 30% 54# SiC[6] | 15 | 775 | 67 | 7.39 |
| CN | Al-12Si-2.5Ni-1Cu | 70% 54# & 30% 180# SiC[6] | 15 | 775 | 68 | 7.55 |
| CO | Al-12Si-2.5Ni-1Cu | 70% 90# & 30% 180# SiC[6] | 15 | 775 | 60 | 8.75 |
| CP | Al-12SAi-2.5Ni-1Cu | 70% 180# & 30% 220# SiC[6] | 15 | 775 | 56 | 9.17 |
| CQ | Al-12Si-2.5Ni-1Cu | 70% 220# & 30% 500# SiC[6] | 15 | 775 | 61 | 8.36 |
| CR | Al-12Si-2.5Ni-1Cu | 70% 220# & 30% 800# SiC[6] | 15 | 775 | 62 | 8.29 |
| CS | Al-12Si-2.5Ni-1Cu | 65% 24# & 25% 220# & 10% 500# SiC[6] | 15 | 750 | — | 6.37 |

[c]Average C.T.E. from 20-100° C.
[6]39 Crystolon, Norton Co., Worcester, MA.
[§]11.0-13.0% Si, ≤2.0% Fe, ≤1.0% Cu, ≤0.35% Mn, ≤0.10% Mg, ≤0.50% Ni, ≤0.50% Zn, ≤0.15% Sn and the balance aluminum.

EXAMPLE 15

This Example demonstrates that fiber reinforced metal matrix composite bodies may be formed by spontaneous infiltration. Specifically, Table XI shows the combination of matrix metal, filler material and reaction conditions utilized to form the metal matrix composite bodies of the samples listed. Further, the method of cooling each composite body and the subsequent heat treatment, if any, is set forth in Table XI.

Samples CT-CY

These samples were formed in a manner substantially similar to that of Sample G in Example 5, and as shown in FIG. 15.

Samples CZ-DA

These samples were formed in a manner substantially similar to that of Sample C in Example 5, and as shown in FIG. 11, except that (1) no magnesium powder was used; (2) the container was made from a stainless steel material, rather than graphite; and (3) a ceramic fiber blanket was placed over the container during heating.

Samples DB-DD

These samples were formed in a manner substantially similar to that of Sample G of Example 5, and as shown in FIG. 15, except that a steel plate was placed beneath the graphite foil box and a graphite foil sheet with an approximately 2 inch (51 mm) diameter hole in the center was placed between the filler material and the matrix metal.

Samples DE-DG

These samples were formed in a manner substantially similar to that of Sample H of Example 5, and as shown in FIG. 16, except that the silicon carbide layer, measuring approximately 0.5 inches (13 mm), was placed onto the bottom of the stainless steel container, rather than in the graphite foil box, and the opening in the graphite foil between the matrix metal and the filler material comprised a slit about ½ inch (13 mm) wide by about 5 inches (127 mm) long with an approximately 2 inch (51 mm) diameter hole centrally located in the slit.

Samples DH-DI

These samples were formed in a manner substantially similar to that of Samples DE-DG, except that no silicon carbide layer was provided to the system.

Mechanical properties of the metal matrix composite bodies were determined by mechanical testing, as described above, and are shown in Table XI. The mechanical properties of these composite bodies were measured by a method substantially similar to ASTM Standard D-3552.

TABLE XI

| Sample | Matrix Metal | Fiber Coating | Filler Material | Processing Time (Hrs.) | Temp. (°C.) | Heat Treatment | Other | U.T.S. (MPa) | |
|---|---|---|---|---|---|---|---|---|---|
| CT | Al-5Si-5Zn-7Mg-2Cu | None | $Al_2O_3$ Chopped Fibers[8&9] | 18 | 885 | T4 | Furnace Cool | 157 ± 21 | |
| CU | Al-5Si-5Zn-7Mg-2Cu | None | $Al_2O_3$ Chopped Fibers[8&9] | 18 | 885 | None | Furnace Cool | 136 ± 15 | |
| CV | Al-10.5Mg-4Zn | None | $Al_2O_3$ Chopped Fibers[8&9] | 20 | 675 | None | Furnace Cool | 94 ± 26 | |
| CW | Al-10.5Mg-4Zn | None | $Al_2O_3$ Chopped Fibers[8&9] | 20 | 675 | T4 | Furnace Cool | 230 ± 15 | |
| CX | 520.0+ | None | $Al_2O_3$ Chopped Fibers[8&9] | 20 | 700 | None | Furnace Cool | 166 (Maximum) | |
| CY | 520.0+ | None | $Al_2O_3$ Chopped Fibers[8&9] | 20 | 700 | T4 | Furnace Cool | 152 (Maximum) | |
| CZ | 520.0+ | None | $Al_2O_3$ Chopped Fibers[8&9] | 15 | 725 | None | Directionally Solidify | 250 ± 5 | |
| DA | 520.0+ | None | $Al_2O_3$ Chopped Fibers[8&9] | 15 | 725 | T4 | Directinally Solidify | 278 ± 6 | |
| | | | | | | | | Longitudinal | Transverse |
| DB | 520.0+ | $SiO_2$ | $Al_2O_3$ Continuous Fibers[8] | 30 | 725 | None | Furnace Cool | 293 | 129 |
| DC | 520.0+ | $SiO_2$ | $Al_2O_3$ Continuous Fibers[8] | 30 | 775 | None | Furnace Cool | 234 | 119 |
| DD | 520.0+ | None | $Al_2O_3$ Continuous Fibers[8] | 30 | 725 | None | Furnace Cool | 248 | 98 |
| DE | 520.0+ | $SiO_2$ | $Al_2O_3$ Continuous Fibers[8] | 28 | 735 | None | Directionally Solidify | 251 | 171 |
| DF | 520.0+ | None | $Al_2O_3$ Continuous Fibers[8] | 28 | 735 | None | Directionally Solidify | 327 | 158 |
| DG | 520.0+ | None | $Al_2O_3$ Continuous Fibers[8] | 28 | 735 | T4 | Furnace Cool | 303 | — |
| DH | 520.0+ | $SiO_2$ | $Al_2O_3$ Continuous Fibers[8] | 20 | 760 | None | Furnace Cool | 274 | 137 |
| DI | 520.0+ | None | $Al_2O_3$ Continuous Fibers[8] | 20 | 760 | None | Furnace Cool | 270 | 211 |

[8]Fiber FP ® alumina fibers. E. I. du Pont de Nemours & Co., Inc., Wilmington, DE.
[9]Saffil ® alumina fibers. ICI Americas. Wilmington, DE.
+ ≦0.25% Si, ≦0.30% Fe, ≦0.25% Cu, ≦0.15% Mn, 9.5-10.6% Mg, ≦0.15% Zn, ≦0.25% Ti and the balance aluminum.

EXAMPLE 16

Figure 25:
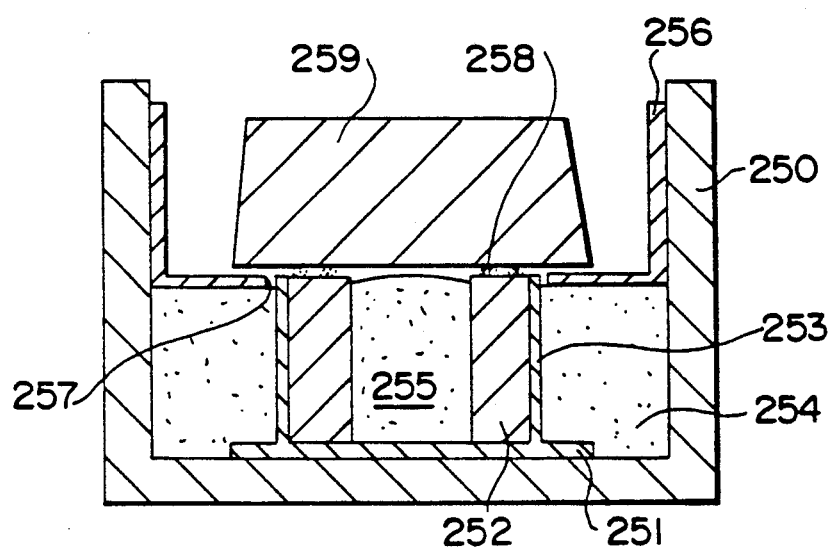
FIG. 25 is a schematic cross-sectional representation of a lay-up for producing a spontaneously infiltrated metal matrix composite according to Example 16.

This Example demonstrates that preforms having a high volume fraction of filler material may be spontaneously infiltrated to form metal matrix composite bodies. FIG. 25 shows a schematic cross-section of the setup used to produce the metal matrix composite of this Example, as described below. Specifically, a steel mold 250 was prepared, having an inner cavity measuring about 6 inches (152 mm) long by about 6 inches (152 mm) wide by about 6 inches (152 mm) deep. The bottom surface of the steel mold 250 was covered with a piece of graphite foil 251 (Grafoil ® from Union Carbide), having dimensions of about 3 inches (76 mm) long by about 3 inches (76 mm) wide by about 0.015 inches (0.38 mm) thick. A silicon carbide preform 252 (obtained from I Squared R Element, Inc., Akron, N.Y.), having an outer diameter of about 1.75 inches (45 mm) and an inner diameter of about 0.75 inches (19 mm) and cut to the length of about 3 inches (76 mm), was wrapped in a piece of graphite foil 253 and placed onto the graphite foil 251 in the steel box 250. A 90 grit alumina material 254 (38 Alundum, Norton Company, Worcester, Mass.) was poured into the space between the silicon carbide preform 252 and the steel mold 250. The inner cavity of the silicon carbide preform was substantially filled with graphite powder 255 (KS-44 from Lonza, Inc., Fair Lawn, N.J.). A graphite foil box 256, measuring about 5.75 inches (146 mm) long by about 5.75 inches (146 mm) wide by about 3 inches (76 mm) deep was made according to the method described in Sample C of Example 5. A hole 257, measuring about 1.75 inches (43 mm) in diameter and corresponding to the outer diameter of the silicon carbide preform 252, was cut into the bottom of the graphite foil box 256 and the graphite foil box 256 was placed around the top of the silicon carbide preform 252 in the steel mold 250. A −100 mesh magnesium powder material 258 (from Hart Corporation, Tamaqua, Pa.) was placed on the top surface of the silicon carbide preform 252 extending into the graphite foil box 256. A matrix metal 259 comprising by weight 12 percent silicon, 6 percent magnesium and the balance aluminum, was placed into the graphite foil box 256 contained within the steel mold 250.

The steel mold 250 and its contents were placed into a room temperature retort lined resistance heated furnace. The retort door was closed, and the retort was evacuated to at least 30 inches (762 mm) Hg. After the vacuum was reached, nitrogen was introduced into the retort chamber at a flow rate of about 3 liters/minute. The retort lined furnace was then heated to about 800° C. at a rate of about 200° C./hour and held for about 10 hours at about 800° C. with a flowing nitrogen atmosphere of about 3 liters/minute. The retort lined furnace was then ramped from about 800° C. to about 675° C. at a rate of about 200° C./hour. At about 675° C., the steel mold 250 and its contents were removed from the retort and placed onto a room temperature graphite plate to directionally solidify the metal matrix composite and the residual matrix metal. At room temperature, the assembly was disassembled to reveal that the matrix metal had spontaneously infiltrated the preform.

Figure 26A:
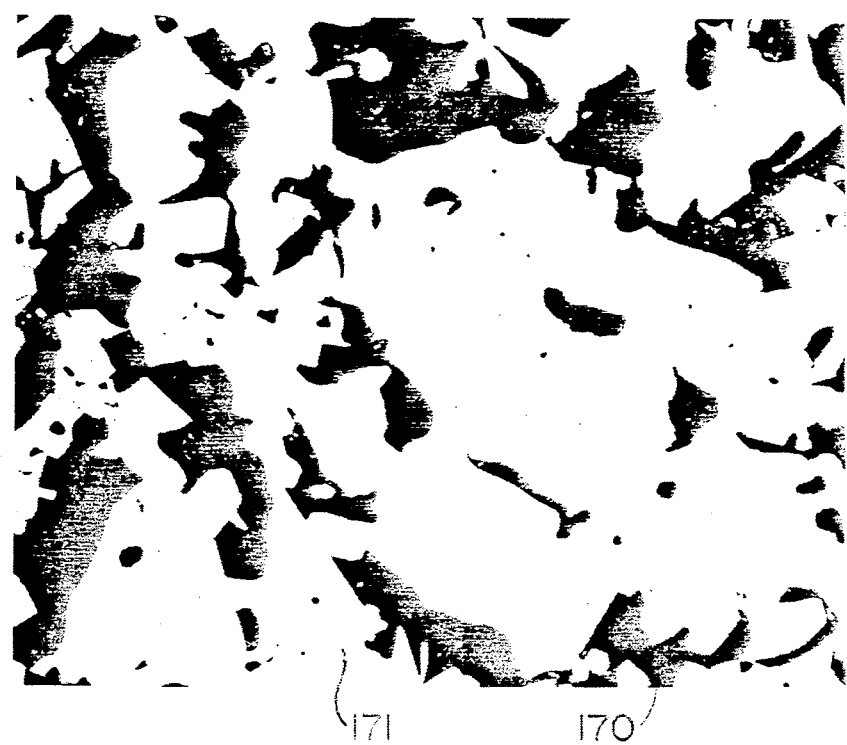
FIG. 26a is a photomicrograph of the metal matrix composite body corresponding to Example 16.
Figure 26B:
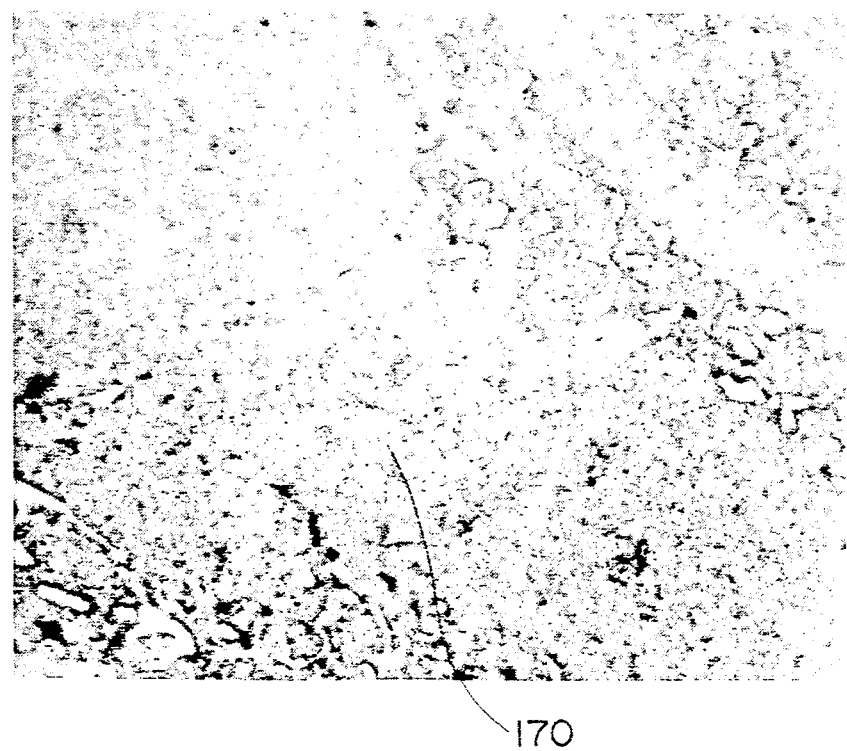
FIG. 26b is a photomicrograph of the etched metal of the metal matrix composite body corresponding to Example 16.
Figure 27:
FIG. 27 is a photomicrograph of a metal matrix composite body corresponding to Sample EQ.
Figure 28:
FIG. 28 is a photomicrograph of a metal matrix composite body corresponding to Sample ER.
Figure 29:
FIG. 29 is a photomicrograph of a metal matrix composite body corresponding to Sample ES.
Figure 30:
FIG. 30 is a photomicrograph of a metal matrix composite body corresponding to Sample ET.

The formed metal matrix composite was subsequently cross-sectioned, mounted, polished and subjected to Quantitative Image Analysis. FIG. 26a shows a photomicrograph of the microstructure of the composite at 50×, and FIG. 26b shows a photomicrograph at 1000× of the etched matrix metal within the system. The results of Quantitative Image Analysis revealed that the loading of the silicon carbide reinforced composite was approximately 78 volume percent, thus demonstrating that metal matrix composites may be formed by spontaneously infiltrating preforms with high volume fractions of filler material.

EXAMPLE 17

This Example demonstrates that metal matrix composite bodies that retain their room temperature strength at high temperatures may be made by a spontaneous infiltration technique. A setup similar to that shown in FIG. 10 was used to produce the metal matrix composite bodies of this Example, as described below. Specifically, a graphite boat 32 (Grade ATJ, Union Carbide) obtained from Graphite Engineering & Sales Co., Greeville, Mich. and having inner cavity dimensions of about 5 inches (127 mm) long by about 5 inches (127 mm) wide by about 2.5 inches (64 mm) deep, and having a wall thickness of about 0.28 inch (71 mm) was used. The inner surface of the graphite boat 32 was spray coated, rather than lined with a graphite foil box, with a graphite mixture comprising about 1 part by volume ethanol (Pharmco Products, Inc., Bayon, N.J.) and about 1 part by volume of a colloidal graphite (DAG-154, Acheson Colloid, Port Huron, Mich.). At least three spray coats of the graphite mixture were applied with an air brush onto the inner surface of the graphite boat to form a coating. Each coat of the graphite mixture was permitted to dry before a subsequent coat was applied. The coated graphite boat was placed into a resistance heated air atmosphere furnace set at about 380° C. for about 2 hours to harden the colloidal graphite coating 33. The graphite boat 32 with the hardened colloidal graphite coating 33, after being removed from the furnace, was exposed to a room temperature air atmosphere for about two hours and then stored in a vacuum oven set at about 150° C. for about 12 hours.

A silicon carbide blend comprising about 20 percent by weight 500 grit silicon carbide and about 80 percent by weight 220 grit silicon carbide (both 39 Crystolon, Norton Co., Worcester, Mass.) was mixed together until a substantially homogeneous mixture was achieved, and the mixture was placed into a steel tray which was then placed into a vacuum oven. Specifically, the vacuum oven was set at about 150° C. and was evacuated to about 30 inches Hg (762 mm Hg) and the mixture was held within the vacuum oven for about 12 hours. The silicon carbide blend was removed from the vacuum oven and allowed to cool in a room temperature air atmosphere for approximately 1 hour. A filler material mixture 34 was made by adding about 3 percent by weight −325 mesh magnesium powder (Reade Manufacturing Co., Lakehurst, N.J.) to the silicon carbide blend and mixing the mixture in a plastic jar on a jar mill for about 30 minutes. The coated graphite boat 32, which was stored in a vacuum oven for about 12 hours, was removed from the vacuum oven and about 700 grams of the filler material mixture 34, comprising the silicon carbide blend and the magnesium, were poured into the bottom of the colloidal graphite coated graphite boat 32 and the bottom of the boat was tapped several times on a table top to level the filler material mixture surface. The leveled surface of the filler material mixture was coated with about 1 gram of −50 mesh magnesium powder 35 (sold by Alpha Products, Morton Thiokol, Denvers, Mass.). About 1170 grams of a matrix metal 36, comprising a 336 aluminum alloy (i.e., by weight about 11.0–13.0% Si, ≦1.2% Fe, 0.50–1.5% Cu, ≦0.35% Mn, 0.7–1.3% Mg, 2.0–3.0% Ni, ≦0.35% Zn, ≦0.25% Ti and the balance aluminum), was placed on the filler material mixture coated with the magnesium powder.

The colloidal graphite coated graphite boat 32 and its contents were placed into a stainless steel container 37 measuring about 10 inches (254 mm) long by 12 inches (305 mm) wide by about 10 inches (254 mm) high. The bottom of the stainless steel container 37 had been prepared by covering the bottom of the container with a piece of graphite foil 38 (Perma-Foil, TT America, Portland, Oreg.) measuring about 10 inches (254 mm) long by about 12 inches (305 mm) wide by about 0.010 inch (0.25 mm) thick and a fire brick 39 was placed on the graphite foil 38 to support the colloidal graphite coated graphite boat 32 within the stainless steel container 37. Approximately 15 grams of a titanium sponge material 40 (Chemalloy Company, Inc., Bryn Mawr, Pa.) and about 4 grams of 50 mesh Mg (Alpha Products, Morton Thiokol, Inc., Denvers, Mass.), not shown in FIG. 10, were sprinkled onto the graphite foil 38 in the bottom of the stainless steel container 37 around the fire brick 39. A sheet of copper foil 41 was placed over the opening of the stainless steel container to form an isolated chamber and in contrast to what is shown in FIG. 10, a nitrogen purge tube was provided through the side of the stainless steel container 37. The stainless steel container 37 and its contents were placed into a resistance heated air atmosphere box furnace. The furnace was heated from room temperature to about 600° C. at about a rate of 400° C./hour with a nitrogen flow rate of about 10 liters/minute, then heated from about 600° C. to about 780° C. at a rate of about 400° C./hour with a nitrogen flow rate of about 2 liters/minute. The system was maintained at about 780° C. for about 1.5 hours with a nitrogen flow rate of about 2 liters/minute. The stainless steel container 37 and its contents were then removed from the furnace, and the graphite coated graphite boat 32 was removed from the colloidal stainless steel container 37 and placed onto a room temperature water cooled copper chill plate to directionally solidify the metal matrix composite.

The resultant metal matrix composite body was then sectioned with a diamond blade into specimens to be used to measure the flexural strength of the metal matrix composite body as a function of temperature. The flexural strength of the metal matrix composite was determined using a 4 point bend test similar to Military Standard (Mil-STD-1942A) at temperatures of about 22°, 100°, 200°, 300°, 400°, 450° and 500° C., on samples measuring about 0.12 inches (3 mm) thick, about 0.25 inches (6 mm) wide and about 2.6 inches (66 mm) long. The samples were placed on a lower span of the 4 point bending apparatus. The lower span measured about 1.6 inches (40 mm). The upper span measured about 0.8 inches (20 mm) and was brought into contact with the sample to be tested. A constant displacement of about 0.02 inch/minute (0.5 mm/minute) was exerted upon each sample until failure. The flexural strength measured at 22° C. was performed with a Universal Testing Machine (Model CITS-20006, System Integration Technology Inc., Straton, Mass.) equipped with a 5000 pound load cell (Model 3132-149, Eaton, Corp., Troy, Mich.). The flexural strength measured at 100°, 200°, 300°, 400°, 450° and 500° C. was performed with a Universal Testing Machine (Model CITS-2000/6w, System Integration Technology Inc., Straton, Mass.) equipped with a 500 pound load cell (Model 3132-149, Eaton, Corp., Troy, Mich.) and a resistance heated air atmosphere furnace (Series 3350, Applied Test Systems, Inc., Butler, Pa.). Samples that were used to determine flexural strengths at about 300° C. and above were held at the test temperature for at least 1 hour and at each temperature the temperature of one of the samples was monitored with a Type K thermocouple at least within 0.39 inch (10 mm) of the sample. Table XII shows the results of the flexural strength and yield strength measurements as a function of temperature. Although elastic beam theory was used to calculate the results, the data show that the flexural strength of the metal matrix composite is maintained through about 300° C. and that at about 500° C., the metal matrix composite maintains about 50 percent of its flexural strength relating to its room temperature flexural strength.

TABLE XII

| Test Temp °C. | $\sigma_f(T)$, Flexural Strength (MPa) | $\sigma_f(T)/\sigma_f(22° C.)$ | $\sigma_y(T)$, Yield Strength (MPa) | $\sigma_y(T)/\sigma_y(22° C.)$ |
|---|---|---|---|---|
| 22 | 285 ± 15 (d)$^d$ | 1.00 | 283 ± 15 (3) | 1.00 |
| 100 | 335 ± 42 (3) | 1.18 | 292 ± 116 (3) | 1.03 |
| 200 | 332 ± 29 (3) | 1.17 | 332 ± 29 (3) | 1.17 |
| 300* | 288 ± 10 (3) | 1.01 | 186 ± 19 (3) | 0.66 |
| 400* | 237 ± 13 (3) | 0.83 | 199 ± 53 (3) | 0.70 |
| 450* | 216 ± 2 (3) | 0.75 | 182 ± 57 (3) | 0.64 |
| 500* | 142 ± 13 (3) | 0.50 | 125 ± 36 (3) | 0.44 |

*Samples were equilibrated at the test temperature for at least 1 hour before the strength was measured.
$^d$Numbers in parenthesis () indicate number of specimens tested.

EXAMPLE 18

This Example illustrates that the techniques of the present invention may be used to infiltrate a preform to produce a metal matrix composite body.

A two piece graphite mold defining an upper and a lower region or cavity which were interconnected at a common interface was utilized to contain the preform and matrix metal of the instant Example. Specifically, the lower cavity of the two piece graphite mold, measuring about 7 inches (178 mm) by about 9 inches (229 mm) by about 2 inches (51 mm) thick, was coated with a slurry of colloidal graphite (DAG 154 from Acheson Colloid Co., Port Huron, Mich.), applied with a foam brush, and the coating was allowed to dry in air. A tape cast preform measuring about 5½ inches (140 mm) square and about 35 mils (0.9 mm) thick and comprising by weight about 6 percent magnesium powder (−325 mesh, Hart Co., Tamaqua, Pa.), about 28 percent 500 grit green silicon carbide (39 Crystolon, Norton Company, Worcester, Mass.) and the balance 220 grit green silicon carbide (39 Crystolon) was placed against one of the coated faces of the graphite mold. The mold halves were then assembled to enclose the tape cast preform within the graphite mold, and the graphite mold was clamped together so as to conform the plyable preform to the shape of the mold cavity. The upper region or cavity of the graphite mold measured about 5 inches (127 mm) by about 3 inches (76 mm) by about 1 inch (25 mm).

An edge of the tape cast preform which was exposed at the interface between the two cavities within the mold was sprinkled with a layer of magnesium powder (−100 mesh, Hart Co.). The graphite mold, with the upper region or cavity directed upper, was then placed into a graphite boat measuring about 4 inches (102 mm) by about 15 inches (381 mm) by about 1 inch (25 mm) deep. A graphite paper feeder box (GRAFOIL ®, Union Carbide, Danbury, Conn.), having dimensions approximately identical to the interior of the upper cavity of the mold, which was opened on the upper end and which contained an opening on the bottom side measuring about 2½ inches (64 mm) by about ½ inch (13 mm), was placed into the upper cavity of the mold such that the smaller opening was adjacent to the magnesium coated preform. An ingot of matrix metal weighing about 500 grams and comprising by weight about 15 percent silicon, about 15 percent magnesium and the balance aluminum was placed into the graphite paper box.

The graphite boat and its contents were then placed into a vacuum furnace. The furnace atmosphere was evacuated to about 30 inches of mercury and then back-filled with nitrogen gas to atmospheric pressure, at which point a steady flow rate of about 5 liters per minute of nitrogen gas was maintained within the furnace. The furnace temperature was then raised to about 200° C. at a rate of about 200° C. per hour, held for about 42.5 hours at about 200° C., then increased to about 825° C. at a rate of about 50° C. per hour, and held for about 15 hours at about 825° C. The graphite boat and its contents were removed from the furnace and placed on top of a water cooled aluminum quench plate. To assist in maintaining the temperature gradient during directional solidification of the metal matrix composite body, the alloy reservoir was covered with an exothermic hot topping material (Feedol ® No. 9, Foseco, Inc., Cleveland, Ohio). After cooling to about room temperature, the graphite mold was disassembled to reveal that the tape cast ceramic preform had been infiltrated by the aluminum alloy.

EXAMPLE 19

This Example demonstrates that the ductility of a metal matrix composite made according to the techniques of the present invention can be maximized through control of matrix metal composition and by reducing the amount of magnesium present in the matrix metal.

Sample EA

A lay-up similar to that shown in FIG. 11 was utilized to make a metal matrix composite body. Specifically, three graphite foil boxes 52, each measuring about 8 inches (203 mm) long by about 4 inches (102 mm) wide by about 5 inches (127 mm) high, were placed in the bottom of a Grade ATJ graphite (Union Carbide Company, Danbury, Conn.) boat having an inner cavity measuring about 12 inches (305 mm) long by about 8 inches (203 mm) wide by about 5.25 inches (13.3 mm) high. The graphite foil box 52 was made from a piece of GRAFOIL ® graphite foil (Union Carbide Corporation, Danbury, Conn.), measuring about 14 inches (356 mm) long by about 12.5 inches (318 mm) wide by about 0.015 inches (0.38 mm) thick. Four parallel cuts, about 5 inches (127 mm) from the side and about 5 inches (127 mm) long, were made into the graphite foil. The cut graphite foil was then folded into a graphite foil box 52, glued with RIGIDLOCK ® graphite cement (Polycarbon Corporation, Valencia, Calif.) and stapled to hold the box together. The bottom of the graphite foil box 52 was uniformly coated with a layer of ALFA ® magnesium powder 53 (−50 mesh, Alfa Products Div. of Johnson Matthey, Inc., Ward Hill, Mass.). The magnesium powder 53 was adhered to the bottom of the graphite foil box 52 with a mixture comprising by volume about 25 to 50 percent RIGIDLOCK ® graphite cement and the balance ethyl alcohol.

About 1000 grams of a filler material mixture 54, comprising about 98 percent Grade T-64 tabular alumina (−60 mesh, Alcoa Industrial Chemicals Division, Bauxite, Ark.) and about 2 percent AESAR ® magnesium powder (−325 mesh, Aesar Group of Johnson Matthey Co., Seabrook, N.H.) were placed into a NALGENE ® plastic jar (Nagle Co., Rochester, N.Y.) and blended on a ball mill for at least 2 hours. The filler material mixture 54 was then poured into the bottom of the graphite foil box 52 lining the graphite boat 50, hand packed and coated with a 1 to 2 gram layer of ALFA ® magnesium powder 56 (−50 mesh). A matrix metal ingot 55, weighing about 1239 grams and comprising by weight about 1 percent magnesium and the balance aluminum, was placed onto the filler material mixture 54 in the graphite foil box 52 to form a lay-up.

The graphite boat 50 and its contents were placed into a room temperature retort lined resistance heated furnace. The retort door was closed and the retort was evacuated to at least 30 inches (762 mm) Hg. After the vacuum had been reached, nitrogen was introduced into the retort chamber at a flow rate of about 2.5 liters/minute. The furnace was then heated to about 750° C. at a rate of about 150° C./hour and held for about 15 hours at about 750° C. with a flowing nitrogen atmosphere of about 2.5 liters/minute. The furnace temperature was then decreased from about 750° C. to about 675° C. at a rate of about 150° C./hour. At a temperature of about 675° C., the graphite boat 50 and its contents were removed from the retort and directional solidification was effected. Specifically, the graphite boat 50 was placed onto a room temperature graphite plate and approximately 500 ml of FEEDOL ® No. 9 hot-topping material (Foseco Inc., Cleveland, Ohio) were poured onto the top of the molten matrix metal contained within the graphite foil box 52, and a CERABLANKET ® ceramic fiber blanket (Manville Refractory Products, Denver, Colo.) about 2 inches (51 mm) thick was wrapped around the graphite boat 50. At about room temperature, the graphite foil box 52 was disassembled to reveal that a metal matrix composite body had formed.

Samples EB, EC, ED, EE, EF, EG, and EH

Metal matrix composite Samples EB, EC, ED, EE, EF, EG, and EH were made using substantially the same materials and techniques as were used to make Sample EA except that the matrix metal used to make the metal matrix composites contained different weight percents magnesium. Specifically, each matrix metal contained the following weight percent magnesium: 2, 4, 6, 8, 10, 12 and 14 which corresponded to Samples EB, EC, ED, EE, EF, EG and EH.

Samples EI, EJ, EK, EL, EM, EN, EO, and EP

Metal matrix composite Samples EI, EJ, EK, EL, EM, EN, EO, and EP were made using substantially the same materials and techniques as were used to make Sample EA except that the matrix metal used to make the metal matrix composites contained by weight about 0, 2, 4, 6, 8, 10, 12 and 14 percent magnesium, respectively. Moreover, subsequent to infiltration of the filler material by the matrix metal, the Samples were heat treated. Specifically, the T4 heat treatment comprised heating the metal matrix composite to a temperature of about 435° C. and holding at about 435° C. for about 18 hours, quenching into a room temperature water bath, and aging at about room temperature for about four days.

The tensile strength, yield strength, and ductility of Samples EA through EP is reported in Table XIII.

Each of tensile strength, yield strength and ductility were measured in substantially the same manner as the procedures outlined in Example 6. Unlike the unreinforced alloy which reaches maximum ductility (expressed as percent elongation) at about 10 weight percent magnesium, the metal matrix composite sample which was the most ductile was that whose matrix metal contained the least amount of magnesium (i.e., see Samples EA and EI). Table XIII shows that the ductility of the metal matrix composite samples decreases substantially uniformly with increasing magnesium in the matrix metal.

cavity measuring about 12 inches (305 mm) long by about 8 inches (203 mm) wide by about 5¼ inches (133 mm) tall.

TABLE XIII

Effect of Matrix Metal Composition on MMC Properties

| Sample | Matrix Metal | % Mg by ICP-AES[4] | Heat Treatment | Tensile Str. (MPa) | Yield Str. (MPa)[1] | Ductility (% Elong.) |
|---|---|---|---|---|---|---|
| EA | Al | 0.45 | F[3] | 298 ± 19 | 227 ± 3 | 0.99 ± 0.20 |
| EB | Al-2Mg | 0.74 | F | 333 ± 12 | 261 ± 13 | 0.81 ± 0.20 |
| EC | Al-4Mg | 3.68 | F | 414 ± 7 | 323 ± 13 | 0.79 ± 0.09 |
| ED | Al-6Mg | 5.27 | F | 440 ± 12 | 356 ± 8 | 0.79 ± 0.08 |
| EE | Al-8Mg | 7.16 | F | 460 ± 17 | 390 ± 5 | 0.69 ± 0.10 |
| EF | Al-10Mg | 9.40 | F | 491 ± 19 | 449 ± 10 | 0.63 ± 0.03 |
| EG | Al-12Mg | 9.56 | F | 473 ± 15 | — | 0.48 ± 0.04 |
| EH | Al-14Mg | 11.19 | F | 470 ± 16 | — | 0.44 ± 0.03 |
| EI | Al | 0.30 | T4[a] | 293 | 226 | 0.84 |
| EJ | Al-2Mg | 0.73 | T4 | 332 ± 25 | 267 ± 13 | 0.71 ± 0.15 |
| EK | Al-4Mg | 3.68 | T4 | 389 ± 28 | 325 ± 6 | 0.73 ± 0.15 |
| EL | Al-6Mg | 4.90 | T4 | 449 ± 7 | 357 ± 10 | 0.80 ± 0.07 |
| EM | Al-8Mg | 7.44 | T4 | 450 ± 20 | 398 ± 14 | 0.65 ± 0.05 |
| EN | AQl-10Mg | 9.1 | T4 | 532 ± 21 | 446 ± 12 | 0.63 ± 0.06 |
| EO | Al-12Mg | 10.24 | T4 | 515 ± 31 | 490 ± 14 | 0.54 ± 0.06 |
| EP | Al-14Mg | 12.17 | T4 | 489 ± 29 | — | 0.49 ± 0.05 |

[1]0.2% offset yield strength
[2]Composite comprised 55 volume % Grade T-64 tabular alumina reinforcement (−325 mesh, Alcoa Industrial Chemicals Div., Bauxite, AR)
[3]F = As fabricated; i.e., no subsequent heat treatment
[a]T4 = Solution heat-treat at 435° C. for 18 hours, water quench, naturally age
[4]Inductively Coupled Plasma-Atomic Emission Spectroscopy

EXAMPLE 20

This Example demonstrates the attendant advantages of ball milling a filler material mixture prior to infiltration thereof.

Sample ET

A lay-up similar to that shown in FIG. 11 was utilized to make a metal matrix composite body. Specifically, a graphite foil box 52 measuring about 8 inches (203 mm) long by about 4 inches (102 mm) wide by about 5 inches (127 mm) high was made from a piece of GRAFOIL ® graphite foil (Union Carbide Company, Danbury, Conn.) measuring about 14 inches (356 mm) long by about 12.5 inches (318 mm) wide by about 15 mils (0.38 mm) thick. Four parallel cuts, about 5 inches (127 mm) from the side and about 5 inches (127 mm) long, were made into the graphite foil. The cut graphite foil was then folded into a graphite foil box 52 with edges glued together with RIGIDLOCK ® graphite cement (Polycarbon Corporation, Valencia, Calif.). The bottom of the interior of the graphite foil box 52 was substantiallly uniformly coated with a mixture comprising by volume substantially equal parts of RIGIDLOCK ® graphite cement and PHARMCO ™ ethyl alcohol (Pharmco Products, Inc., Bayonne, N.J.). The wet graphite cement layer on the bottom of the inside of the graphite foil box 52 was then substantially uniformly coated with a layer of magnesium particulate 53 (−50 mesh, Alfa Products, Morton Thiokol Inc., Denvers, Mass.). A total of three such fabricated graphite foil boxes were then placed into a graphite boat 50 having an inner cavity measuring about 12 inches (305 mm) long by about 8 inches (203 mm) wide by about 5¼ inches (133 mm) tall.

About 10,000 grams of BURUNDUM ® alumina milling media (U.S. Stoneware, Mahwah, N.J.), measuring about 15/16 inch (24 mm) in diameter, were placed into an 8.9 liter porcelain ball mill (U.S. Stoneware Corp.). About 5000 grams of 220 grit 39 CRYSTOLON ® green silicon carbide filler material (Norton Company, Worcester, Mass.) were added to the mill and ball milled dry for about 24 hours. The milling media was then removed and about 100 grams of AESAR ® magnesium particulate (−325 mesh, Aesar Group of Johnson Matthey Company, Seabrook, N.H.) was added. The admixture of ball milled silicon carbide and magnesium particulate was then roll mixed for about 2 hours.

A quantity of the roll mixed filler admixture 54 was poured into the aforementioned graphite foil box 52 to a depth of about 1 inch (25 mm). After leveling the filler material admixture 54, about 7 grams of AESAR ® magnesium particulate 56 (−50 mesh) was sprinkled substantially evenly over the surface of the leveled filler material. A matrix metal ingot 55 measuring about 4 inches (102 mm) wide by about 4½ inches (114 mm) long by about 1½ inches (38 mm) thick, weighing about 1200 grams and comprising by weight about 12 percent silicon, 2 percent magnesium and the balance aluminum, was placed into the graphite foil box 52 and oriented such that one of the 4½ by 1½ inch (114 mm by 38 mm) faces contacted the magnesium particulate layer 56 in the box.

The graphite boat 50 and its contents were then placed into a resistance heated controlled atmosphere furnace. The furnace chamber was evacuated to about 30 inches (762 mm) of mercury vacuum and then backfilled with nitrogen gas to substantially atmospheric pressure. A nitrogen gas flow rate of about 2.5 liters per minute was established. The furnace temperature was increased from substantially room temperature to a temperature of about 750° C. at a rate of about 150° C. per hour. After maintaining a temperature of about 750° C. for about 15 hours, the temperature was then decreased to about 675° C. at a rate of about 150° C. per hour. At a temperature of about 675° C., the graphite boat 50 and its contents were removed from the furnace and placed onto a room temperature graphite chill plate to directionally solidify the formed metal matrix com- 9.5–10.6 percent magnesium, ≦0.25 percent silicon, ≦0.30 percent iron, ≦0.25 percent copper, ≦0.15 percent manganese, ≦0.15 percent zinc, ≦0.25 percent titanium, and the balance aluminum.

TABLE XIV

Effect of Ball Milling on MMC Properties

| Sample | Filler Material | Matrix Metal | Hours Ball Milled | UTS (MPa) | Strain to Failure (%) | Elastic Mod. (E) | CTE (°C.$^{-1}$ × 10$^{-6}$) | Fracture Toughness (MPA-m$^{1/2}$) | Density (g/cm$^3$) |
|---|---|---|---|---|---|---|---|---|---|
| EQ | 220# SiC[1] | Al-12Si-2 Mg | 0 | 145 | 0.133 | 164 | 12.2 | 10.37 | 2.87 |
| ER | 220# SiC[1] | Al-12Si-2 Mg | 6 | 209 | 0.211 | 172 | 12.8 | 11.15 | 2.80 |
| ES | 220# SiC[1] | Al-12Si-2 Mg | 12 | 209 | 0.219 | 170 | 12.1 | 11.86 | 2.87 |
| ET | 220# SiC[1] | Al-12Si-2 Mg | 24 | 228 | 0.212 | 188 | 12.8 | 12.79 | 2.77 |
| EU | 325# Al$_2$O$_3$ | 520.0* | 0 | 309 | 0.284 | 143 | 17.5 | 15.27 | 3.18 |
| EV | 325# Al$_2$O$_3$ | 520.0* | 24 | 386 | 0.374 | 153 | 17.3 | 16.24 | 3.17 |
| EW | 325# Al$_2$O$_3$ | 520.0* | 48 | 455 | 0.711 | 142 | 17.9 | 16.06 | 3.16 |

[1]39 CRYSTOLON ® green silicon carbide (220 grit, Norton Company, Worcester, MA)
Grade T-64 tabular alumina (−325 mesh, Alcoa Industrial Chemicals Div., Bauxite, AR)
*≦0.25% Si, ≦0.30 Fe, ≦0.25% Cu, ≦0.15% Mn, 9.5–10.6% Mg, ≦0.15% Zn, ≦0.25% Ti, and the balance aluminum posite and the residual matrix metal reservoir. After the residual matrix metal had cooled to substantially room temperature, the graphite foil box 52 and its contents were removed from the graphite boat 50 and the graphite foil was peeled away to reveal that at least some of the matrix metal 55 had infiltrated the filler material admixture 54 to form a metal matrix composite.

Samples ES and ER

Metal matrix composite Samples ES and ER were formed in substantially the same manner as the metal matrix composite Sample ET, except that the 220 grit 39 CRYSTOLON ® silicon carbide filler was ball milled for 12 hours and for 6 hours, respectively.

Sample EO

Metal matrix composite Sample EQ was formed in substantially the same manner as metal matrix composite Samples ET, ES and ER, except that the 220 grit 39 CRYSTOLON ® silicon carbide filler material was not given a ball milling treatment; however, the two hour roll mixing operation of the silicon carbide and magnesium particulates was retained.

Sample EW

Metal matrix composite Sample EW was formed in substantially the same manner as metal matrix composite Sample C. However, the filler material mixtures, and the processing thereof, differed from each other as follows. Specifically, about 10,000 grams of BURUNDUM ® milling media (U.S. Stoneware, Mahwah, N.J.), measuring about 0.94 inch (24 mm) in diameter, were placed into an approximately 8.9 liter porcelain ball mill (U.S. Stoneware Corp.). About 5000 grams of Grade T-64 tabular alumina filler material (−325, Alcoa Industrial Chemicals Div., Bauxite, Ark.) were added to the mill. After dry ball milling the alumina filler material mixture for about 48 hours, the milling media was removed and about 100 grams of AESAR ® magnesium particulate (−325) was added. The admixture of ball milled tabular alumina and magnesium particulate was then roll mixed for about 2 hours.

The roll mixed admixture of filler material was then processed in substantially the same manner as the filler material admixture in Sample C to form a metal matrix composite. Unlike Sample C, however, the matrix metal for this Sample EW comprised by weight about

Sample EV

Metal matrix composite Sample EV was formed according to substantially the same techniques as employed in Sample EW with the exception that the duration of ball milling of the tabular alumina particulate filler material was about 24 hours.

Sample EU

Metal matrix composite Sample EU was formed according to substantially the same techniques as used to form Sample EW except that no ball milling of the tabular alumina particulate filler material was performed. However, the approximately two hour roll mixing operation of the tabular alumina and the magnesium particulates was still effected.

The affect of the ball milling operations on the silicon carbide and the tabular alumina metal matrix composite filler materials is illustrated in Table XIV. The most dramatic effect of ball milling is on the strength of the composite material as expressed by the ultimate tensile strength (U.T.S.). For both filler material mixtures, increasing the duration of ball milling increased the ultimate tensile strength of the formed metal matrix composite.

FIGS. 27, 28, 39 and 30 are optical photomicrographs taken at about 400× of polished cross-sections of metal matrix composites corresponding to Samples EQ, ER, ES and ET, respectively. The photomicrographs reveal that by increasing the duration of ball milling of the filler material a reduction in size (but perhaps an increase in the number) of magnesium silicide precipitates occurs in the formed metal matrix composite. Because magnesium silicide is brittle, minimizing its crystal size in the matrix of the composite is desirable for achieving high strength and high ductility. Without wishing to be bound by any particular theory or explanation, in regard to Samples EQ, ER, ES and EI, ball milling of the filler material mixture may assist in the nucleation of magnesium silicide precipitates during solidification, thereby reducing the average size of the precipitates.

EXAMPLE 21

This Example demonstrates that metal matrix composites reinforced with tabular alumina possess higher ultimate tensile strengths than do similar composites reinforced with fused alumina.

Sample FA

Figure 31:
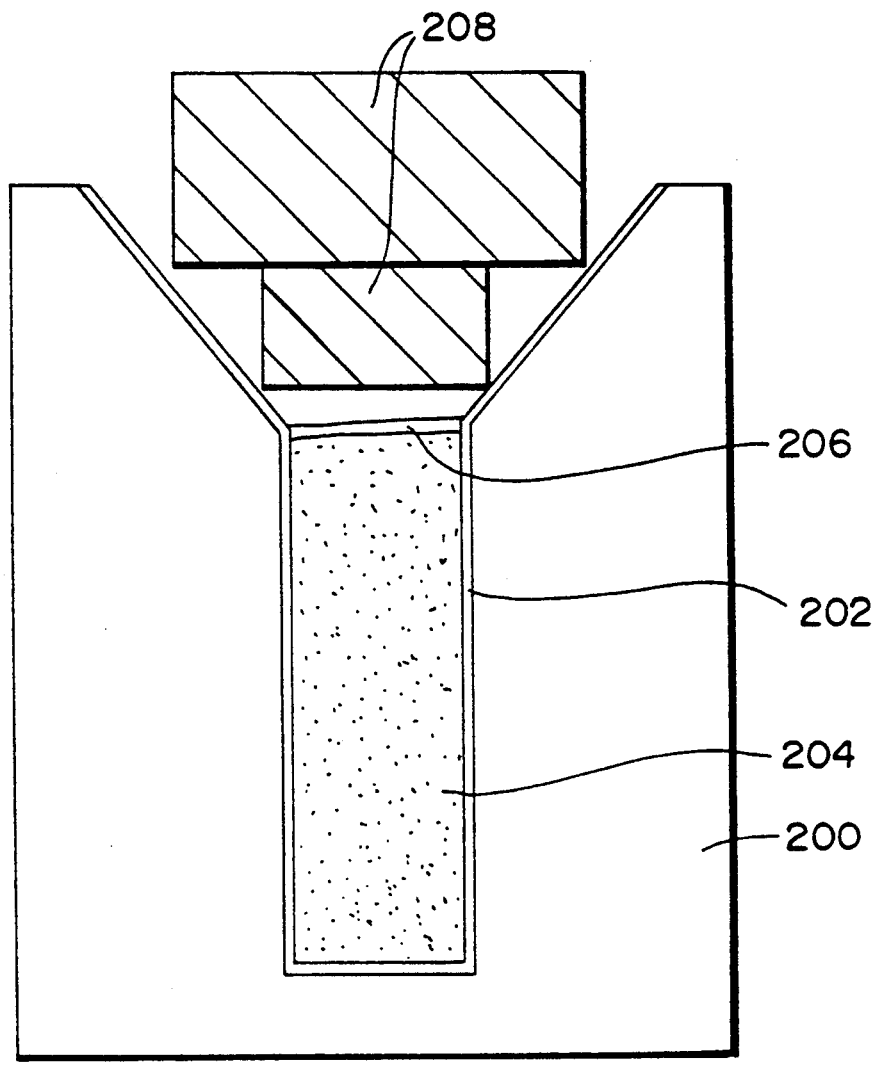
FIG. 31 is a schematic cross-sectional representation of a lay-up for producing a spontaneously infiltrated metal matrix composite according to Sample FA in Example 21.

A rectangular shaped mold 200 shown schematically in FIG. 31 having an inner cavity measuring about 5.5 inches (140 mm) long by about ¾ inch (19 mm) wide by about 5.5 inches (140 mm) deep was machined from a solid piece of grade ATG graphite (Union Carbide Company, Danbury, Conn.). The cavity of the graphite mold was spray coated with a mixture comprising by volume substantially equal parts of DAG ® 154 colloidal graphite (Acheson Colloids Company, Port Huron, Mich.) and ethyl alcohol. After drying the coating in air at ambient temperature for about ½ hour, the coating and drying process was repeated more times to produce a total of four colloidal graphite coatings 202 on the inside of the graphite mold 200. The coated graphite mold was then placed into a resistance heated air atmosphere furnace at substantially room temperature. The furnace temperature was then increased to a temperature of about 380° C. at a rate of about 400° C. per hour. After maintaining a temperature of about 380° C. for about 2 hours, power to the furnace was turned off and the furnace was allowed to cool back to substantially room temperature.

A filler material was prepared by ball milling in a 1.9 liter porcelain ball mill (U.S. Stoneware Corporation, Mahwah, N.J.) approximately 800 grams of an admixture 204 comprising by weight about 3 percent magnesium particulate (−325, Reade Manufacturing Company, Lakehurst, N.J.) and the balance 90 grit 38 ALUNDUM ® fused alumina (Norton Company, Worcester, Mass.) for approximately 2 hours. Also present in the ball mill were about 1600 grams of ball milling media (Standard Ceramic Supply Company, a Division of Chem-Clay Corporation, Pittsburgh, Pa.) each measuring about 15/16 inch (24 mm) in diameter. The ball milled admixture 204 was then placed into a stainless steel can measuring about 5 inches square (127 mm) and about 3 inches (76 mm) tall which in turn was placed into the chamber of a vacuum drying oven already at a temperature of about 150° C. The chamber was evacuated to about 30 inches of mercury vacuum and the admixture was allowed to dry under vacuum for at least 12 hours.

After vacuum drying, the filler material admixture 204 was removed from the vacuum drying oven and poured into the coated graphite mold and leveled. The filler material admixture 204 was then substantially uniformly covered with a layer of ALFA ® magnesium particulate 206 (−50 mesh, Alfa Products Division of Johnson Matthey Company, Ward Hill, Mass.) at a concentration of about 7 milligrams per square centimeter. Matrix metal ingots 208 weighing a total of about 1,200 grams and comprising by weight ≦0.25 percent silicon, ≦0.30 percent iron, ≦0.25 percent copper, ≦0.15 percent manganese, about 9.5–10.6 percent magnesium, ≦0.15 percent zinc, ≦0.25 percent titanium, and the balance aluminum were sandblasted to remove as much oxide skin on the surface as possible and then placed into the graphite mold. The sides of the mold themselves supported the ingots and kept them from contacting the magnesium particulate layer 206.

The graphite mold and its contents were then placed into a retort lined resistance heated furnace at substantially room temperature. A nitrogen gas flow rate of about 10 liters per minute into the retort was established. The furnace temperature was then increased to about 650° C. at a rate of about 400° C. per hour. After maintaining a temperature of about 650° C. for about 1 hour, the temperature was increased to about 835° C. at a rate of about 400° C. per hour. After maintaining a temperature of about 835° C. for about 2 hours, the retort was opened and the graphite mold and its contents were removed and placed on top of a water cooled copper quench plate to directionally solidify the metal matrix composite. An approximately 2 inch (51 mm) thick layer of CARBURUNDUM ® FIBERFRAX ® ceramic fiber blanket was placed around the sides and over the top of the graphite mold to assist in the directional solidification. After the graphite mold and its contents had cooled to substantially room temperature, the mold was inverted and the body which fell out revealed that the matrix metal had infiltrated the filler material admixture to produce a metal matrix composite.

Sample FB

An investment shell measuring about 7 inches square (178 mm) and about 4 inches (102 mm) tall on the outside and having an internal cavity measuring about 5½ inches square (140 mm) and about 3 inches (76 mm) deep on the inside and open on one end was fabricated by substantially the same procedure as disclosed in FIG. 9 herein. In addition, the bottom of the investment shell mold cavity contained five regularly spaced right circular cavities (two shown in FIG. 9) each measuring about 2 inches (51 mm) in diameter and about 1½ inch (38 mm) deep which served as reservoirs for the matrix metal. The inside of the investment shell mold cavity was lined with a second barrier material made by cutting and folding a larger sheet of GRAFOIL ® graphite foil (Union Carbide Corporation, Danbury, Conn.) such that the formed GRAFOIL ® box conformed in size and shape to the inner walls of the investment shell mold. Five holes each measuring about 2 inches (51 mm) in diameter were cut into the graphite foil such that the holes substantially lined up with the circular depressions in the bottom of the investment shell.

About 826 grams of a filler material admixture comprising by weight about 5 percent AESAR ® magnesium particulate (−325, AESAR Group of Johnson Matthey Company, Seabrook, N.H.) and the balance 220 grit 38 ALUNDUM ® fused alumina (Norton Company, Worcester, Mass.) was placed into a dry 8.9 liter porcelain ball mill (U.S. Stoneware Corporation, Mahwah, N.J.) containing about 1650 grams of 15/16 inch (24 mm) diameter alumina ball milling stones (Standard Ceramic Supply Company). After ball milling the filler material admixture for about 2 hours, the admixture was poured into a stainless steel pan measuring about 5 inches (127 mm) square and about 3 inches (76 mm) tall. The stainless steel pin and its contents were then placed into a vacuum drying oven at a temperature of about 150° C. After drying the filler material admixture under about 30 inches (762 mm) of mercury vacuum for at least 12 hours, the admixture was taken out of the vacuum drying oven and immediately poured into the graphite line investment shell. Once the filler material admixture had been poured into the shell and leveled, the investment shell was tapped on a hard surface about 3 times to collapse any void space in the filler material admixture. A matrix metal ingot measuring about 2 inches (51 mm) in diameter and about 1¼ inches (32 mm) in height and comprising by weight ≦0.25 percent silicon, ≤0.30 percent iron, ≤0.25 percent copper, ≤0.15 manganese, about 9.5-10.6 magnesium, ≤0.15 percent zinc, ≤0.25 percent titanium, and the balance aluminum were placed into each one of the five matrix metal reservoir cavities on the bottom of the interior of the investment shell.

The investment shell and its contents were then placed into a stainless steel can measuring about 12 inches (305 mm) long by about 10 inches (254 mm) wide by about 10 inches (254 mm) tall. About 5 grams of TI-LOY 97 titanium sponge (Chemalloy Company, Bryn Mawr, Pa.) was placed into the can outside the investment shell. A copper sheet measuring about 16 inches (406 mm) long by about 14 inches (356 mm) wide by about 6 mils (0.15 mm) thick was placed over the opening of the can. Those portions of the copper sheet extending over the sides of the can were folded down against the sides of the can to form an isolated chamber. A nitrogen purge tube was provided through one side of the can.

The stainless steel can and its contents were placed into a resistance heated air atmosphere furnace. A nitrogen gas flow rate of about 10 liters per minute was established into the can through the purge tube. The furnace was then heated from substantially room temperature to a temperature of about 600° C. at a rate of about 400° C. per hour. After maintaining a temperature of about 600° C. for about 2 hours, the temperature was then increased to about 775° C. at a rate of about 400° C. per hour. After maintaining a temperature of about 775° C. for about 11½ hours, the temperature was decreased to substantially room temperature at a rate of about 400° C. per hour. The nitrogen gas purge tube was disconnected, the stainless steel can and its contents were removed from the furnace. The copper sheet was removed from the stainless steel can. The investment shell was removed using light hammer blows and the GRAFOIL ® liner was peeled away to reveal that at least some of the matrix metal had infiltrated the filler material admixture to form a metal matrix composite.

Sample FC

A lay-up similar to that shown in FIG. 13 was utilized to form this Sample. A stainless steel box having about 1/2 inch (13 mm) thick walls, about a ¼ inch (6 mm) thick base, internal dimensions measuring about 5 inches (127 mm) square and about 3 inches (76 mm) tall and open on one end was lined with GRAFOIL ® graphite foil by making strategically placed cuts into a large piece of GRAFOIL ® and folding the piece to form a box substantially conforming to the size and shape of the dimensions of the inside of the stainless steel box.

About 780 grams of 500 grit 38 ALUNDUM ® fused alumina were placed into a stainless steel pan measuring about 5 inches (127 mm) square and about 3 inches (76 mm) tall and having a wall thickness of about 1/16 inch (1.6 mm). The stainless steel can and its contents were then placed into a vacuum dryer at a temperature of about 150° C. After drying under about 30 inches (762 mm) of mercury vacuum at a temperature of about 150° C. for about 5 hours, the stainless steel can and its contents were removed from the vacuum drying chamber and the fused alumina powder was treated in substantially the same manner as for Sample FB to form a filler material admixture.

The filler material admixture was then poured into the GRAFOIL ® line stainless steel box and leveled. The box was then gently tapped on a hard surface about three times to collapse any void space in the admixture. Four matrix metal ingots each measuring about 2 inches (51 mm) long by about 2 inches (51 mm) wide by about 1¾ inches (23 mm) tall weighing a total of about 1220 grams and comprising substantially the same composition as the matrix metal used for Samples FA and FB were placed into the GRAFOIL ® lined stainless steel boat in contact with the leveled filler material admixture to form a lay-up.

The stainless steel box and its contents were then placed into a stainless steel can measuring about 12 inches (305 mm) long by about 10 inches (254 mm) wide by about 10 inches (254 mm) tall. About 5 grams of TI-LOY 97 titanium sponge were placed into the can outside the stainless steel box. A copper sheet measuring about 16 inches (406 mm) long by about 14 inches (356 mm) wide by about 6 mils (0.15 mm) thick was placed over the opening of the can. Those portions of the copper sheet extending over the sides of the can were folded down against the sides of the can to form an isolated chamber. A nitrogen gas purge tube was provided through one side of the can.

The stainless steel can and its contents were placed into a resistance heated air atmosphere furnace. A nitrogen gas flow rate of about 10 liters per minute into the can through the purge tube was established. The furnace was then heated from substantially room temperature to a temperature of about 600° C. at a rate of about 400° C. per hour. After maintaining a temperature of about 600° C. for about 2 hours, the temperature was increased to about 775° C. at a rate of about 400° C. per hour. After maintaining a temperature of about 775° C. for about 1½ hours, the temperature was increased to about 800° C. at a rate of about 400° C. per hour. After maintaining a temperature of about 800° C. for about 45 minutes, the nitrogen gas purge tube was disconnected and the stainless steel can and its contents were removed from the furnace. The copper foil sheet covering the top of the can was removed and the stainless steel can and its contents were removed from the can and placed onto a water cooled copper quench plate to directionally solidify the matrix metal. After cooling down the quench plate for about 10 minutes, the temperature of the residual matrix metal had cooled to below 275° C. and the stainless steel box and its contents completed cooling to substantially room temperature submerged in a water bath. After cooling to substantially room temperature, the steel box was removed and the GRAFOIL ® liner was peeled away to reveal that at least some of the matrix metal had infiltrated the filler material admixture to form a metal matrix composite.

Table XV shows selected physical properties of three metal matrix composite bodies reinforced with tabular alumina, the fabrication of which was described previously in Example 9, and three metal matrix composite bodies reinforced with fused alumina, the fabrication of which was described in this Example. Because the particle sizes of the reinforcement could not be duplicated in tabular and fused alumina forms, the tabular alumina reinforced composites were compared against fused alumina reinforced composites of a smaller particle size. The physical properties were measured in substantially the same manner as was used in the procedures outlined in Example 6 and as detailed below.

Measurement of Four Point Flexural Strength

The four point flexural strength of some metal matrix composites was determined using MIL-STD-1942A, Flexural Strength of High Performance Ceramics at Ambient Temperature. Rectangular flexural strength test specimens having dimensions of about 2 inches (51 mm) long by about 0.24 inch (6 mm) wide by about 0.12 inch (3 mm) thick were used. Test Figure configuration B as outlined in Section 5.2 was employed. The four point test fixture was then placed onto the base of Model No. CITS 2000/6 universal testing machine (System Integration Technology, Inc., Stoughton, Mass.) having a 500 lb (2225N) full scale deflection load cell. A computer data acquisition system was connected to the measuring unit and strain gauges in the load cell recorded the test responses. The flexural strength test specimens were deformed at a constant rate of about 0.51 millimeters per minute of cross-head travel. The flexural strength and the maximum strain to failure were calculated from the sample geometry and recorded responses with programs from within the computer.

For materials which fail in a brittle fashion, the fracture strength usually increases as the particle or grain size of the body decreases. Table XV shows that metal matrix composites reinforced with tabular alumina are, typically stronger than metal matrix composites reinforced with fused alumina even though the size of the fused alumina reinforcement particles may be much smaller than the size of the tabular alumina reinforcement particles for similar volume percent filler loading.

tion. The finished basswood pattern was then joined to a Grade 5550-K. GRN. FLK. wax pattern in the shape of the desired matrix metal reservoir measuring about 3 inches (76 mm) in height, 3 inches (76 mm) in diameter at the top and about 2 inches (51 mm) in diameter at its base where it contacted the basswood investment pattern. The means of joining the basswood investment pattern to the wax reservoir pattern comprised welding the two pieces together with molten wax.

An investment shell was then built up on the surface of the wax investment pattern. Specifically, the wax investment pattern was dipped into a slip or slurry comprising by weight about 28.7 percent NYACOL® 1430AT colloidal silica (Nyacol Products, Inc., an affiliate of PQ Corporation, Ashland, Mass.), about 63.2 percent HUBERCARB® Q 325 calcium carbonate (−325 mesh, J. M Huber Corporation, Calcium Carbonate Div., Quincy, Ill.), about 4.3 percent 500 grit 39 CRYSTOLON® green silicon carbide, about 2.9 percent 500 grit TETRABOR® boron carbide (Exolon-ESK Corporation, Tonawanda, N.Y.), about 0.6 percent VICTOWET® 12 wetting agent (Ransom and Randolph, Inc., Maumee, Ohio) and about 0.3 percent DCH Antifoam defoamer (Ransom and Randolph, Inc.). The slip coated wax model was then dusted or stuccoed with dry 90 grit RANCO® SIL No. A silica sand (Ransom and Randolph, Inc.). The wax model and its developing investment shell were then dried for about ½ hour at a temperature of about 65° C. The dried investment shell was then dipped for about 2 seconds into a bath of NYACOL® 1430 AT colloidal silica. This dip dust dry wet sequence was then immediately

TABLE XV

Effect of Alumina Type on MMC Properties

| Sample | Mesh Size | $Al_2O_3$ Type | Flexural Str. (MPa) | U.T.S. (MPa) | Fracture Toughness $K_{1c}$ (MPa-m$^{1/2}$) | Strain to Failure (%) | Elastic Mod. (GPa) | Volume % $Al_2O_3$ |
|---|---|---|---|---|---|---|---|---|
| AV | −325 | Tabular[1] | 522 (7)* | 442 (3) | 18.2 (4) | 0.637 | 140 | 57 |
| FC | 500 | Fused[2] | 529 | 354 | 15.7 | — | 146 | 49.4 |
| AU | −100 | Tabular | 422 (9) | 285 (3) | 13.3 (4) | 0.201 | 175 | 56 |
| FB | 220 | Fused | 406 | 157 | 13.9 | — | 138 | 40.7 |
| AT | −60 | Tabular | 373 (8) | 242 (5) | 12.1 (6) | 0.169 | 177 | 58 |
| FA | 90 | Fused | 205 | — | 7.8 | — | 151 | 51.7 |

[1]Grade T-64 tabular alumina (Alcoa Industrial Chemicals Div., Bauxite, AR).
[2]38 ALUNDUM ® fused alumina (Norton Company, Worcester, MA)
*Number in parentheses denotes the sample size.
⊤Matrix metal: ≦0.25% Si, ≦0.30% Fe, ≦0.25% Cu, ≦0.15% Mn, 9.5–10.6% Mg, ≦0.15% Zn, ≦0.25% Ti and the balance aluminum

EXAMPLE 22

This Example discloses the use of both low temperature and high temperature oxygen "getters" which aid in the spontaneous infiltration process.

Figure 32A:
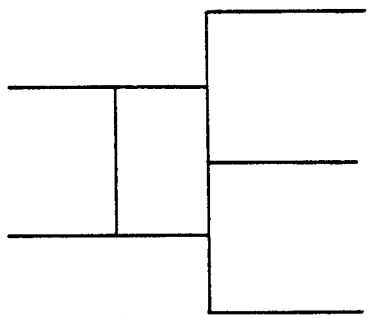
FIGS. 32a and 32b correspond to a top view and a side view, respectively, of a metal matrix composite body which is produced in accordance with Example 22.
Figure 32B:
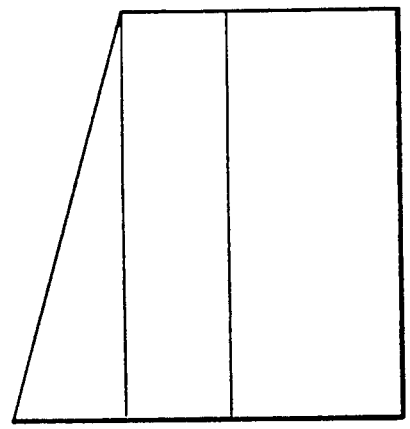

A structure resembling a capital letter "I" attached to the back of a larger capital letter "E" was fabricated from 3 inch (76 mm) long sheets of 1/6 inch (1.6 mm) thick basswood of various widths. The structure is shown in orthoscopic views in FIGS. 32a and 32b. The basswood sheets were joined to each other with ELMER'S® wood glue (Professional Carpenters Wood Glue, Borden Company, Columbus, Ohio). Upon curing the glue in air at substantially room temperature for about 2 to 3 hours, the basswood fugitive investment pattern was then sealed with a protective coating of RED DEVIL® HI-GLOSS 70 polyurethane (Red Devil Paints and Chemicals, Division of Insilco Company, Mount Vernon, N.Y.). After drying the brushed on polyurethane coating for about ½ hour, two additional coatings were applied, each with an approximately 1 12 hour drying period after the coating applicarepeated two more times. Next, the coated wax investment pattern was immediately dipped into a secondary investment slurry comprising by weight about 1 part REDIP® indicator (Ransom and Randolph, Inc.), about 2 parts VICTOWET® 12 wetting agent, about 56 parts distilled water, about 274 parts NYACOL® 830 colloidal silica and about 700 parts RANCO® SIL No. 2 silica powder (Ransom and Randolph, Inc.) to yield a slurry viscosity corresponding to about 15 seconds in a Zahn Number 4 cup. The slurry coated investment shell was then stuccoed or dipped in a fluidized bed of approximately 30 grit RANCO® SIL B silica sand (Ransom and Randolph, Inc.). The stuccoed investment shell was again dried at a temperature of about 65° C. for about ½ hour or until the REDIP® indicator in the shell changed in color form yellow-green to deep orange. This second dip-stucco-dry sequence was then repeated an additional five times. No prewetting of the investment shell with colloidal silica between dippings in the secondary investment shell slurry was required.

After application of the third secondary investment shell layer, the developing shell was wrapped with wire which severed as a reinforcement.

Several 1/16 inch (1.6 mm) diameter holes were drilled in the investment shell in strategic places to assist in venting gases from the basswood during the subsequent flash firing. The coated basswood and wax reservoir investment pattern was then flash fired by placing said pattern into a gas heated air atmosphere furnace already at a temperature of about 890° C. and holding at that temperature for about 15 minutes to burn out the basswood and the wax. The remaining investment shell 210 was then removed from the 890° C. gas furnace and placed into a resistance heated air atmosphere furnace already at a temperature of about 850° C. After firing the investment shell 210 for about 5 hours at a temperature of about 850° C. to remove the chemically bound water and to rigidize the shell, the investment shell 210 was removed from the furnace at temperature and placed onto a room temperature refractory plate and allowed to cool.

A blend of 39 CRYSTOLON ® green silicon carbide particulates (Norton Co., Worcester, Mass.) comprising about 772 grams of 220 grit and about 193 grams of 500 grit particles were placed into a dry 1.1 liter porcelain ball mill (U.S. Stoneware Corp., Mahwah, N.J.) containing about 2000 grams of dry ½ inch (13 mm) diameter BURUNDUMG ® alumina stones (U.S. Stoneware Corporation). The ball mill, the ball mill lid (removed from mill) and its contents were vacuum dried for about 4 hours at a temperature of about 150° C. under about 30 inches (762 mm) of mercury vacuum. The ball mill and its contents were removed from the vacuum drier and about 35 grams of magnesium powder ($-325$ mesh, Reade Manufacturing Company, Lakehurst, N.J.) was added to the silicon carbide particulate in the ball mill to produce a filler material admixture 212. The lid to the ball mill was then secured and the filler material admixture 212 was milled for about 3½ hours. The ball mill lid was then removed from the ball mill and the ball mill and its contents were then vacuum dried a second time for at least four hours at a temperature of about 150° C. under about 30 inches (762 mm) of mercury vacuum.

Figure 32C:
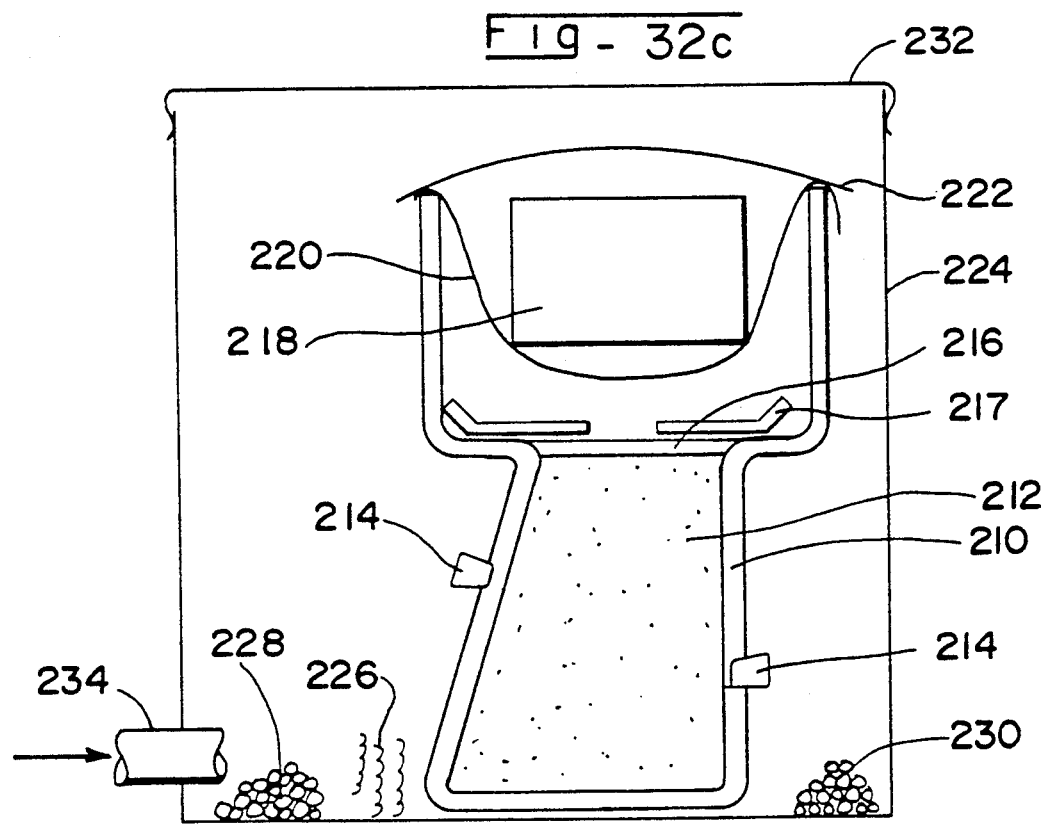
FIG. 32c is a schematic cross-sectional view of a lay-up for producing a spontaneously infiltrated metal matrix composite according to Example 22.

FIG. 32c is a schematic cross-sectional view of the lay-up used to form the metal matrix composite body. The vent holes in the investment shell were filled with CARBORUNDUM ® FIBERFRAX ® ceramic fiber 214 (Standard Oil Engineered Materials Company, Niagara Falls, N.Y.). About 138 grams of the milled and dried filler material admixture 212 was then poured into the investment shell while the shell was shaken back and forth to allow the admixture to fill in as much space as possible in the narrow walls. When all of the admixture had been poured into the investment shell 210, the shell was then tapped on a table top about 5 times to complete the packing of the admixture 212. Additional magnesium particulate material 216 ($-50$ mesh, Reade Manufacturing Company) was sprinkled evenly over the top of the filler material admixture 212 at a concentration of about 6 milligrams per square centimeter of filler material covered 217. An ingot of matrix metal 218 weighing about 852 grams and comprising by weight about 12 percent silicon and the balance commercially pure aluminum was then placed onto a sling or hammock 220. The sling comprised several copper foil strips suspended over the magnesium particulate layer 216 by bending the end of the strips over the walls of the investment shell 210. The copper foil sling 220 served to prevent the matrix metal 218 from contacting the filler material admixture 212 until the matrix metal 218 had melted. A PERMA FOIL graphite foil sheet 222 (TTAmerica, Portland, Oreg.) measuring about 4 inches (102 mm) square was placed over the opening at the top of the investment shell 210.

The investment shell 210 and its contents were then placed into a stainless steel can 224 measuring about 10 inches (254 mm) wide by about 10 inches (254 mm) long by about 10 inches (254 mm) tall. About 7 grams of Grade RMC-3 magnesium turnings 226, about 12 grams of magnesium particulate 228 ($-50$ mesh, Reade Mfg. Co.) (both of which functioned as a low temperature oxygen "getter"), and about 12 grams of TI-LOY 97 of titanium sponge 230 (Chemalloy Company, Bryn Mawr, Pa.) (which functioned as a high temperature oxygen "getter") were placed into the stainless steel can 224 outside of the investment shell 210. Two sheets of copper foil 232 each measuring about 14 inches (356 mm) by about 16 inches (406 mm) by about 6 mils (0.15 mm) thick were placed over the opening of the stainless steel can 224. Those portions of the sheets 232 extending over the sides of the can 224 were folded down tightly against the sides of the can 224 to form an isolated chamber.

The stainless steel can 224 and its contents were placed into a resistance heated air atmosphere furnace. A nitrogen gas flow rate of about 15 liters per minute was established into the can through a purge tube 234 provided through one side of the can. The furnace chamber was then heated from substantially room temperature to a temperature of about 240° C. at a rate of about 400° C. per hour. After maintaining a temperature of about 240° C. for about 7 hours, the temperature was increased to about 790° C. at a rate of about 400° C. per hour. After maintaining a temperature of about 790° C. for about 3.3 hours, the nitrogen gas purge tube 234 was disconnected from the stainless steel can 224 and the can and its contents were removed from the furnace and the copper 232 and graphite foil 222 sheets were removed from the stainless steel can 224 and the investment shell 210, respectively. To directionally solidify the matrix metal 218, room temperature air was blown at the base of the can while FEEDOL ® No. 9 hot topping particulate mixture (Foseco, Inc., Cleveland, Ohio) was poured onto the top of the molter matrix metal reservoir 218. After cooling to substantially room temperature, the investment shell 210 and its contents were removed from the stainless steel can 224 and the investment shell 210 was removed with light hammer blows to reveal that at least some of the matrix metal 218 had infiltrated the filler material admixture 212 to form a metal matrix composite. The formed metal matrix composite was of substantially the same size and shape as the mold cavity defined by the investment shell which in turn was defined by the shape of the basswood and wax patterns, respectively.

EXAMPLE 23

This Example demonstrates that a less reactive form of magnesium can be used as an infiltration enhancer precursor for achieving spontaneous infiltration. This type of infiltration enhancer precursor is described because of its ability to be combined in a preform or filler material with organic binders, aqueous binders, etc.

Figure 33:
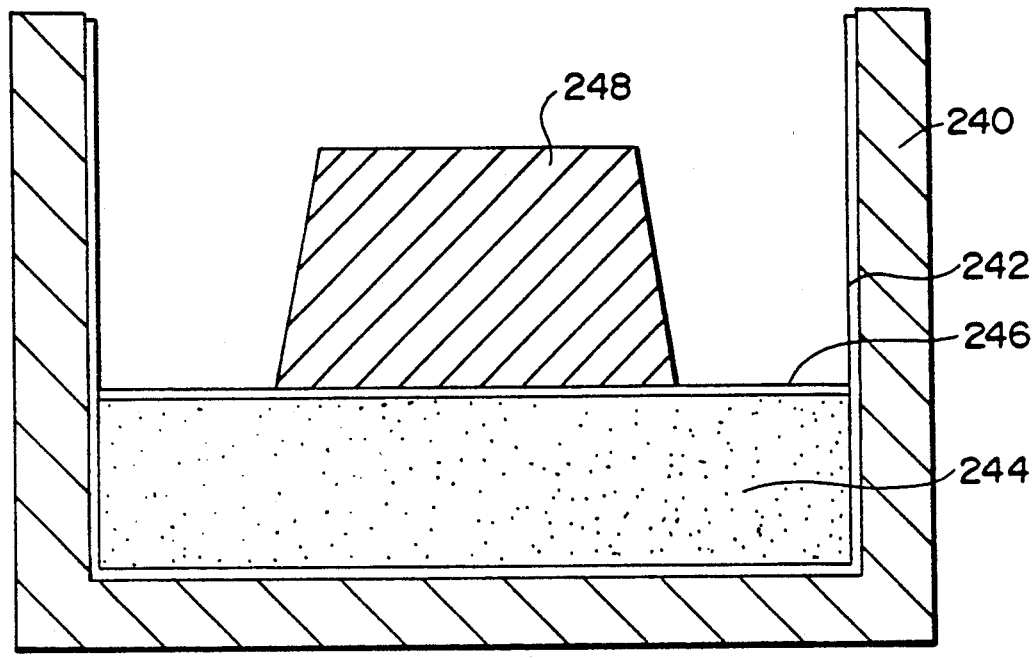
FIG. 33 is a schematic cross-sectional view of a lay-up for producing a spontaneously infiltrated metal matrix composite according to Example 23.

A stainless steel container 240 measuring about 2¼ inches (57 mm) square by about 4 inches (102 mm) tall was lined with GRAFOIL ® graphite foil 242 (Union Carbide Company, Danbury, Conn.) as shown schematically in FIG. 33. Specifically, the GRAFOIL ® box 242 lining the stainless steel container was made by making four parallel cuts into a sheet of GRAFOIL ® folding the cut sheet into a graphite foil box 242, glued with a mixture comprising by volume about equal parts of RIGIDLOCK ® graphite cement (Polycarbon Corporation, Valencia, Calif.) and ethyl alcohol. The box was also stapled together at strategic locations to reinforce the graphite cement.

About 158 grams of a filler material admixture 244 comprising by weight about 5 percent magnesium silicide (−100 mesh) and the balance 220 grit 39 CRYSTOLON ® green silicon carbide particulate (Norton Company, Worcester, Mass.) were placed into a 250 milliliter nalgene plastic jar (Nalgene Company, Rochester, N.Y.) and blended on a ball mill for at least two hours. The filler material admixture 242 was then poured into the bottom of the graphite foil box 242 lining the stainless steel boat 240, hand packed, leveled and then evenly coated with about 1 gram of additional magnesium silicide particulate 246 (−100 mesh). About 311 grams of a matrix metal 248 measuring about 1¾ inches (44 mm) square by about 3 inches (76 mm) tall and comprising by weight about 15 percent silicon and the balance commercially pure aluminum was placed into the graphite foil box 242 and centered over the magnesium silicide particulate layer 246 to form a lay-up.

The stainless steel container 240 and its contents were placed into a retort lined resistance heated furnace at substantially room temperature. The retort was sealed and evacuated to about 30 inches (762 mm) of mercury vacuum and then backfilled with nitrogen gas to substantially atmospheric pressure. A nitrogen gas flow rate of about 4 liters per minute was established. The furnace temperature was then increased to about 850° C. at a rate of about 150° C. per hour. After maintaining a temperature of about 850° C. for about 12 hours, the temperature was then decreased to about 760° C. at a rate of about 150° C. per hour. At a temperature of about 760° C., the retort was opened and the stainless steel container 240 and its contents were removed and placed upon a water cooled aluminum quench plate. FEEDOL ® No. 9 hot topping particulate mixture was poured onto the top of the residual molten matrix metal 248. After the bulk of the exothermic reaction had subsided, a two inch thick layer of CERABLANKET ® ceramic fiber insulation (Manville Refractory Products, Denver, Colo.) was placed over the top of the stainless steel container 240 to help directionally solidify the matrix metal 248. After cooling to substantially room temperature, the lay-up was removed from the stainless steel container 240 to reveal that of the matrix metal 248 had infiltrated the filler admixture 244 to form a metal matrix composite. Thus, this Example demonstrates that magnesium silicide can be used as an infiltration enhancer precursor in forming a metal matrix composite body by spontaneous infiltration process.

Sample GB

A lay-up was prepared in substantially the same manner as for Sample GA with the exception that no magnesium silicide particulate was placed between the filler material admixture and the ingot of matrix metal. Although not believed to be significant, another difference between the manner in which this Sample was fabricated and that by which Sample GA was fabricated was that the present Example was removed from the furnace at a temperature of about 675° C. instead of about 660° C. for the previous Example. Upon cooling to substantially room temperature, however, the lay-up was disassembled to reveal that the matrix metal had infiltrated the filler material admixture to form a metal matrix composite. Thus, this Example demonstrates that the magnesium silicide infiltration enhancer precursor does not need to be present as a boundary layer between the filler material admixture and the matrix metal. Rather, the magnesium silicide, when admixed with the filler, permits spontaneous infiltration to occur.

EXAMPLE 24

Figure 34:
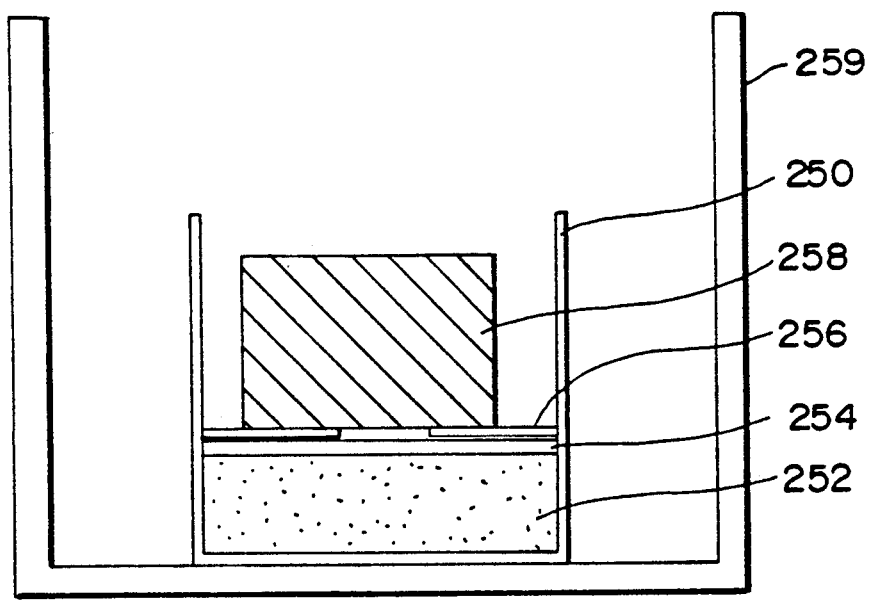
FIG. 34 is a schematic cross-sectional view of a lay-up for producing a spontaneously infiltrated metal matrix composite according to Example 24.

This Example demonstrates that a different magnesium containing compound which is less reactive than pure magnesium metal can also serve as an infiltration enhancer precursor for achieving spontaneous infiltration. A schematic of the lay-up employed to carry out the spontaneous infiltration process is shown in FIG. 34.

Sample GC

A sheet of GRAFOIL ® graphite foil (Union Carbide Company, Danbury, Conn.) measuring about 15 mils (0.38 mm) thick was cut and folded to form a box 250 open on one end and measuring about 2 inches (51 mm) by about 1 inch (25 mm) wide by about 2 inches (51 mm) tall. To maintain the shape integrity of the box 250, the folds were cemented together with RIGIDLOCK ® graphite cement (Polycarbon Corporation, Valencia, Calif.). The box 250 was also stapled together at strategic locations to reinforce the graphite cement.

About 20 grams of a filler material admixture 252 comprising by weight about 2 percent dimagnesium copper intermetallic (−200 mesh University of Missouri-Rolla) about 29.4 percent 500 grit 39 CRYSTOLON ® green silicon carbide powder and the balance 220 grit 39 CRYSTOLON ® green silicon carbide particulate were placed into a mortar and pestal and hand mixed for about 5 minutes.

The filler material admixture 252 was then poured into the bottom of the graphite foil box 250, leveled and then evenly coated with about 2.6 grams of additional dimagnesium copper particulate 254. A gating means 256 comprising a GRAFOIL ® sheet measuring about 2 inches (51 mm) long and about 1 inch (25 mm) wide and having an approximately 1 inch (25 mm) diameter hole centered in it, was placed into the GRAFOIL ® box 250 on top of the dimagnesium copper particulate layer 254. A matrix metal ingot 258 measuring about ½ inch (13 mm) long, about 1 inch (25 mm) wide and about ¾ inch (19 mm) tall weighing about 50 grams and comprising by weight about 12 percent silicon and the balance commercially pure aluminum was then placed into the GRAFOIL ® box 250 and centered over the hole in the GRAFOIL ® gating means 256 to form a lay-up.

Sample GD

Sample GD was prepared in substantially the same manner as was Sample GC except that the filler material admixture comprised by weight about 4 percent dimagnesium copper particulate, about 28.8 percent 500 grit 39 CRYSTOLON ® green silicon carbide and the balance 220 grit 39 CRYSTOLON ® green silicon carbide particulate.

Sample GE

Sample GE was prepared in substantially the same manner as were Samples GC and GD except that the filler material admixture comprised by weight about 5.3 percent dimagnesium copper particulate, about 28.5 percent 500 grit 39 CRYSTOLON® green silicon carbide particulate and the balance 220 grit 39 CRYSTOLON® green silicon carbide particulate.

The three lay-ups for Samples GC, GD and GE were placed into a graphite boat 259 measuring about 6 inches (152 mm) square and about 4 inches (102 mm) tall. The graphite boat 260 and its contents were placed into a controlled atmosphere electric resistance furnace (retort) at substantially room temperature. The retort was sealed and evacuated to about 30 inches (762 mm) of mercury vacuum and then backfilled with nitrogen gas to substantially atmospheric pressure. A nitrogen gas flow rate of about 5 liters per minute was established. The temperature in the retort was then increased to about 200° C. at a rate of about 200° C. per hour. After maintaining a temperature of about 200° C. for about 5 hours, the retort temperature was increased to about 810° C. at a rate of about 200° C. per hour. After maintaining a temperature of about 810° C. for about 10 hours, the graphite boat 259 was removed from the retort and set on top of a graphite chill plate to directionally solidify the matrix metal while the lay-up cooled to room temperature. After the lay-up had cooled to substantially room temperature, the GRAFOIL® boxes 250 were removed from the graphite boat 259 and then the GRAFOIL® was peeled away to reveal that the matrix metal 258 had infiltrated the filler material admixture 252 to produce metal matrix composite Samples GC, GD and GE. Two of the corners each on Samples GC and GD did not infiltrate to completion, but Sample GE did in fact show complete infiltration into the corners. Thus, this Example demonstrates that dimagnesium copper can be used as an infiltration enhancer precursor for forming a metal matrix composite body by spontaneous infiltration.

EXAMPLE 25

Figure 35:
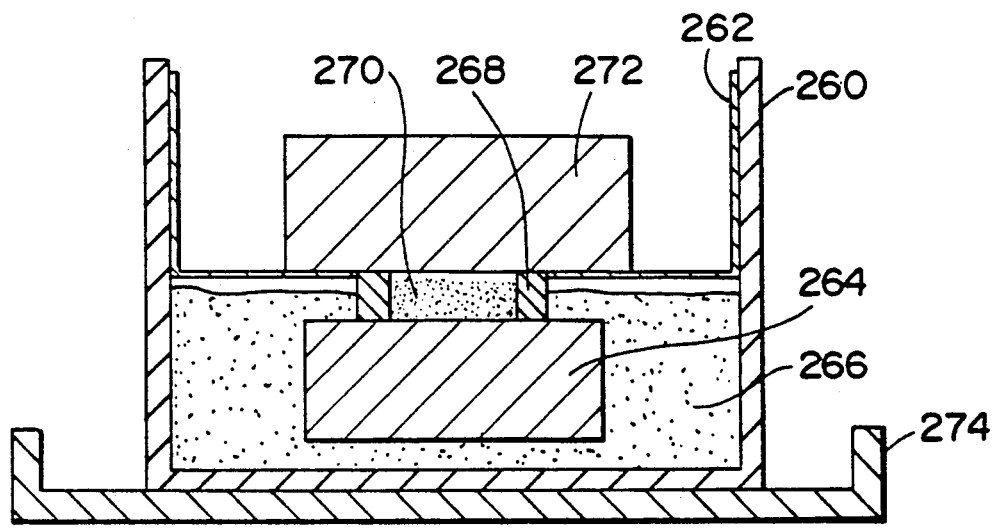
FIG. 35 is a schematic cross-sectional view of a lay-up for producing a spontaneously infiltrated metal matrix composite according to Example 25.

This Example demonstrates that a preform made by an injection molding process can be infiltrated by the spontaneous infiltration process to produce a metal matrix composite. The setup for the spontaneous infiltration is shown schematically in FIG. 35.

A stainless steel container 260 measuring about 4 inches square by about 3 inches tall was lined with GRAFOIL® graphite foil. Specifically, a sheet of GRAFOIL® about 15 mils thick was cut and folded to form a box of substantially the same size and shape as the inter dimensions of the stainless steel box. The folds in the GRAFOIL® sheet were cemented together with RIGIDLOCK® graphite cement to help maintain the shape of the GRAFOIL® box 262. Furthermore, the box was stapled together at strategic locations to reinforce the graphite cement.

About 153 grams of a blend of green silicon carbide particulates with a maximum particle size of about 70 microns was injected molded using a suitable binder and other injection molding additives to form a preform 264 measuring about 2¼ inches in diameter and about 1 inch thick. The concentration of silicon carbide in the injection molded preform 264 amounted to about 70 volume percent.

Grade C-75 unground alumina (Alcan Chemicals Division of Aluminum Company of Canada Limited, Montreal, Quebec, Canada) was poured onto a refractory plate measuring about 11 inches long by about 6 inches wide by about 1 inch thick to a depth of about ½ inch and leveled. The injection molded preform was then placed on top of the layer of alumina particulate. The refractory plate and its contents were then placed into a resistance heated air atmosphere furnace at substantially room temperature. The furnace temperature was then increased to about 1050° C. over a period of about 24 hours. After maintaining a temperature of about 1050° C. for about 2 hours, power to the furnace was turned off and the furnace was allowed to cool back to room temperature. When the furnace chamber had reached substantially room temperature, the refractory plate and its contents were removed from the furnace revealing that the organic constituents in the injection molded preform had volitalized or had combusted and that the surfaces of the silicon carbide particles had oxidized to silica ($SiO_2$) which fused one another at contact points between particles to produce a self-supporting partially sintered by permeable preform.

An admixture of bedding material 266 comprising by weight about 15 percent Grade P 54P borosilicate glass frit (Inorganic Chemicals Division, Mobay Chemical Corporation, Baltimore, Md.) and the balance equal parts by weight of 90 grit, 220, grit and 500 grit El ALUNDUM® fused alumina (Norton Company) was poured into the GRAFOIL® lined steel box 260 to a depth of about ¼ inch and leveled. The fired preform 264 was placed into the GRAFOIL® lined steel box 260, 262 and centered in the box on top of the bedding material admixture 266. A graphite riser ring gating means 268 measuring about 1½ inches in outside diameter, about 1 inch inside diameter and about ⅜ inch tall was centered on the top of the preform 264. Additional bedding material admixture 266 was poured into the steel box around the preform and the graphite riser ring 268 to a level of about ⅛ inch from the top of the graphite ring and leveled. A second GRAFOIL® box 262 having substantially the same length and width as the inside of the steel box 260 was fabricated by cutting and folding a GRAFOIL® sheet and cementing the folds with RIGIDLOCK® graphite cement (Polycarbon Corporation, Valencia, Calif.) and stapling the GRAFOIL® box to reinforce the RIGIDLOCK® cement. An approximately 1 inch diameter hole was cut into the center of the bottom of the GRAFOIL® box 262 such that when the GRAFOIL® box 262 was placed into the steel box 260 that the hole substantially lined up with the inside diameter of the graphite riser ring 268. With the GRAFOIL® box 262 in the steel box 260 centered over the graphite riser ring 268, the top of the GRAFOIL® box 262 was trimmed such that the top of the GRAFOIL® box was of substantially the same height as the steel box. About 3 grams of magnesium particulate 270 (−100 mesh, Hart Corporation, Tamaqua, Pa.) was poured into the space inside the graphite riser ring 268 and leveled. A matrix metal ingot 272 measuring about ¾ inch square by about 1 inch thick weighing a total of about 460 grams and comprising by weight about 12 percent silicon, 6 percent magnesium, and the balance commercially pure alumina was placed into the GRAFOIL® box 262 and centered over the hole in the bottom of the box to form a lay-up.

The GRAFOIL®-lined steel box 260 and its contents were then placed onto a graphite catcher plate 274 measuring about 14 inches (356 mm) long by about 10¼ inches (260 mm) wide by about 1 inch (25.4 mm) tall and having a wall thickness of about ¼ inch. The graphite catcher plate 274 and its contents were then placed into an electric resistance heated controlled atmosphere furnace (retort). The retort was sealed, evacuated to about 30 inches of mercury vacuum, and then backfilled with nitrogen gas to substantially atmospheric pressure. A nitrogen gas flow rate of about 4 liters per minute was established. The temperature in the retort was then increased from substantially room temperature to a temperature of about 850° C. at a rate of about 200° C. per hour. After maintaining a temperature of about 850° C. for about 15 hours, the temperature was then decreased to about 760° C. at a rate of about 200° C. per hour. At a temperature of about 760° C., the graphite catcher plate 274 and its contents were removed from the retort and placed onto a water cooled aluminum quench plate to directionally solidify the matrix metal. FEEDOL ® No. 9 hot topping particulate mixture was poured on top of the molten matrix metal reservoir 272. After the bulk of the exothermic reaction had subsided, an approximately 2 inch thick layer of CERABLANKET ® ceramic fiber insulation (Manville Refractory Products, Denver, Colo.) was placed over the top and around the sides of the GRAFOIL ®-lined box 260. After cooling to substantially room temperature, the lay-up was removed from the steel box 260 and the bedding material admixture 266 was removed with light hammer blows to reveal that the matrix metal 272 had infiltrated of the preform 264 to produce a metal matrix composite. Thus this Example illustrates that a preform fabricated by an injection molding process can be infiltrated using the PRIMEX TM pressureless infiltration process to produce a metal matrix composite.

EXAMPLE 26

Figure 36:
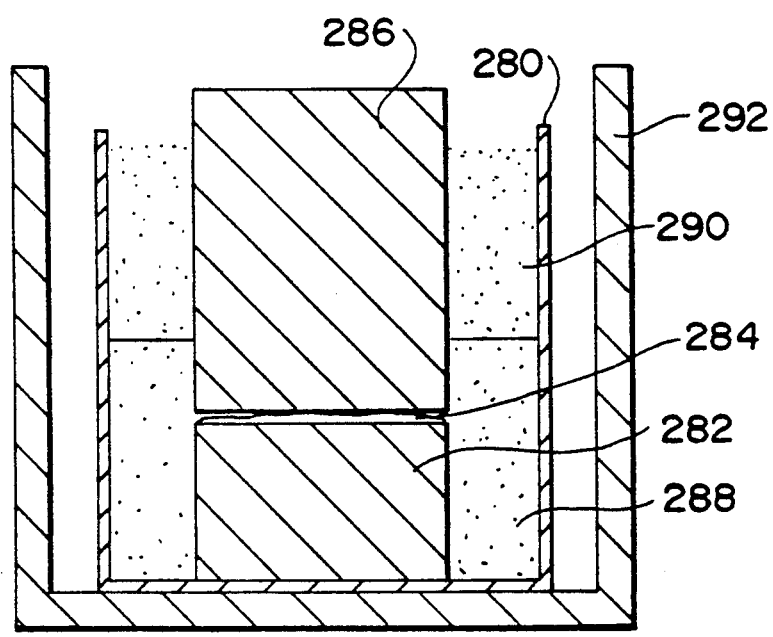
FIG. 36 is a schematic cross-sectional view of a lay-up for producing a spontaneously infiltrated metal matrix composite according to Example 26.

This Example demonstrates that a preform containing magnesium infiltration enhancer precursor can be fabricated by an injection molding process to yield a metal matrix composite by spontaneous infiltration. The setup for the spontaneous infiltration is shown schematically in FIG. 36.

A GRAFOIL ® graphite foil box 280 (Union Carbide Company) measuring about 3 inches square and open on one end was fabricated from a single sheet of GRAFOIL ® by making strategically placed cuts and folds in the GRAFOIL ® sheet and cementing the folds together with RIGIDLOCK ® graphite cement (Polycarbon Corporation). The GRAFOIL ® box 280 was also stapled in strategic locations to reinforce the graphite cement.

A preform 282 measuring about 1½ inches square by about 1 inch thick was fabricated by an injection molding process. Discounting the binders and other additives required for injection molding, the preform comprised by weight about 2 percent magnesium particulate and the balance silicon carbide particulate.

The injection molded preform 282 was centered on the bottom of the GRAFOIL ® box 280. About 1 gram of magnesium particulate 284 (−100 mesh Hart Corporation) was sprinkled substantially evenly over the top of the preform 282. A matrix metal ingot 286 weighing about 225 grams and measuring about 1½ inches square and about 2¼ inches tall and comprising by weight about 11.0-13.0 percent silicon, ≦1.2 percent iron, about 0.5-1.5 percent copper, ≦0.35 manganese, about 0.7-1.3 percent magnesium, about 2.0-3.0 percent nickle, ≦0.35 percent zinc, ≦0.25 percent titanium and the balance aluminum was placed into the GRAFOIL ® box 280 on top of the magnesium particulate layer 284. The orientation of the matrix metal ingot 286 and the preform 282 was such that one of the 1½ inch square phases of the matrix metal ingot 286 contacted and substantially covered the magnesium particulate layer 284 which resided on one of the 1½ square phases of the preform 282. A bedding material admixture 288 comprising by weight about 15 percent Grade F-69 glass frit (Fusion Ceramics Incorporated, Carrollton, Ohio) and the balance substantially equal weight fractions of 90 grit, 220, grit and 550 grit El ALUNDUM ® alumina was poured into the GRAFOIL ® box around the preform 282 and the matrix metal 286 to a height of about ¼ inch above the base of the matrix metal ingot 286. After leveling the bedding material admixture 288, additional bedding material particulate 298 in the form of 39 CRYSTOLON° green silicon carbide particulate was poured into the GRAFOIL ® box 280 around the matrix metal 286 to a level substantially flush with the top of the GRAFOIL ® box 280. The GRAFOIL ® box 280 and its contents were then placed into a graphite boat 292 measuring about 6 inches square about 4 inches tall and having a wall thickness of about ¼ inch.

The graphite boat 292 and its contents were placed into an electric resistance controlled atmosphere furnace (retort). The retort was sealed, evacuated to about 30 inches of mercury vacuum and then backfilled with nitrogen gas to substantially atmospheric pressure. A nitrogen gas flow rate of about 6 liters per minute was established. The temperature in the retort was then increased from substantially room temperature to a temperature of about 775° C. at a rate of about 150° C. per hour. After maintaining a temperature of about 775° C. for about 15 hours, the temperature was decreased to about 760° C. at a rate of about 200° C. per hour. At a temperature of about 760° C., the graphite boat 292 and its contents were removed from the retort and placed on top of a water cooled aluminum quench plate. FEEDOL ® No. 9 hot topping particulate mixture was then poured on top of the residual molten matrix metal reservoir 286. After the bulk of the resulting exothermic reaction had subsided, the top and sides of the graphite boat 292 were covered with an approximately 2 inch thick layer of CERABLANKET ® ceramic fiber insulation to assist in the directional solidification of the matrix metal. After cooling to substantially room temperature, the GRAFOIL ® box 280 and its contents were removed from the graphite boat 292, the silicon carbide particulate bedding material 290 was poured out of the box, the GRAFOIL ® box 280 was disassembled, and the glass frit/El ALUNDUM ® bedding material admixture 288 was removed using light hammer blows to reveal that the matrix metal 286 had infiltrated substantially completely the injection molded preform 282 to produce a metal matrix composite body.

EXAMPLE 27

This Example demonstrates that by tailoring the particle size distribution of the infiltration enhancer precursor to be substantially similar to the particle size of the filler material, that segregation of the infiltration enhancer precursor and the filler material can be ameliorated during the loading and packing of the investment shell, thereby improving the net shape capability and the surface finish achievable by the spontaneous infiltration process. The setup employed to carry out the spontaneous infiltrations was substantially the same as that illustrated in FIG. 32c from Example 22 except that the copper foil sling was not utilized.

Sample GI (Comparative Example)

A wear component of a complex shape measuring overall about 10 inches (254 mm) by about 3 inches (76 mm) wide by about 9 inches (229 mm) tall was spray coated with Grade MS-122 fluorocarbon release agent dry lubricant (Miller Stevenson Company, Inc., Danbury, Conn.). Grade GI-1000 rubber molding compound (Plastic Tooling Supply Company, Exton, Pa.) was cast around the spray coated wear component to form a rubber mold inversely replicating the shape of the wear component. After curing the rubber molding compound in air for about 12 hours, the spray coated wear component was separated from the mold. An exact wax model of the original wear component was then made by casting Grade 5550-K. GRN. FLK. molten wax (Yates Manufacturing Company, Chicago, Ill.) at a temperature of about 110° C. into the rubber mold cavity left after removing the wear component. The wax was then allowed to cool to substantially room temperature. After the wax had cooled to substantially room temperature, the wax model was separated from the rubber mold. A similar process was used to fabricate a wax model for the matrix metal reservoir portion of the subsequent investment casting. The reservoir was approximately 4 inches (102 mm) in diameter by about 6 inches (152 mm) tall. Before solidification of the molten wax reservoir model, however, a steel mandrel was inserted into the wax; the subsequent solidification of the wax locked the mandrel in place.

The two wax models, that for the wear component itself and that for the matrix metal reservoir, were joined together to produce an investment pattern. The means of joining the two wax models comprised welding with additional molten wax.

An investment shell was then built up on the surface of the wax investment pattern. Specifically, the wax investment pattern was dipped into a slip or slurry comprising by weight about 28.7 percent NYACOL® 1430AT colloidal silica (Nyacol Products, Inc., an affiliate of PQ Corporation, Ashland, Mass.), about 63.2 percent HUBERCARB® Q 325 calcium carbonate (−325 mesh, J. M Huber Corporation, Calcium Carbonate Div., Quincy, Ill.), about 4.3 percent 500 grit 39 CRYSTOLON® green silicon carbide, about 2.9 percent 500 grit TETRABOR® boron carbide (Exolon-ESK Corporation, Tonawanda, N.Y.), about 0.6 percent VICTOWET® 12 wetting agent (RanSom and Randolph, Inc., Maumee, Ohio) and about 0.3 percent DCH Antifoam defoamer (Ransom and Randolph, Inc.). The slip coated wax model was then dusted or stuccoed with dry 90 grit RANCO® SIL No. A silica sand (Ransom and Randolph, Inc.). The wax model and its developing investment shell were then dried for about ½ hour at a temperature of about 65° C. The dried investment shell was then dipped for about 2 seconds into a bath of NYACOL® 1430 AT colloidal silica. This dip dust dry wet sequence was then immediately repeated. Next, the coated wax investment pattern was immediately dipped into a secondary investment slurry comprising by weight about 1 part REDIP® indicator (Ransom and Randolph, Inc.), about 2 parts VICTOWET® 12 wetting agent, about 56 parts distilled water, about 274 parts NYACOL® 830 colloidal silica and about 700 parts RANCO® SIL No. 2 silica powder (Ransom and Randolph, Inc.) to yield a slurry viscosity corresponding to about 15 seconds in a Zahn number 4 cup. The slurry coated investment shell was then stuccoed or dipped in a fluidized bed of approximately 30 grit RANCO® SIL B silica sand (Ransom and Randolph, Inc.). The stuccoed investment shell was again dried at a temperature of about 65° C. for about ½ hour or until the REDIP® indicator in the shell changed in color from yellow-green to deep orange. This second dip-stucco-dry sequence was then repeated an additional four to five times. No prewetting of the investment shell with colloidal silica between dippings in the secondary investment shell slurry was required. The coated wax investment pattern was then placed into a steam autoclave to remove the wax pattern from the surrounding investment shell. After autoclaving at a temperature corresponding to a water vapor pressure of about 100 psi (690 kPa) for about five minutes, substantially all of the wax had been removed from the surrounding investment shell. The investment shell was then removed from the steam autoclave and placed into a resistance heated air atmosphere furnace at substantially room temperature. The furnace temperature was then increased to about 850° C. at a rate of about 800° C. per hour. After maintaining a temperature of about 850° C. for about 4½ hours to rigidize the investment shell, the shell was furnace cooled to a temperature of about 600° C. The investment shell was left in the approximately 600° C. furnace until it was ready to be used for the pressureless infiltration process.

A mass of filler material totaling about 1742 grams and comprising by weight about 55 percent 54 grit 39 CRYSTOLON® green silicon carbide, 20 percent 90 grit 39 CRYSTOLON® green silicon carbide, about 15 percent 180 grit 39 CRYSTOLON® green silicon carbide and about 10 percent 500 grit 39 CRYSTOLON® green silicon carbide was placed into a 5 inch (127 mm) square by 3 inch (76 mm) tall stainless steel tray which in turn was placed into the vacuum chamber of a vacuum drying oven at a temperature of about 150° C. After vacuum drying the silicon carbide mixture at a temperature of about 150° C. under a vacuum of about 30 inches (762 mm) of mercury vacuum for about 5 hours, the stainless steel tray and its contents were removed from the vacuum drying oven and the silicon carbide filler mixture was poured into a dry 8.9 liter porcelain ball mill (U.S. Stoneware Corp.) containing about 3500 grams of 15/16 inch (24 mm) diameter alumina ball milling stones (Standard Ceramic Supply Company, a Division of Chem-Clay Corporation, Pittsburgh, Pa.). About 61 grams of magnesium particulate (−325 mesh, Reade Manufacturing Company) was added to the ball mill. After ball milling for about 2 hours, the filler material admixture was transferred from the ball mill back to the 5 inch (127 mm) square by 3 inch (76 mm) tall stainless steel tray. The tray and its contents were placed back into the vacuum drying oven and dried at about 150° C. under about 30 inches (762 mm) of mercury vacuum for at least 12 hours. The tray and its contents were then removed from the vacuum drying oven and the filler material admixture was immediately poured into the investment shell 210 while shaking the investment shell back and forth to achieve and even fill. Once all of the filler material admixture 212 had poured into the investment shell 210 and leveled, the shell was tapped on a hard surface for about three times to collapse any void space remaining in the filler material admixture 212. About 0.4 grams of ALFA® magnesium particulate 216 (Alfa Products, Division of Johnson Matthey Company, Ward Hill, Mass.) was sprinkled evenly over the top surface of the packed filler admixture 212. Matrix metal ingots 218 weighing a total of about 1900 grams and comprising by weight about 12 percent silicon and the balance commercially pure aluminum were wedged into the investment shell 210 such that they were suspended above the layer of magnesium particulate 216.

The investment shell 210 and its contents were placed into a stainless steel can 224 measuring about 14 inches (356 mm) long by about 14 inches (356 mm) wide by about 12½ inches (318 mm) tall. A PERMA FOIL graphite foil sheet 222 (TTAmerica, Portland, Oreg.) sufficiently large to cover the opening at the top of the investment shell 210 was placed over this opening to help keep out dirt and other debris during the run. A copper sheet 232 measuring about 4 inches (102 mm) greater in both length and width and the opening of the stainless steel can 224 was centered over the opening of the can. Those portions of the copper sheet 222 extending over the sides of the can 224 were folded down tightly against the sides to form an isolated chamber. A nitrogen purge tube 234 was provided through one side of the can 224.

The stainless steel can 224 and its contents were placed into a resistance heated air atmosphere furnace. A nitrogen gas flow rate of about 12 liters per minute flowed into the can 224 through the purge tube 234. The furnace was then heated from substantially room temperature to a temperature of about 600° C. at a rate of about 600° C. per hour. After maintaining a temperature of about 600° C. for about 12 hours, the temperature was then increased to about 650° C. at a rate of about 600° C. per hour. After maintaining a temperature of bout 650° C. for about 1 hour, the temperature was then increased to about 800° C. at a rate of about 600° C. per hour. After maintaining a temperature of about 800° C. for about 3½ hours, the nitrogen gas purge tube 234 was disconnected and the stainless steel run can 224 and its contents were removed from the furnace. The copper sheet 232 was removed from the stainless steel can 224 and the investment shell 210 and its contents were removed from the can 224 and placed onto a water cooled copper quench plate. FEEDOL® No. 9 hot topping particulate mixture was poured onto the top of the molten matrix metal reservoir 218. After the exothermic reaction from the hot topping treatment had largely subsided, an approximately 2 inch (51 mm) thick layer of CARBURUNDUM® FIBERFRAX® ceramic fiber blanket was placed over and around the investment shell 210 to help directionally solidify the matrix metal in the metal matrix composite. After the investment shell 210 and its contents had cooled to substantially room temperature, the investment shell 210 was removed with light hammer blows to reveal that the matrix metal 218 had infiltrated the filler material admixture 212 to form a metal matrix composite. Sandblasting the remaining attached investment shell debris revealed that portions of the formed composite were quite porous. This porosity was attributed to poor infiltration due to the failure of the fine magnesium particulate in the filler material admixture to remain uniformly mixed in the admixture.

Sample GJ

Although the metal matrix composite body corresponding to Sample GJ varied significantly in both size and shape from Sample GI, the two metal matrix composite bodies were fabricated according to substantially the same techniques using substantially similar materials. With respect to the magnesium particulate infiltration enhancer precursor, that used for Sample GJ comprised by weight about 1.9 percent ALFA® magnesium particulate (−50 mesh) and about 1.6 percent magnesium particulate (−325 mesh, Reade Manufacturing Company). The fraction of the filler material admixture which comprised magnesium particulate totalled about 3.5 percent for both Samples GI and GJ.

The filler material admixture was ball milled and a lay-up was fabricated in substantially the same manner as for Sample GI. However, a GRAFOIL® gating means 217 was placed on top of the magnesium particulate layer 216 on top of the filler material admixture 212 in the investment shell 210 before the ingots of matrix metal 218 were wedged into the shell on top.

The investment shell 210 and its contents were then placed into a stainless steel can 224 measuring about 12 inches (305 mm) long by about 10 inches (254 mm) wide by about 10 inches (254 mm) tall. About 5 grams of GRADE RMC-3 magnesium turnings 226 (Reade Manufacturing Company) and about 7 grams of TI-LOY 97 titanium sponge 230 (Chemalloy Corporation) were placed into the stainless steel can 224 outside the investment shell 210. A PERMA FOIL graphite foil sheet 222 sufficiently large in area to cover the opening at the top of the investment shell 210 was placed over the top of the shell to keep out dirt and other debris during the run. A copper sheet 232 measuring about 16 inches (406 mm) long by about 14 inches (356 mm) wide by about 6 mils (0.15 mm) thick was placed over the opening of the stainless steel can 224 and those portions of the copper sheet 232 extending over the sides of the can 224 were folded down tightly against the sides of the can 224 to form an isolated chamber. A nitrogen purge tube 234 was provided through one side of the can 224.

The stainless steel can 224 and its contents were placed into a resistance heated air atmosphere furnace. A nitrogen gas flow rate of about 14 liters per minute into the can 224 through the purge tube 234 was established. The furnace was then heated from substantially room temperature to a temperature of about 200° C. at a rate of about 400° C. per hour. After maintaining a temperature of about 200° C. for about 11½ hours, the temperature was increased to about 790° C. at a rate of about 400° C. per hour. After maintaining a temperature of about 790° C. for about 3 hours, the nitrogen purge tube 234 was disconnected and the stainless steel can 224 and its contents were removed from the furnace. The copper sheet 232 was removed from the top of the can 224 and the investment shell 210 and its contents were removed from the can 224 and directionally solidified in substantially the same manner as was Sample GI. Once the investment shell 210 and its contents had reached substantially room temperature, the investment shell 210 was removed with light hammer blows to reveal that at least a portion of the matrix metal 218 had infiltrated the filler material admixture 212 to form a metal matrix composite. Sandblasting off the residual pieces of adhered investment shell material revealed that all of the filler material admixture 212 in the original investment pattern 210 had been infiltrated with matrix metal 218. Thus by employing a blend of both coarse and fine magnesium particulate infiltration enhancer precursor in the filler material admixture 212, the incomplete infiltration due to de-mixing of the filler material admixture observed in Sample GI was avoided.

EXAMPLE 28

Figure 37A:
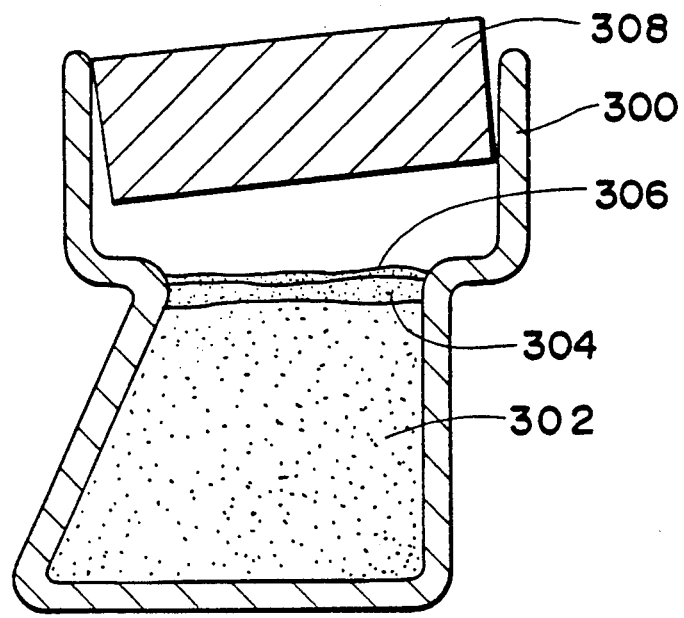
FIG. 37a is a schematic cross-sectional view of a lay-up for producing a spontaneously infiltrated metal matrix composite according to Example 28.
Figure 37B:
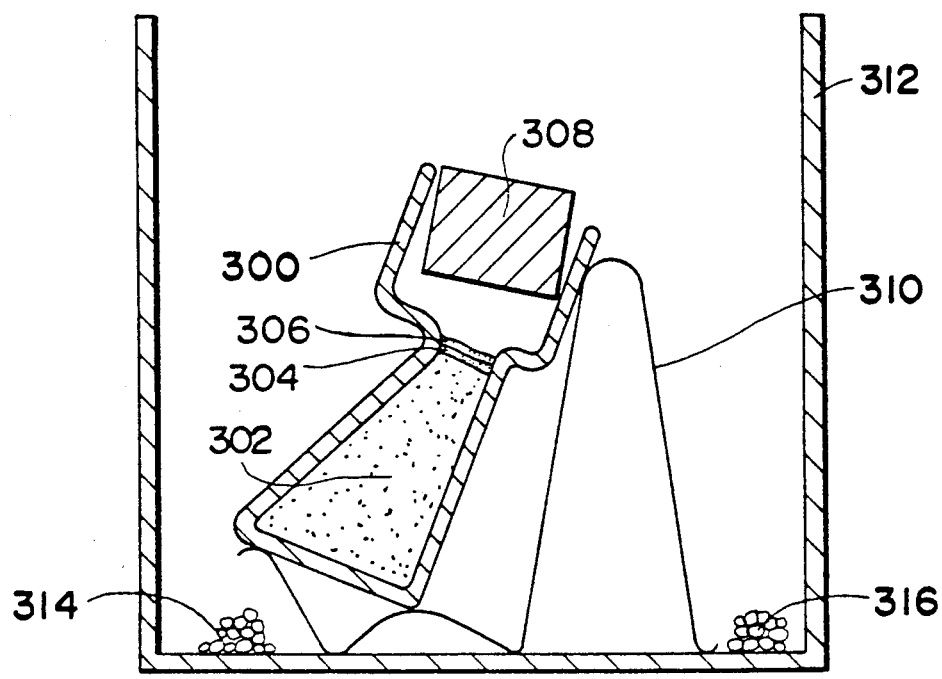

This Example demonstrates that a preform fabricated by a thixotropic casting process can be infiltrated with a matrix metal by the spontaneous infiltration process to produce a metal matrix composite. The setup employed for the spontaneous infiltration process is shown schematically in FIGS. 37a and 37b.

A golf club head was spray coated with Grade MS-122 fluorocarbon release agent dry lubricant (Miller Stevenson Company, Inc., Danbury, Conn.). Thereafter, a Grade GI-1000 rubber molding compound (Plastic Tooling Supply Company, Exton, Pa.) was cast around the spray coated golf club head to form a rubber mold inversely replicating the shape of the club head. After curing the rubber molding compound in air for about 12 hours, the spray coated golf club head was separated from the mold. An exact wax model of the original club head was then made by casting Grade 5550-K. GRN. FLK. molten wax (Yates Manufacturing Company, Chicago, Ill.) at a temperature of about 110° C. into the rubber mold cavity left after removing the club head. The wax was then allowed to cool to substantially room temperature. After the wax had cooled to substantially room temperature, the wax model was separated from the rubber mold. A similar process was used to fabricate a wax model for the matrix metal reservoir portion of the subsequent investment casting. The reservoir was approximately elliptical in cross-section and measured about 3½ inches (89 mm) tall by about 2½ inches (64 mm) wide by about 1 inch (25 mm) deep. Before solidification of the molten wax reservoir model, however, a steel mandrel was inserted into the wax; the subsequent solidification of the wax locked the mandrel in place.

The two wax models, that for the club head itself and that for the matrix metal reservoir, were joined at that location on the club head where the shaft would normally be to produce an investment pattern. The means of joining the two wax models comprised welding with additional molten wax.

An investment shell 300 was then built up on the surface of the wax investment pattern. Specifically, the wax investment pattern was dipped into a slip or slurry comprising by weight about 30.0 percent NYACOL ® 1430AT colloidal silica (Nyacol Products, Inc., an affiliate of PQ Corporation, Ashland, Mass.), about 66.1 percent HUBERCARB ® Q 325 calcium carbonate (−325 mesh, J. M Huber Corporation, Calcium Carbonate Div., Quincy, Ill.), about 3.0 percent 500 grit TETRABOR ® boron carbide (Exolon-ESK Corporation, Tonawanda, N.Y.), about 0.6 percent VICTOWET ® 12 wetting agent (Ransom and Randolph, Inc., Maumee, Ohio) and about 0.3 percent DCH Antifoam defoamer (Ransom and Randolph, Inc.). The slip coated wax model was then dusted or stuccoed with dry 90 grit RANCO ® SIL No. A silica sand (Ransom and Randolph, Inc.). The wax model and its developing investment shell were then dried for about ½ hour at a temperature of about 65° C. The dried investment shell was then dipped for about 2 seconds into a bath of NYACOL ® 1430 AT colloidal silica. This dip dust dry wet sequence was then immediately repeated. Next, the coated wax investment pattern was immediately dipped into a secondary investment slurry comprising by weight about 1 part REDIP ® indicator (Ransom and Randolph, Inc.), about 2 parts VICTOWET ® 12 wetting agent, about 56 parts distilled water, about 274 parts NYACOL ® 830 colloidal silica and about 700 parts RANCO ® SIL No. 2 silica powder (Ransom and Randolph, Inc.) to yield a slurry viscosity corresponding to about 15 seconds in a Zahn Number 4 cup. The slurry coated investment shell was then stuccoed or dipped in a fluidized bed of approximately 30 grit RANCO ® SIL B silica sand (Ransom and Randolph, Inc.). The stuccoed investment shell was again dried at a temperature of about 65° C. for about ½ hour or until the REDIP ® indicator in the shell changed in color from yellow-green to deep orange. This second dip-stucco-dry sequence was then repeated an additional four to five times. No prewetting of the investment shell with colloidal silica between dippings in the secondary investment shell slurry was required. The coated wax investment pattern was then placed into a steam autoclave to remove the wax pattern from the surrounding investment shell 300. After autoclaving at a temperature corresponding to a water vapor pressure of about 100 psi (690 kPa) for about five minutes, substantially all of the wax had been removed from the surrounding investment shell 300. The investment shell 300 was then removed from the steam autoclave and placed into a resistance heated air atmosphere furnace at substantially room temperature. The furnace temperature was then increased to about 850° C. at a rate of about 800° C. per hour. After maintaining a temperature of about 850° C. for about 4½ hours to rigidize the investment shell, the shell was furnace cooled to a temperature of about 600° C. The investment shell 300 was left in the approximately 600° C. furnace until it was ready to be used for the pressureless infiltration process.

About 250 grams of 500 grit 38 ALUNDUM ® fused alumina powder was placed into a stainless steel tray measuring about 5 inches (127 mm) square and about 3 inches (76 mm) tall. The tray and its contents were placed into a vacuum drying oven and vacuum dried for about 12 hours at a temperature of about 150° C. under about 30 inches (762 mm) of mercury vacuum. The tray and its contents were then removed from the vacuum drying oven and the alumina powder was placed into a dry 1.1 liter porcelain ball mill (U.S. Stoneware Corporation). About 12½ grams of magnesium particulate (−325 mesh, Atlantic Equipment Engineers, Inc., Bergenfield, N.J.) was added to the ball mill. The ball mill lid was secured and the filler material admixture in the ball mill was roll mixed for about 15 hours. The roll mixed filler material was then placed into a dry stainless steel tray measuring about 5 inches (127 mm) square by about 3 inches (76 mm) tall inside an approximately 150° C. vacuum drying oven. The filler material was vacuum dried at a temperature of about 150° C. under about 30 inches (762 mm) of mercury vacuum for about one hour. The tray and its contents were removed from the vacuum drier and about 205 grams of the vacuum dried filler material admixture was slowly added to a nalgene beaker containing about 60 grams of ethyl alcohol and about 0.35 grams of AEROSOL ® C-61 dispersant (American Cyanamid Chemical Products Division, Process Chemicals Department, Wayne, N.J.). The remainder of the vacuum dried admixture was stored for subsequent use in the vacuum drier under about 30 inches (762 mm) of mercury vacuum. The slurry was mixed thoroughly with a spatula. After thoroughly soaking the investment shell 300 in ethyl alcohol, the slurry of filler material admixture 302 was poured into the shell which was situated on top of a vibration table. During the casting operation, the investment shell 300 was vibrated to permit the thixotropic slurry to decrease in viscosity and flow into the interstices in the shell 300. The thixotropic casting was dried through removal of the ethyl alcohol through the walls of the investment shell 300 and off of the exposed top surface of the casting of filler material 302. After sufficient ethyl alcohol had been removed from the slurry to render the casting rigid, the vibration was ceased. About 25 grams of additional dry ball milled filler material admixture 304 were poured on top of the formed thixotropically cast preform 302 in the investment shell 300 and leveled. About 0.1 gram of ALFA ® magnesium particulate 306 (−50 mesh) was sprinkled evenly over the top of the loose filler material admixture 304 in the investment shell 300. A matrix metal ingot 308 weighing about 395 grams and comprising by weight ≦0.25 percent silicon, ≦0.30 percent iron, ≦0.25 percent copper, ≦0.15 percent manganese, about 9.5–10.6 percent magnesium, ≦0.15 percent zinc, ≦0.25 percent titanium, and the balance aluminum, was placed into the investment shell 300 and supported by the edges of the shell. The stainless steel holder 310 and its contents were placed into a stainless steel can 312 measuring about 12 inches (305 mm) long by about 8 inches (203 mm) wide by about 4 inches (102 mm) tall. About 5 grams of ALFA ® magnesium particulate 314 (−50 mesh) and about 7 grams of TI-LOY 97 titanium sponge 316 (Chemalloy Company) were placed into the stainless steel can 312 around the stainless steel holder 310.

The stainless steel can 312 and its contents were placed into an electric resistance heated controlled atmosphere furnace (retort) at substantially room temperature. A nitrogen gas flow rate of about 5 liters per minute was established. The temperature in the retort was then increased to about 150° C. at a rate of about 600° C. per hour. After maintaining a temperature of about 150° C. for about 1 hour, the temperature was then increased to about 820° C. at a rate of about 600° C. per hour. After maintaining a temperature of about 820° C. for about 2 hours, the stainless steel can and its contents were removed from the retort. The stainless steel holder 310 and its contents were removed from the stainless steel can 312 and placed onto a refractory plate. Room temperature forced air was directed at the base of the stainless steel holder 310 while a layer of CARBURUNDUM ® FIBERFRAX ® ceramic fiber insulation of at least 1 inch (25 mm) thickness was placed over the top and around the sides of the stainless steel holder 310. After cooling to substantially room temperature, the investment shell 300 and its contents were removed from the stainless steel holder 310 and the investment shell layers were removed with light hammer blows to reveal that at least some of the matrix metal 308 had infiltrated the thixotropically cast preform 302 to produce a metal matrix composite body in the shape of a golf club head having substantially the same size as the original wax model of the golf club head. The accuracy of the shape replication and the quality of the surface finish on the formed metal matrix composite golf club head was such that the lettering on the original golf club head from which the wax pattern was made was quite legible on the surface of the metal matrix composite golf club head. Thus, this Example demonstrates that a preform made by a thixotropic casting technique can be infiltrated with a matrix metal by the spontaneous infiltration process to produce a metal matrix composite body accurately reproducing the size and shape of the preform.

What is claimed is:

1. A method for producing a metal matrix composite comprising:
   providing a substantially non-reactive filler;
   providing at least one infiltration enhancer precursor;
   providing a matrix metal;
   providing an infiltrating atmosphere;
   heating said matrix metal to render it molten; and
   spontaneously infiltrating at least a portion of said substantially non-reactive filler with said molten matrix metal, wherein said at least one infiltration enhancer precursor reacts to form infiltration enhancer in at least a portion of said substantially non-reactive filler and when said matrix metal comprises aluminum and said infiltrating atmosphere comprises a nitrogen-containing atmosphere said infiltration enhancer precursor comprises materials other than magnesium.

2. The method of claim 1, wherein each of said at least one infiltration enhancer precursor reacts to form infiltration enhancer in at least a portion of said substantially non-reactive filler.

3. The method of claim 2, wherein said infiltration enhancer is formed by reacting said at least one infiltration enhancer precursor with said infiltrating atmosphere.

4. The method of claim 3, wherein during infiltration, said at least one infiltration enhancer precursor volatilizes.

5. The method of claim 1, further comprising the step of defining a surface boundary of the substantially non-reactive filler with a barrier means, wherein the matrix metal spontaneously infiltrates up to the barrier means.

6. The method of claim 5, wherein said barrier means comprises at least one material selected from the group consisting of carbon, graphite and titanium diboride.

7. The method of claim 6, wherein said barrier means comprises graphite.

8. The method of claim 1, wherein the substantially non-reactive filler comprises at least one material selected from the group consisting of powders, flakes, platelets, microspheres, whiskers, bubbles, fibers, particulates, fiber mats, chopped fibers, spheres, pellets, tubules and refractory cloth.

9. The method of claim 1, wherein the substantially non-reactive filler comprises at least one ceramic material.

10. The method of claim 1, wherein said matrix metal comprises aluminum, said at least one infiltration enhancer precursor comprises calcium and said infiltrating atmosphere comprises a nitrogen-containing atmosphere.

11. The method of claim 1, wherein said at least one infiltration enhancer precursor is present in said matrix metal and in said substantially non-reactive filler and are substantially the same in chemical composition.

12. The method of claim 11, wherein said infiltration enhancer precursor comprises at least one material selected from the group consisting of strontium, calcium and zinc.

13. The method of claim 1, wherein said at least one infiltration enhancer precursor comprises at least one material selected from the group consisting of zinc, strontium and calcium.

14. The method of claim 1, wherein said infiltrating atmosphere communicates with at least a portion of said substantially non-reactive filler throughout the infiltration process.

* * * * *